US012574096B2

(12) United States Patent
Da Silva et al.

(10) Patent No.: US 12,574,096 B2
(45) Date of Patent: Mar. 10, 2026

(54) BEAM FAILURE DETECTION AND RECOVERY FOR DEACTIVATED SECONDARY CELL GROUP (SCG)

(71) Applicant: Telefonaktiebolaget LM Ericsson (publ), Stockholm (SE)

(72) Inventors: Icaro Leonardo Da Silva, Solna (SE); Jens Bergqvist, Linköping (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 18/025,484

(22) PCT Filed: Sep. 27, 2021

(86) PCT No.: PCT/SE2021/050936

§ 371 (c)(1),
(2) Date: Mar. 9, 2023

(87) PCT Pub. No.: WO2022/071848

PCT Pub. Date: Apr. 7, 2022

(65) Prior Publication Data

US 2023/0337020 A1      Oct. 19, 2023

Related U.S. Application Data

(60) Provisional application No. 63/085,117, filed on Sep. 29, 2020.

(51) Int. Cl.
H04B 7/06 (2006.01)
H04W 24/04 (2009.01)
(Continued)

(52) U.S. Cl.
CPC ........ H04B 7/06964 (2023.05); H04W 24/04 (2013.01); H04W 24/08 (2013.01);
(Continued)

(58) Field of Classification Search
CPC .................. H04B 7/0695; H04B 7/088; H04B 7/06964; H04W 24/04; H04W 24/08;
(Continued)

(56) References Cited

U.S. PATENT DOCUMENTS 10,965,434 B1 * 3/2021 Babaei .................. H04W 76/20
2019/0215896 A1 * 7/2019 Zhou ..................... H04L 1/1812
(Continued)

FOREIGN PATENT DOCUMENTS

CN      110268741 A      9/2019
CO      2021001677 A2      2/2021
(Continued)

OTHER PUBLICATIONS

"3GPP TS 38. 101-4 V16.1.0", 3rd Generation Partnership Project; Technical Specification Group Radio Access Network; NR; User Equipment (UE) radio transmission and reception; Part 4: Performance requirements (Release 16), Jun. 2020, pp. 1-271.
(Continued)

*Primary Examiner* — Benjamin H Elliott, IV
(74) *Attorney, Agent, or Firm* — Murphy, Bilak & Homiller, PLLC

(57) ABSTRACT

Embodiments include methods for a user equipment (UE) configured to communicate with a wireless network via a master cell group (MCG) and a secondary cell group (SCG). Such methods include entering a reduced-energy mode for the SCG responsive to receiving a first command via the MCG or the SCG; and while in the reduced-energy mode for the SCG and in a activated mode for the MCG, performing beam failure detection (BFD) for the SCG and refraining from performing one or more beam management operations for the SCG. In some embodiments, the UE can perform various operations after detecting a beam failure in the SCG while in the reduced-energy mode for the SCG. Other (Continued)

Entering a reduced-energy mode for the SCG responsive to receiving a first command via the MCG or the SCG. — 2810

While in the reduced-energy mode for the SCG and in a activated mode for the MCG, performing beam failure detection (BFD) for the SCG and refraining from performing one or more beam management operations for the SCG. — 2820
Performing BFD for the serving cells that are included in the subset and refraining from performing BFD for the serving cells not included in the subset. — 2821

While in the reduced-energy mode for the SCG and in the activated mode for the MCG, receiving, via the MCG, a TCI state associated with a PDCCH of the SCG. — 2830

Performing one or more operations after not detecting a beam failure in the SCG while in the reduced-energy mode for the SCG. — 2840
Receiving, from the first network node, a second command indicating an activated mode for the SCG. —

For the SCG, exiting the reduced-energy mode and entering an activated mode. — 2831
Monitoring a PDCCH in MCG or SCG based on a TCI state configured by the wireless network before the UE entered the reduced-energy mode for the SCG. —

Performing one or more operations after detecting a beam failure in the SCG while in the reduced-energy mode for the SCG. — 2850
For the SCG, exiting the reduced-energy mode and entering an activated mode. — 2851
Performing a RA procedure towards the SCG. — 2852
Initiating a first timer responsive to entering the activated mode for the SCG or to successful completion of RA procedure. — 2853
Initiating a second timer responsive to successful completion of RA procedure. — 2854
Indicating to a higher protocol layer in the UE that the beam failure in the SCG was detected by a lower protocol layer of the UE. — 2855
Sending, to the second network node or to a first network node configured to provide the MCG, an indication that beam failure was detected in the SCG. — 2856
Receiving, from the first network node, a second command indicating a mode for the SCG. — 2857

For the SCG, exiting the activated mode and entering the reduced-energy mode. — 2860

Setting the SCG mode according to the second command. — 2870

Upon entering the activated mode for the SCG, monitoring the PDCCH of the SCG based on the received TCI state. — 2880 embodiments include complementary methods for network nodes configured to provide the MCG or the SCG, and UEs and network nodes configured to perform such methods.

20 Claims, 29 Drawing Sheets

(51) Int. Cl.
| | |
|---|---|
| *H04W 24/08* | (2009.01) |
| *H04W 74/0833* | (2024.01) |
| *H04W 74/0836* | (2024.01) |
| *H04W 74/0838* | (2024.01) |

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/0838; H04W 76/19; H04W 88/06; H04W 88/10; H04W 24/10; H04W 52/0212; H04W 52/0248; H04W 72/231; H04W 76/15
See application file for complete search history.

(56) References Cited

U.S. PATENT DOCUMENTS

| | | | | |
|---|---|---|---|---|
| 2020/0100154 | A1 | 3/2020 | Cirik et al. | |
| 2020/0120522 | A1* | 4/2020 | Xiao | H04W 36/00692 |
| 2020/0266876 | A1 | 8/2020 | Yu et al. | |
| 2020/0314880 | A1* | 10/2020 | Cirik | H04W 72/1273 |
| 2020/0351771 | A1* | 11/2020 | Geekie | H04W 76/30 |
| 2021/0160126 | A1* | 5/2021 | Cirik | H04W 52/0241 |
| 2021/0175955 | A1 | 6/2021 | Kung et al. | |
| 2022/0007256 | A1* | 1/2022 | Ozturk | H04W 36/0085 |
| 2022/0007446 | A1* | 1/2022 | Purkayastha | H04W 72/23 |
| 2022/0022065 | A1* | 1/2022 | Wang | H04B 7/0695 |
| 2022/0052906 | A1* | 2/2022 | Awoniyi-Oteri | H04W 76/15 |
| 2022/0124514 | A1* | 4/2022 | Lee | H04W 74/0841 |
| 2022/0225457 | A1* | 7/2022 | Purkayastha | H04B 7/06964 |
| 2022/0394583 | A1* | 12/2022 | Deenoo | H04W 36/305 |
| 2023/0189039 | A1* | 6/2023 | Turtinen | H04B 7/06964 370/328 |
| 2023/0232259 | A1* | 7/2023 | Awoniyi-Oteri | H04W 52/0216 370/252 |
| 2023/0262501 | A1* | 8/2023 | Rugeland | H04W 76/27 370/252 |
| 2023/0275802 | A1* | 8/2023 | Awoniyi-Oteri | H04W 76/15 370/225 |
| 2023/0276279 | A1* | 8/2023 | Kim | H04W 76/15 370/329 |
| 2023/0337020 | A1* | 10/2023 | Da Silva | H04B 7/088 |
| 2023/0362817 | A1* | 11/2023 | Da Silva | H04W 24/10 |
| 2023/0371109 | A1* | 11/2023 | Jang | H04B 17/328 |
| 2024/0073984 | A1 | 2/2024 | Wu et al. | |
| 2025/0007596 | A1 | 1/2025 | Wallentin et al. | |

FOREIGN PATENT DOCUMENTS

| | | | |
|---|---|---|---|
| EP | 3525516 | A1 | 8/2019 |
| WO | 2020028792 | A1 | 2/2020 |
| WO | 2020033542 | A1 | 2/2020 |
| WO | 2020047080 | A1 | 3/2020 |
| WO | 2020063757 | A1 | 4/2020 |
| WO | 2020067806 | A1 | 4/2020 |
| WO | 2020146737 | A1 | 7/2020 |
| WO | 2020150991 | A1 | 7/2020 |
| WO | 2020156156 | A1 | 8/2020 |
| WO | 2020166848 | A1 | 8/2020 |
| WO | 2020167203 | A1 | 8/2020 |
| WO | 2020168238 | A1 | 8/2020 |
| WO | 2020172184 | A1 | 8/2020 |
| WO | 2020198746 | A1 | 10/2020 |
| WO | 2021067236 | A1 | 4/2021 |
| WO | 2022071848 | A1 | 4/2022 |

OTHER PUBLICATIONS

"Draft Letter to ITU in reply to ITU_R_WP5D_TEMP_39 = RP-200037 on update submission for LTE-Advanced towards Revision 5 of Recommendation ITU-R M.2012", 3GPP TSG RAN Meeting #89e; RP-201432; Electronic Meeting, Sep. 14-18, 2020, pp. 1-4.

"Efficient SCG activation/deactivation in MR-DC", 3GPP TSG-RAN WG2 Meeting #111-e; R2- 2007748; E-meeting, Aug. 17-28, 2020, pp. 1-5.

"Email report of [AT109e][046][DCCA] Fast SCell Activation (Oppo)", 3GPP TSG-RAN WG2 Meeting #109 electronic; R2-2002224, Feb. 24-Mar. 6, 2020, pp. 1-31.

"Email report of [AT110e][052][DCCA] Fast Scell Activation (OPPO)", 3GPP TSG-RAN WG2 Meeting #110; R2-2006079; Electronic, Jun. 1-12, 2020, pp. 1-13.

"3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Jul. 2020, pp. 1-390.

"3GPP TS 36.321 V16.1.0", 3rd Generation Partnership Project; Technical Specification Group Radio Access Network; Evolved Universal Terrestrial Radio Access (E-UTRA); Medium Access Control (MAC) protocol specification (Release 16), Jul. 2020, pp. 1-141.

"3GPP TS 38.331 V15.1.0", 3rd Generation Partnership Project; Technical Specification Group Radio Access Network; NR; Radio Resource Control (RRC) protocol specification (Release 15), Mar. 2018, pp. 1-268.

3GPP TS 36.300 V16.3.0, Evolved Universal Terrestrial Radio Access (E-UTRA) and Evolved Universal Terrestrial Radio Access Network (E-UTRAN); Overall description; Stage 2 (Release 16), 3rd Generation Partnership Project; Technical Specification Group Radio Access Network; Sep. 2020, (Sep. 2020), pp. 1-390.

3GPP TS 37.340 V16.6.0, "3rd Generation Partnership Project; Technical Specification Group Radio Access Network; Evolved Universal Terrestrial Radio Access (E-UTRA) and NR; Multi-connectivity; Stage 2 (Release 16)" Jun. 2021. pp. 1-88.

3GPP TS 38.321 v16.6.0 (Sep. 2021), 3rd Generation Partnership Project; Technical Specification Group Radio Access Network; NR; Medium Access Control (MAC) protocol specification (Release 16), Sep. 2021.pp. 1-158.

3GPP TS 38.331 V16.6.0 (Sep. 2021), 3rd Generation Partnership Project; Technical Specification Group Radio Access Network; NR; Radio Resource Control (RRC) protocol specification (Release 16), Sep. 2021.pp. 1-961.

ZTE Corporation, Sanechips, "Framework of SCG deactivation and activation"; 3GPP TSG-RAN WG2 Meeting #111, R2-2006900, electronic, e-meeting, Aug. 17-28, 2020. pp. 1-6.

Nokia, Nokia Shanghai Bell, "On fast deactivation/activation of one SG and Scells", 3GPP TSG RAN WG2 #111-e, R2-2007068, Elbonia, Aug. 17-28, 2020. pp. 1-5.

Ericsson, "Efficient SCG (de)activation", 3GPP TSG-RAN WG2 #112e, R2-2010062, Electronic meeting, Nov. 2-13, 2020. pp. 1-13.

Qualcomm Incorporated, "UE measurements and reporting in deactivated SCG"; 3GPP TSG-RAN WG2 Meeting #113-bis-e, R2-2103893, Online, Apr. 12-Apr. 20, 2021. pp. 1-9.

Vice Chairman (Nokia) "Report on LTE legacy, Mobility, DCCA, Multi-SIM and RAN slicing". 3GPP TSG-RAN WG2 Meeting #113 bis, R2-2104301, electronic, Online, Apr. 12-Apr. 20, 2021. pp. 1-38.

ETSI MCC, "Report of 3GPP TSG RAN WG2 meeting #113bis-e Online", 3GPP TSG-RAN WG2 meeting #114-e, R2-2104xxx , Online, Apr. 12-20, 2021. pp. 1-38.

(56)　　　　　References Cited

OTHER PUBLICATIONS

Qualcomm Incorporated: "UE measurements and reporting in deactivated SCG", 3GPP TSG-RAN WG2 Meeting #115-e, R2-2107423, Online, Aug. 9-27, 2021. pp. 1-9.

Ericsson, "UE measurements and reporting in deactivated SCG", 3GPP TSG RAN WG2 #115-e R2-2108389, Aug. 9-27, 2021. pp. 1-10.

"[AT113-e][230][eDCCA] Solution alternatives for SCG activation and deactivation (Huawei)", 3GPP TSG-RAN WG2#113-e, R2-2101966, Online, Jan. 25-Feb. 5, 2021, pp. 1-33.

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.331 V16.2.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, pp. 1-1081.

"3GPP TS 38.214 V15.0.0", 3rd Generation Partnership Project; Technical Specification Group Radio Access Network; NR; Physical layer procedures for data (Release 15), Dec. 2017, pp. 1-71.

"BFD on dormant SCell", 3GPP TSG-RAN WG2 Meeting #109e, R2-2000678, Elbonia, Feb. 24-Mar. 6, 2020, p. 1.

"Discussion on SCG deactivation and activation", 3GPP TSG-RAN WG2 Meeting #113 electronic, R2-2100136, Online, Jan. 25-Feb. 5, 2021, pp. 1-14.

"Framework of SCG deactivation and activation", 3GPP TSG-RAN WG2 Meeting #111 electronic, R2-2006900, e-meeting, Aug. 17-28, 2020, pp. 1-6.

"Introduction of dormancy behavior in NR", 3GPP TSG-RAN WG2 Meeting #108, R2-1914552, Reno, USA, Nov. 18-22, 2019, pp. 1-10.

"Remaining issues on NR physical downlink control channel", 3GPP TSG RAN WG1 Meeting #94bis R1-1810339 Chengdu, China,, Oct. 8-12, 2018, pp. 1-11.

"UE Power Saving Techniques", 3GPP TSG-RAN WG 1 Meeting #96, R1-1902771, Athens, Greece, Feb. 25-Mar. 1, 2019, pp. 1-15.

"3GPP TS 38.133 V16.4.0", 3rd Generation Partnership Project; Technical Specification Group Radio Access Network; NR; Requirements for support of radio resource management (Release 16), Jun. 2020, pp. 1-1463.

"3GPP TS 38.211 V16.2.0", 3rd Generation Partnership Project; Technical Specification Group Radio Access Network; NR; Physical channels and modulation (Release 16), Jun. 2020, pp. 1-131.

"3GPP TS 38.213 V16.2.0", 3rd Generation Partnership Project; Technical Specification Group Radio Access Network; NR; Physical layer procedures for control (Release 16), Jun. 2020, pp. 1-176.

"3GPP TS 38.321 V16.1.0", 3rd Generation Partnership Project; Technical Specification Group Radio Access Network; NR; Radio Resource Control (RRC) protocol specification (Release 16), Jul. 2020, pp. 1-151.

"3GPP TS 38.331 V16.1.0", 3rd Generation Partnership Project; Technical Specification Group Radio Access Network; NR; Radio Resource Control (RRC) protocol specification (Release 16), Jul. 2020, pp. 1-906.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.

"Views on NR Rel-17", 3GPP TSG RAN Meeting #84, RP-190919, Newport Beach, USA, Jun. 4, 2019, pp. 1-36.

"Report of 3GPP TSG RAN2#107bis meeting, Chongqing, China", 3GPP TSG-RAN WG2 meeting #108, R2-1914301, Oct. 14-18, 2019, pp. 1-283.

"Introducing suspension of SCG", 3GPP TSG RAN WG2 Meeting #107, R2-1908679, Prague, Czech, Aug. 26-30, 2019, pp. 1-4.

* cited by examiner

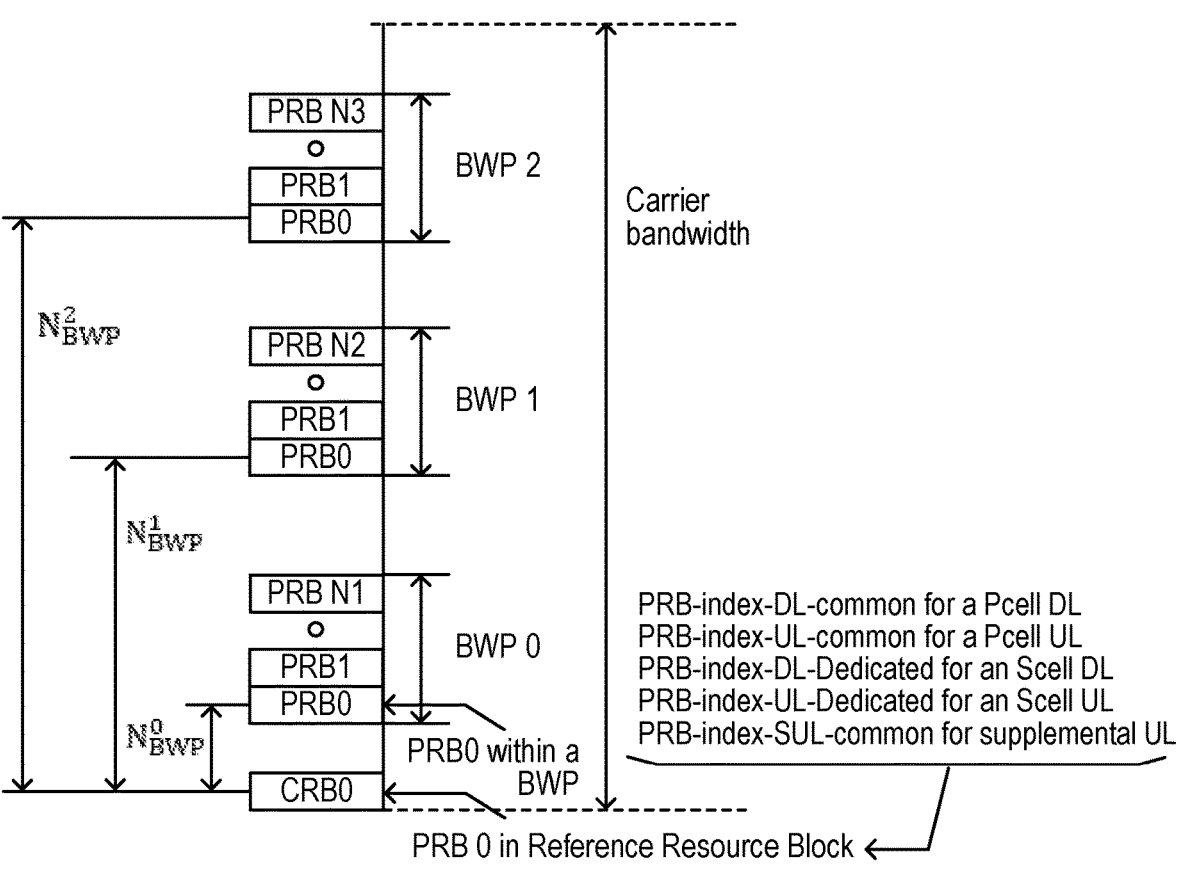

PRB N3
○
PRB1
PRB0

BWP 2

PRB N2
○
PRB1
PRB0

BWP 1

PRB N1
○
PRB1
PRB0

BWP 0

CRB0

$N_{BWP}^{2}$ $N_{BWP}^{1}$ $N_{BWP}^{0}$

PRB0 within a BWP

Carrier bandwidth

PRB-index-DL-common for a Pcell DL
PRB-index-UL-common for a Pcell UL
PRB-index-DL-Dedicated for an Scell DL
PRB-index-UL-Dedicated for an Scell UL
PRB-index-SUL-common for supplemental UL PRB 0 in Reference Resource Block

FIG. 10

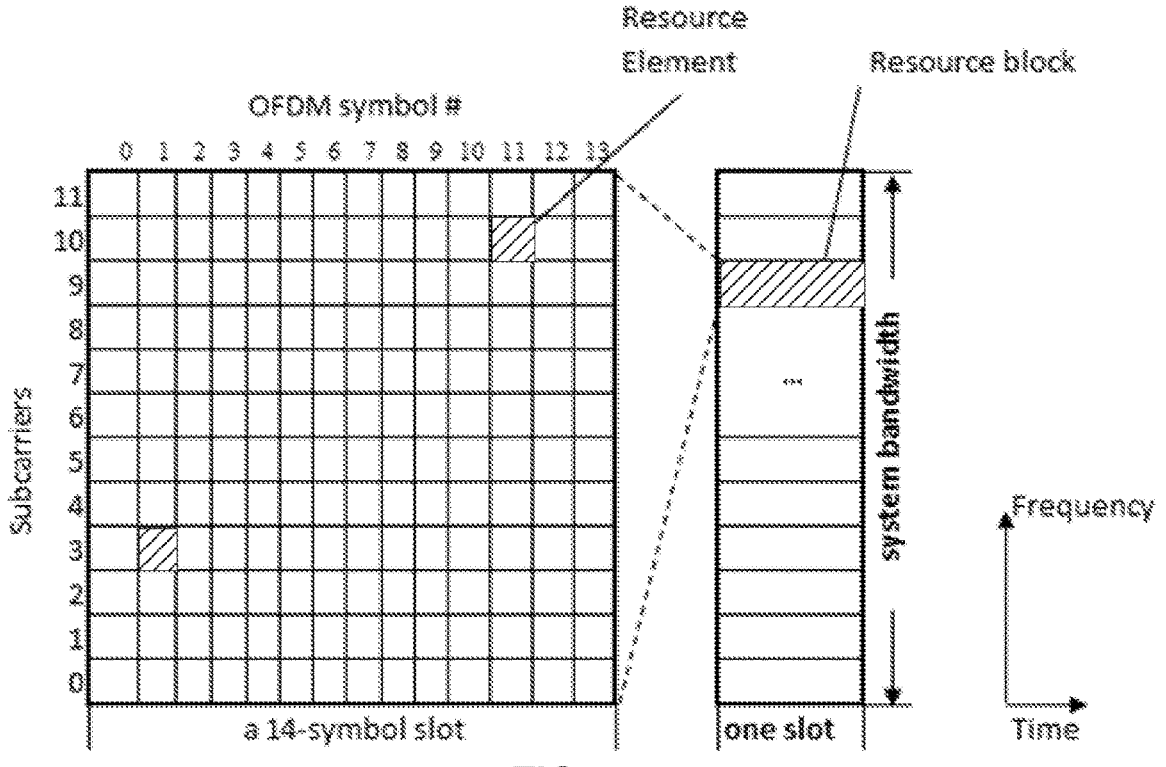

Resource Element

Resource block

OFDM symbol #

0 1 2 3 4 5 6 7 8 9 10 11 12 13

Subcarriers a 14-symbol slot one slot system bandwidth

Frequency

Time

FIG. 11

```
CellGroupConfig
    > spCellConfig
        > spCellConfigDedicated
            > initialDownlinkBWP
                > pdsch-Config
                    > TCI-states configurations
```

FIG. 12

```
-- ASN1START
-- TAG-PDSCH-CONFIG-START
PDSCH-Config ::=                    SEQUENCE {
    dataScramblingIdentityPDSCH        INTEGER (0..1023)                                    OPTIONAL,    -- Need S
    dmrs-DownlinkForPDSCH-MappingTypeA SetupRelease { DMRS-DownlinkConfig }                 OPTIONAL,    -- Need M
    dmrs-DownlinkForPDSCH-MappingTypeB SetupRelease { DMRS-DownlinkConfig }                 OPTIONAL,    -- Need M
    tci-StatesToAddModList             SEQUENCE (SIZE(1..maxNrofTCI-States)) OF TCI-State   OPTIONAL,    -- Need N
    tci-StatesToReleaseList            SEQUENCE (SIZE(1..maxNrofTCI-States)) OF TCI-StateId OPTIONAL,    -- Need N
}
...
-- TAG-PDSCH-CONFIG-STOP
-- ASN1STOP
```

FIG. 13A

```
-- ASN1START
-- TAG-PDCCH-CONFIG-START
PDCCH-Config ::=                SEQUENCE {
    controlResourceSetToAddModList    SEQUENCE(SIZE (1..3)) OF ControlResourceSet          OPTIONAL,    -- Need N
    controlResourceSetToReleaseList   SEQUENCE(SIZE (1..3)) OF ControlResourceSetId        OPTIONAL,    -- Need N
    searchSpacesToAddModList          SEQUENCE(SIZE (1..10)) OF SearchSpace                OPTIONAL,    -- Need N
    searchSpacesToReleaseList         SEQUENCE(SIZE (1..10)) OF SearchSpaceId              OPTIONAL,    -- Need N
    downlinkPreemption                SetupRelease { DownlinkPreemption }                  OPTIONAL,    -- Need M
    tpc-PUSCH                         SetupRelease { PUSCH-TPC-CommandConfig }             OPTIONAL,    -- Need M
    tpc-PUCCH                         SetupRelease { PUCCH-TPC-CommandConfig }             OPTIONAL,    -- Need M
    tpc-SRS                           SetupRelease { SRS-TPC-CommandConfig}                OPTIONAL,    -- Need M
    ...,
}
...
-- TAG-PDCCH-CONFIG-STOP
-- ASN1STOP
```

FIG. 13B

```
-- ASN1START
-- TAG-CONTROLRESOURCESET-START
ControlResourceSet ::=           SEQUENCE {
    controlResourceSetId             ControlResourceSetId,
    frequencyDomainResources         BIT STRING (SIZE (45)),
    duration                         INTEGER (1..maxCoReSetDuration),
    cce-REG-MappingType              CHOICE {
        interleaved                      SEQUENCE {
            reg-BundleSize                   ENUMERATED {n2, n3, n6},
            interleaverSize                  ENUMERATED {n2, n3, n6},
            shiftIndex                       INTEGER(0..maxNrofPhysicalResourceBlocks-1)  OPTIONAL  -- Need S
        },
        nonInterleaved                   NULL
    },
    precoderGranularity              ENUMERATED {sameAsREG-bundle, allContiguousRBs},
    tci-StatesPDCCH-ToAddList        SEQUENCE(SIZE (1..maxNrofTCI-StatesPDCCH)) OF TCI-StateId
                                                                              OPTIONAL,  -- Cond NotSIB1-initialBWP
    tci-StatesPDCCH-ToReleaseList SEQUENCE(SIZE (1..maxNrofTCI-StatesPDCCH)) OF TCI-StateId
                                                                              OPTIONAL,  -- Cond NotSIB1-initialBWP
    tci-PresentInDCI                 ENUMERATED {enabled}                      OPTIONAL,  -- Need S
    ...,
}
-- TAG-CONTROLRESOURCESET-STOP
-- ASN1STOP
```

FIG. 13C

```
-- ASN1START
-- TAG-TCI-STATE-START
TCI-State ::=          SEQUENCE {
    tci-stateId           TCI-StateId,
    qcl-Type1             QCL-Info,
    qcl-Type2             QCL-Info                            OPTIONAL,  -- Need R
    ...
}

QCL-Info ::=          SEQUENCE {
    cell                  ServCellIndex                      OPTIONAL,  -- Need R
    bwp-Id                BWP-Id                             OPTIONAL,  -- Cond CSI-RS-Indicated
    referenceSignal       CHOICE {
        csi-rs                NZP-CSI-RS-ResourceId,
        ssb                   SSB-Index
    },
    qcl-Type              ENUMERATED {typeA, typeB, typeC, typeD},
    ...
}
-- TAG-TCI-STATE-STOP
-- ASN1STOP
```

FIG. 13D

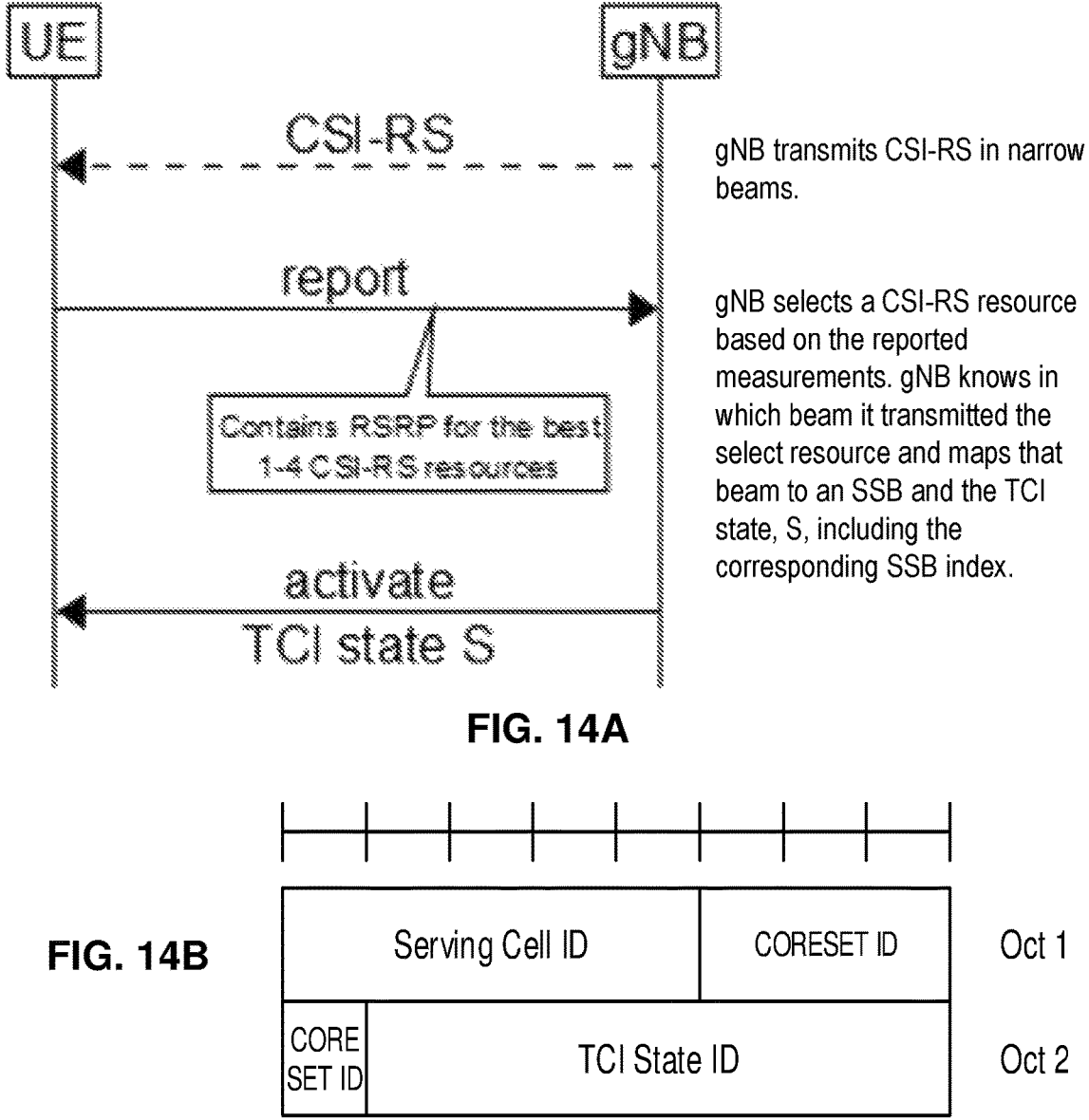

gNB transmits CSI-RS in narrow beams.

gNB selects a CSI-RS resource based on the reported measurements. gNB knows in which beam it transmitted the select resource and maps that beam to an SSB and the TCI state, S, including the corresponding SSB index.

FIG. 14A

Contains RSRP for the best 1-4 CSI-RS resources

FIG. 14B

| Serving Cell ID | | CORESET ID | Oct 1 |
|---|---|---|---|
| CORE SET ID | TCI State ID | | Oct 2 |

| R | Serving Cell ID | | | | | BWP ID | | Oct 1 |
|---|---|---|---|---|---|---|---|---|
| $T_7=1$ | $T_6=0$ | $T_5=1$ | $T_4=1$ | $T_3=0$ | $T_2=1$ | $T_1=0$ | $T_0=0$ | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | Oct 3 |

FIG. 14C

```
RadioLinkMonitoringConfig ::=              SEQUENCE {
    failureDetectionResourcesToAddModList    SEQUENCE(SIZE(1..maxNrofFailureDetectionResources)) OF RadioLinkMonitoringRS
                                                                    OPTIONAL,  -- Need N
    failureDetectionResourcesToReleaseList   SEQUENCE(SIZE(1..maxNrofFailureDetectionResources)) OF RadioLinkMonitoringRS-Id
                                                                    OPTIONAL,  -- Need N
    beamFailureInstanceMaxCount              ENUMERATED {n1, n2, n3, n4, n5, n6, n8, n10}
                                                                    OPTIONAL,  -- Need R
    beamFailureDetectionTimer                ENUMERATED {pbfd1, pbfd2, pbfd3, pbfd4, pbfd5, pbfd6, pbfd8, pbfd10}
                                                                    OPTIONAL,  -- Need R
    ...
}
RadioLinkMonitoringRS ::=            SEQUENCE {
    radioLinkMonitoringRS-Id            RadioLinkMonitoringRS-Id,
    purpose                             ENUMERATED {beamFailure, rlf, both},
    detectionResource                   CHOICE {
        ssb-Index                           SSB-Index,
        csi-RS-Index                        NZP-CSI-RS-ResourceId
    },
    ...
}
```

FIG. 15A

```
SpCellConfig ::=                SEQUENCE {
    servCellIndex                   ServCellIndex                       OPTIONAL,   -- Cond SCG
    reconfigurationWithSync         ReconfigurationWithSync             OPTIONAL,   -- Cond
    ReconfWithSync
    rlf-TimersAndConstants          SetupRelease { RLF-TimersAndConstants }  OPTIONAL,   -- Need M
    rlmInSyncOutOfSyncThreshold     ENUMERATED {n1}                     OPTIONAL,   -- Need S
    spCellConfigDedicated           ServingCellConfig                   OPTIONAL,   -- Need M
    ...
}
```

FIG. 15B

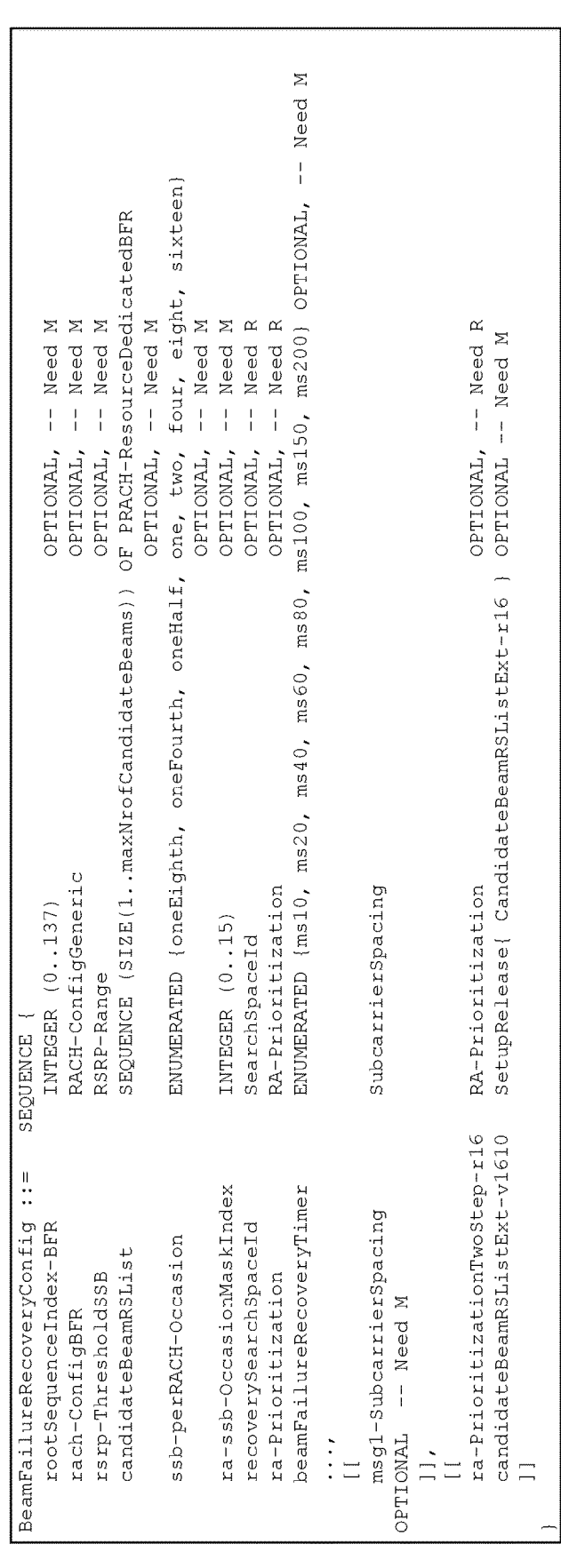

```
BeamFailureRecoveryConfig ::=   SEQUENCE {
    rootSequenceIndex-BFR           INTEGER (0..137)                        OPTIONAL, -- Need M
    rach-ConfigBFR                  RACH-ConfigGeneric                      OPTIONAL, -- Need M
    rsrp-ThresholdSSB               RSRP-Range                              OPTIONAL, -- Need M
    candidateBeamRSList             SEQUENCE (SIZE(1..maxNrofCandidateBeams))  OF PRACH-ResourceDedicatedBFR
                                                                            OPTIONAL, -- Need M
    ssb-perRACH-Occasion            ENUMERATED {oneEighth, oneFourth, oneHalf, one, two, four, eight, sixteen}
                                                                            OPTIONAL, -- Need M
    ra-ssb-OccasionMaskIndex        INTEGER (0..15)                         OPTIONAL, -- Need M
    recoverySearchSpaceId           SearchSpaceId                           OPTIONAL, -- Need R
    ra-Prioritization               RA-Prioritization                       OPTIONAL, -- Need R
    beamFailureRecoveryTimer        ENUMERATED {ms10, ms20, ms40, ms60, ms80, ms100, ms150, ms200} OPTIONAL, -- Need M
    ...,
    [[
    msg1-SubcarrierSpacing          SubcarrierSpacing
OPTIONAL  -- Need M
    ]],
    [[
    ra-PrioritizationTwoStep-r16    RA-Prioritization                       OPTIONAL, -- Need R
    candidateBeamRSListExt-v1610    SetupRelease{ CandidateBeamRSListExt-r16 } OPTIONAL -- Need M
    ]]
}
```

1. UE receives an indication from network in RRC to resume/activate second cell group

4. RRC layer may trigger action(s) based on that BFD was detected

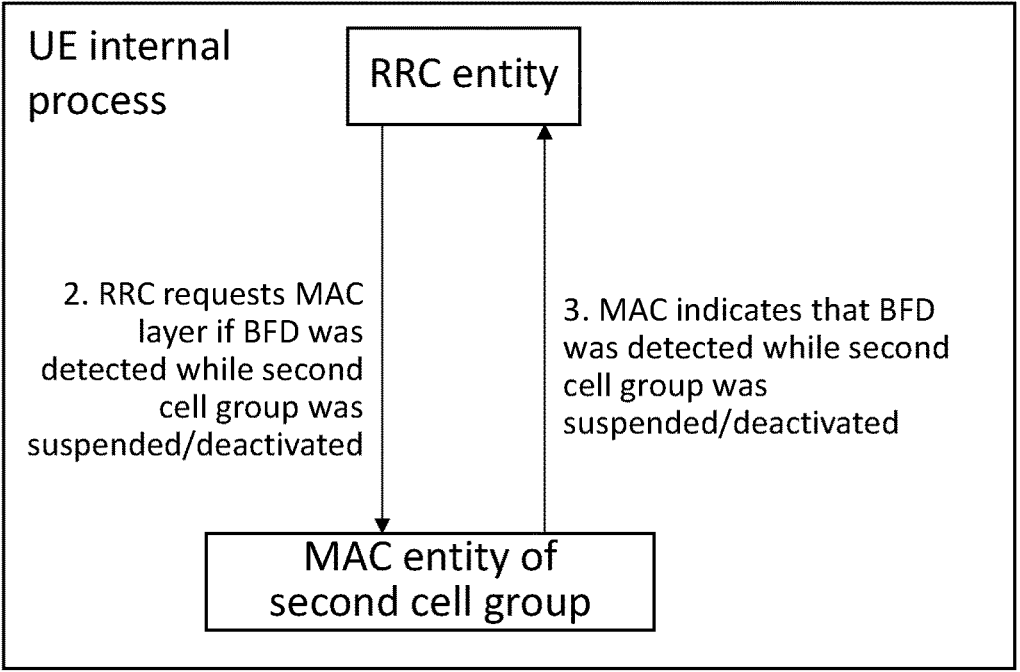

UE internal process

RRC entity

2. RRC requests MAC layer if BFD was detected while second cell group was suspended/deactivated 3. MAC indicates that BFD was detected while second cell group was suspended/deactivated MAC entity of second cell group

FIG. 22B

2. UE receives an indication from network in RRC to resume/activate second cell group 3. RRC layer may trigger action(s) based on that BFD was detected

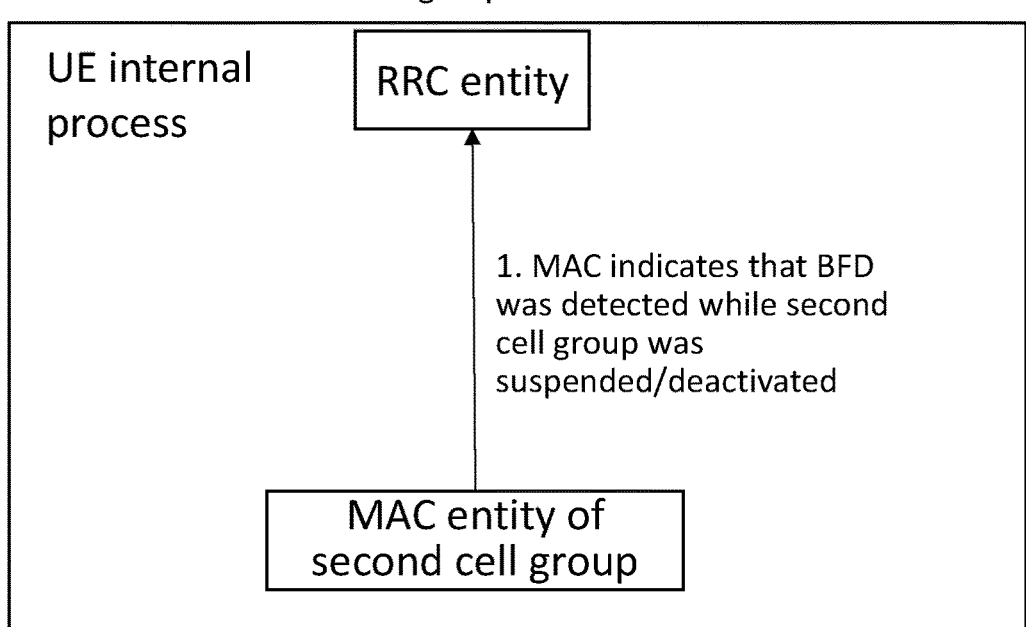

UE internal process

RRC entity

1. MAC indicates that BFD was detected while second cell group was suspended/deactivated MAC entity of second cell group

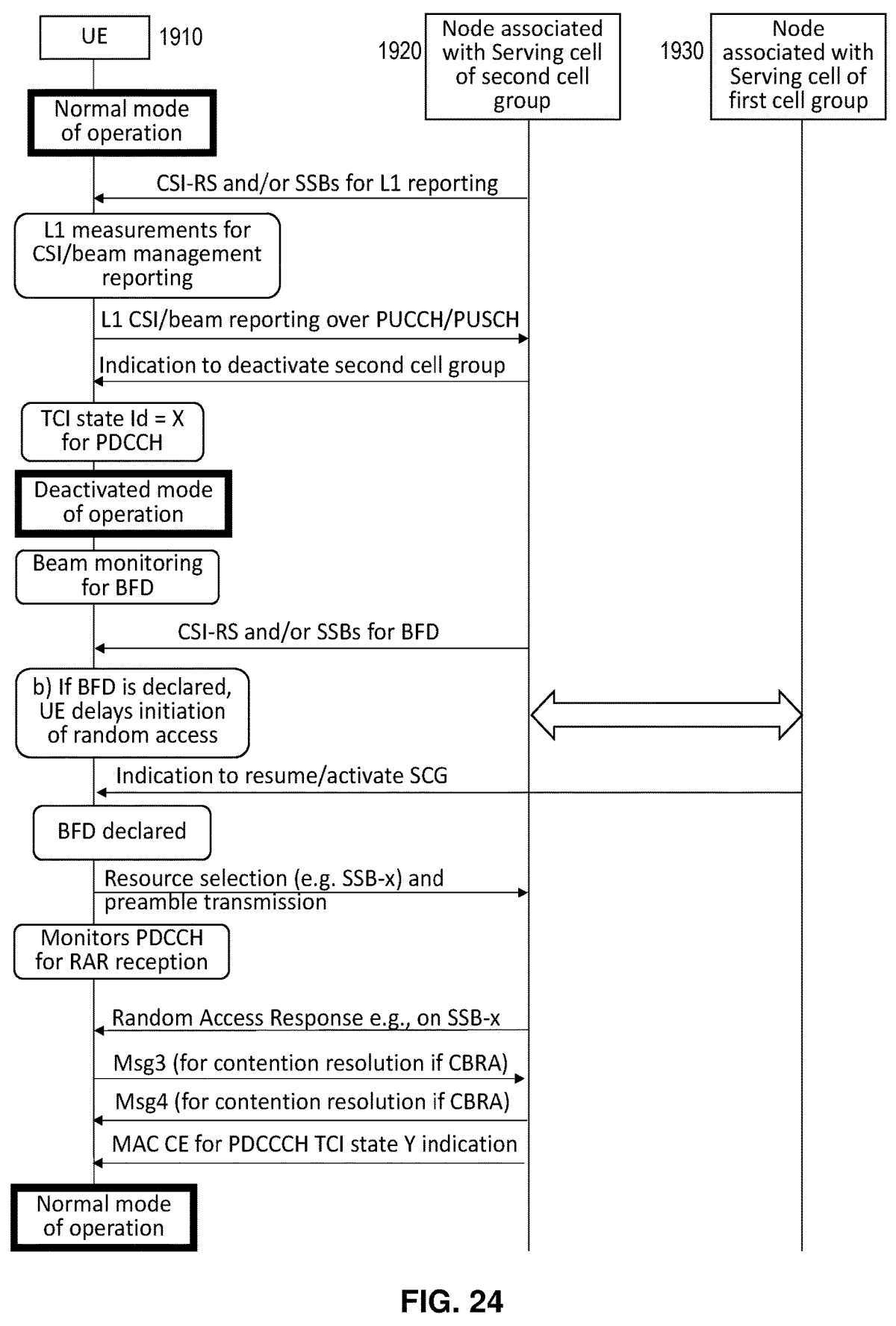

| UE | 1910 | | 1920 | Node associated with Serving cell of second cell group | | 1930 | Node associated with Serving cell of first cell group |

Normal mode of operation

← CSI-RS and/or SSBs for L1 reporting

L1 measurements for CSI/beam management reporting

L1 CSI/beam reporting over PUCCH/PUSCH →

← Indication to deactivate second cell group

TCI state Id = X for PDCCH

Deactivated mode of operation

Beam monitoring for BFD

← CSI-RS and/or SSBs for BFD b) If BFD is declared, UE delays initiation of random access ← Indication to resume/activate SCG BFD declared Resource selection (e.g. SSB-x) and preamble transmission →

Monitors PDCCH for RAR reception

← Random Access Response e.g., on SSB-x

Msg3 (for contention resolution if CBRA) →

← Msg4 (for contention resolution if CBRA)

← MAC CE for PDCCCH TCI state Y indication

Normal mode of operation

FIG. 24

```
-- ASN1START
-- TAG-SCGFAILUREINFORMATION-START
SCGFailureInformation ::=        SEQUENCE {
    criticalExtensions                CHOICE {
        scgFailureInformation         SCGFailureInformation-IEs,
        criticalExtensionsFuture      SEQUENCE {}
    }
}
SCGFailureInformation-IEs ::= SEQUENCE {
    failureReportSCG              FailureReportSCG              OPTIONAL,
    nonCriticalExtension          SCGFailureInformation-v1590-IEs   OPTIONAL
}
(...)
FailureReportSCG ::=         SEQUENCE {
    failureType                 ENUMERATED{t310-Expiry, randomAccessProblem,
                                    rlc-MaxNumRetx, synchReconfigFailureSCG,
                                    scg-ReconfigFailure, srb3-IntegrityFailure,
                                    other-r16, BFD},
    measResultFreqList          MeasResultFreqList               OPTIONAL,
    measResultSCG-Failure       OCTET STRING (CONTAINING MeasResultSCG-Failure)
                                                                 OPTIONAL,
    ...,
    [[
    locationInfo-r16            LocationInfo-r16                 OPTIONAL,
    failureType-v1610           ENUMERATED {scg-lbtFailure-r16,
                                        beamFailureRecoveryFailure-r16,
                                        t312-Expiry-r16, bh-RLF-r16, spare4,
                                        spare3,spare2, spare1}   OPTIONAL
    ]]
}
(...)
-- TAG-SCGFAILUREINFORMATION-STOP
-- ASN1STOP
```

FIG. 26A

```
-- ASN1START
SCGFailureInformationNR-r15 ::=     SEQUENCE {
    criticalExtensions                CHOICE {
        c1                            CHOICE {
            scgFailureInformationNR-r15         SCGFailureInformationNR-r15-IEs,
            spare3 NULL, spare2 NULL, spare1 NULL
        },
        criticalExtensionsFuture      SEQUENCE {}
    }
}
SCGFailureInformationNR-r15-IEs ::= SEQUENCE {
    failureReportSCG-NR-r15       FailureReportSCG-NR-r15          OPTIONAL,
    nonCriticalExtension          SCGFailureInformationNR-v1590-IEs OPTIONAL
}
SCGFailureInformationNR-v1590-IEs ::=   SEQUENCE {
    lateNonCriticalExtension          OCTET STRING                 OPTIONAL,
    nonCriticalExtension              SEQUENCE {}
    OPTIONAL
}
FailureReportSCG-NR-r15 ::=  SEQUENCE {
    failureType-r15               ENUMERATED {
                                    t310-Expiry, randomAccessProblem,
                                    rlc-MaxNumRetx, synchReconfigFailureSCG,
                                    scg-reconfigFailure, srb3-IntegrityFailure,
                                    other-r16 },
    measResultFreqListNR-r15      MeasResultFreqListFailNR-r15        OPTIONAL,
    measResultSCG-r15             OCTET STRING                        OPTIONAL,
(...)
    ]],
    [[ failureType-v17xx          ENUMERATED {BFD-v17xx}              OPTIONAL
    ]]
}
(...)
-- ASN1STOP
```

FIG. 26B

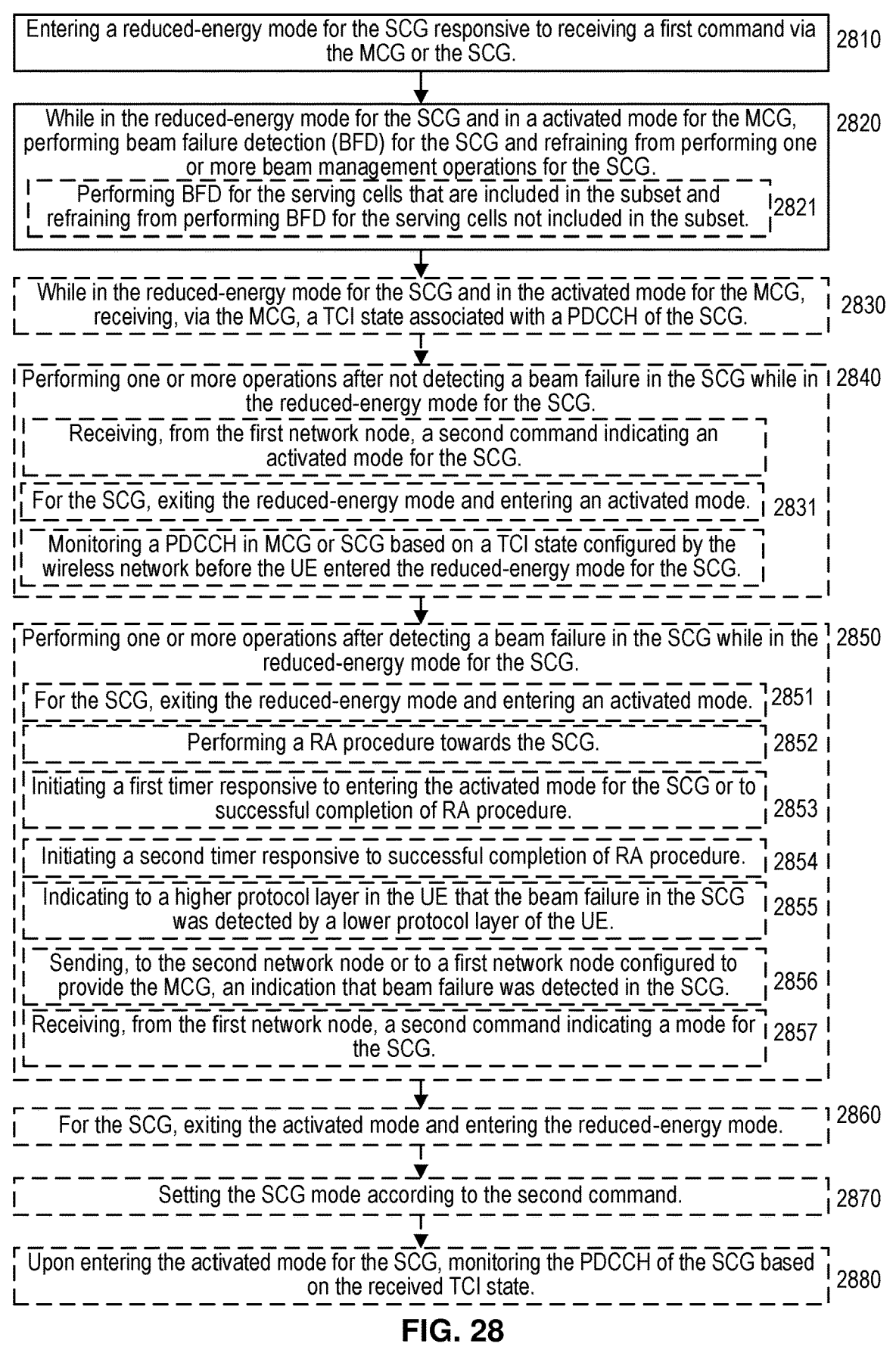

Entering a reduced-energy mode for the SCG responsive to receiving a first command via the MCG or the SCG. — 2810

While in the reduced-energy mode for the SCG and in a activated mode for the MCG, performing beam failure detection (BFD) for the SCG and refraining from performing one or more beam management operations for the SCG. — 2820

Performing BFD for the serving cells that are included in the subset and refraining from performing BFD for the serving cells not included in the subset. — 2821

While in the reduced-energy mode for the SCG and in the activated mode for the MCG, receiving, via the MCG, a TCI state associated with a PDCCH of the SCG. — 2830

Performing one or more operations after not detecting a beam failure in the SCG while in the reduced-energy mode for the SCG. — 2840

Receiving, from the first network node, a second command indicating an activated mode for the SCG.

For the SCG, exiting the reduced-energy mode and entering an activated mode. — 2831

Monitoring a PDCCH in MCG or SCG based on a TCI state configured by the wireless network before the UE entered the reduced-energy mode for the SCG.

Performing one or more operations after detecting a beam failure in the SCG while in the reduced-energy mode for the SCG. — 2850

For the SCG, exiting the reduced-energy mode and entering an activated mode. — 2851

Performing a RA procedure towards the SCG. — 2852

Initiating a first timer responsive to entering the activated mode for the SCG or to successful completion of RA procedure. — 2853

Initiating a second timer responsive to successful completion of RA procedure. — 2854

Indicating to a higher protocol layer in the UE that the beam failure in the SCG was detected by a lower protocol layer of the UE. — 2855

Sending, to the second network node or to a first network node configured to provide the MCG, an indication that beam failure was detected in the SCG. — 2856

Receiving, from the first network node, a second command indicating a mode for the SCG. — 2857

For the SCG, exiting the activated mode and entering the reduced-energy mode. — 2860

Setting the SCG mode according to the second command. — 2870

Upon entering the activated mode for the SCG, monitoring the PDCCH of the SCG based on the received TCI state. — 2880

FIG. 28

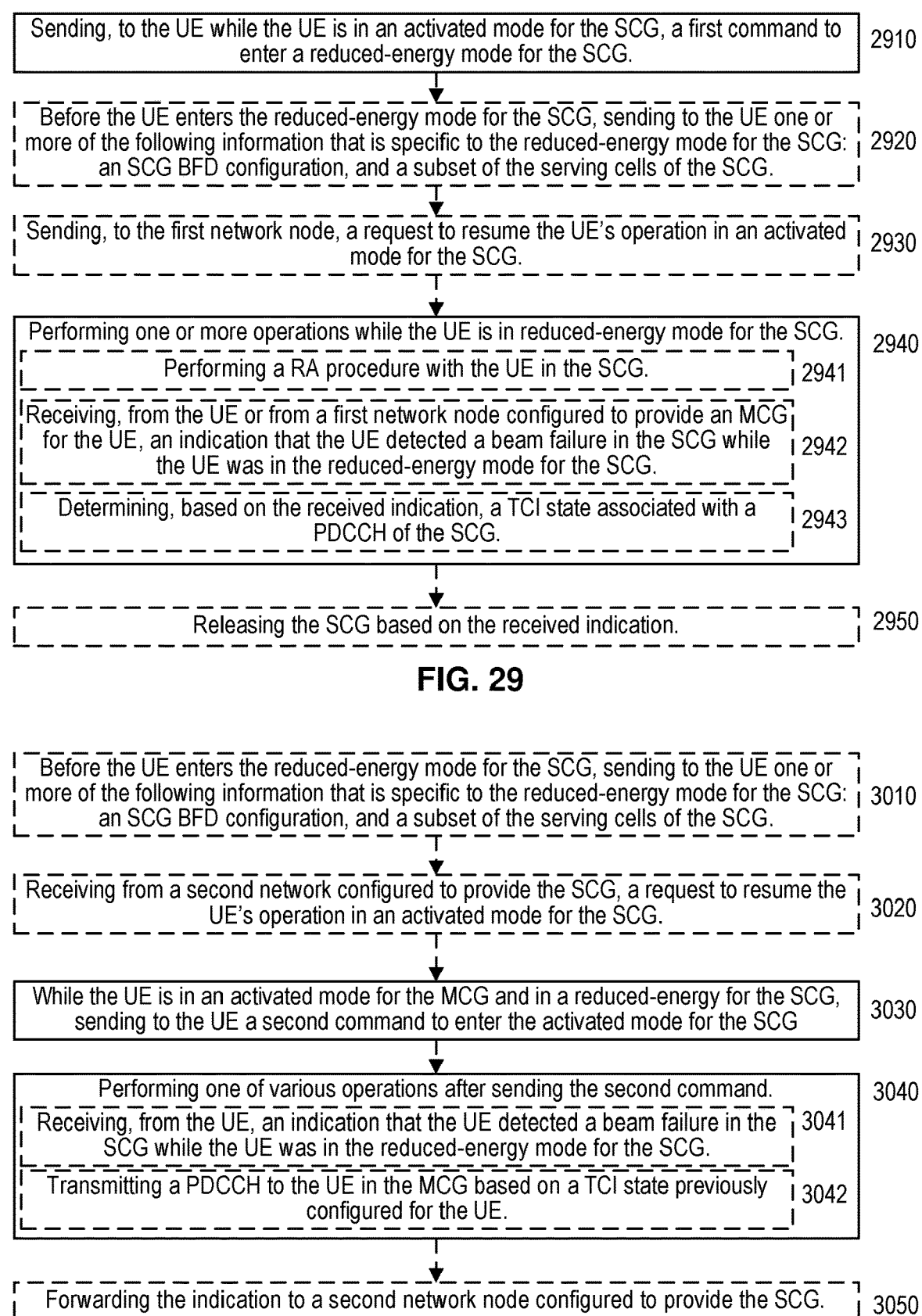

Sending, to the UE while the UE is in an activated mode for the SCG, a first command to enter a reduced-energy mode for the SCG.     2910

Before the UE enters the reduced-energy mode for the SCG, sending to the UE one or more of the following information that is specific to the reduced-energy mode for the SCG: an SCG BFD configuration, and a subset of the serving cells of the SCG.     2920

Sending, to the first network node, a request to resume the UE's operation in an activated mode for the SCG.     2930

Performing one or more operations while the UE is in reduced-energy mode for the SCG.     2940

Performing a RA procedure with the UE in the SCG.     2941

Receiving, from the UE or from a first network node configured to provide an MCG for the UE, an indication that the UE detected a beam failure in the SCG while the UE was in the reduced-energy mode for the SCG.     2942

Determining, based on the received indication, a TCI state associated with a PDCCH of the SCG.     2943

Releasing the SCG based on the received indication.     2950

FIG. 29

Before the UE enters the reduced-energy mode for the SCG, sending to the UE one or more of the following information that is specific to the reduced-energy mode for the SCG: an SCG BFD configuration, and a subset of the serving cells of the SCG.     3010

Receiving from a second network configured to provide the SCG, a request to resume the UE's operation in an activated mode for the SCG.     3020

While the UE is in an activated mode for the MCG and in a reduced-energy for the SCG, sending to the UE a second command to enter the activated mode for the SCG     3030

Performing one of various operations after sending the second command.     3040

Receiving, from the UE, an indication that the UE detected a beam failure in the SCG while the UE was in the reduced-energy mode for the SCG.     3041

Transmitting a PDCCH to the UE in the MCG based on a TCI state previously configured for the UE.     3042

Forwarding the indication to a second network node configured to provide the SCG.     3050

FIG. 30

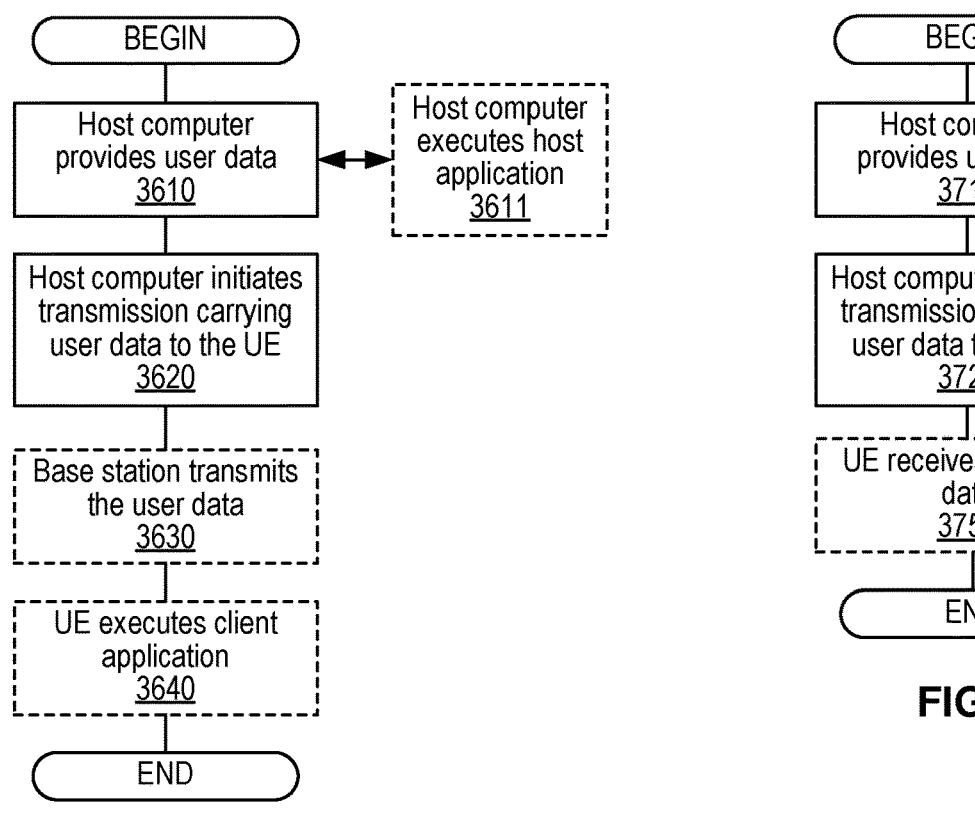
FIG. 36
FIG. 37
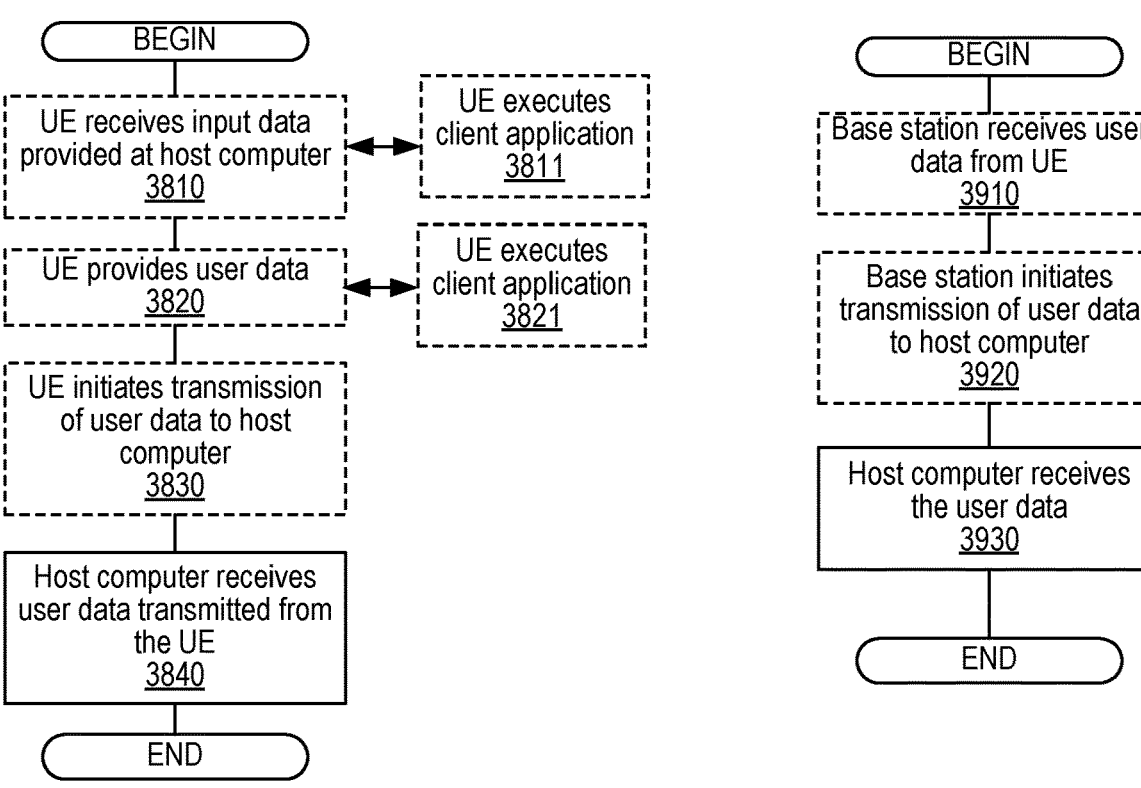
FIG. 38
FIG. 39

BEAM FAILURE DETECTION AND RECOVERY FOR DEACTIVATED SECONDARY CELL GROUP (SCG)

TECHNICAL FIELD

The present disclosure generally relates to wireless communication networks and more specifically relates to techniques that reduce the energy consumed by a user equipment (UE) when connected to multiple cell groups in a wireless network, particularly when one of the cell groups is in a deactivated state.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of CA, in which the aggregated carriers (or cells) are provided by network nodes that are physically separated and not connected via a robust, high-capacity connection.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC-_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

Each of the CGs includes one MAC entity, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical UL control channel (PUCCH) transmission and contention-based random access by UEs.

In general, an NR UE needs to continuously monitor a physical DL control channel (PDCCH) for UL grants and DL scheduling assignments on PCell, PSCell, and potentially all other SCells if cross carrier scheduling is not used.

Even if cross carrier scheduling is used, the UE must perform extra PDCCH monitoring on PCell or PSCell for the SCell, depending on whether the SCell belongs to MCG or SCG.

In order to improve network energy efficiency and battery life for UEs in MR-DC, 3GPP Rel-17 includes a work item for efficient SCG/SCell activation/deactivation. This can be especially important for MR-DC configurations with NR SCG since, in some cases, NR UE energy consumption is three-to-four times higher than in LTE.

SUMMARY

However, if the UE's SCG is deactivated (or, more generally, in a reduced-energy mode such as SCG suspended, SCG dormant, etc.) then the UE may stop monitoring PDCCH for PSCell and SCell of the SCG. This can cause various problems, issues, and/or difficulties for the UE's beam management in the SCG, including beam failure detection and recovery.

Embodiments of the present disclosure provide specific improvements to beam management for UEs operating in a wireless network, such as by facilitating solutions to overcome exemplary problems summarized above and described in more detail below.

Embodiments of the present disclosure include methods (e.g., procedures) for a UE configured to communicate with a wireless network via an MCG and an SCG. These exemplary methods can include entering a reduced-energy mode for the SCG responsive to receiving a first command via the MCG or the SCG. These exemplary methods can also include, while in the reduced-energy mode for the SCG and in an activated mode for the MCG, performing beam failure detection (BFD) for the SCG and refraining from performing one or more beam management operations for the SCG.

In some embodiments, performing BFD for the SCG while in the reduced-energy mode for the SCG is based on one or more of the following:

continuing BFD for the SCG that was being performed before receiving the first command;
an SCG BFD configuration specific to the reduced-energy mode for the SCG;
a subset of the serving cells of the SCG, the subset being configured by the wireless network; and
resetting one or more timers or counters, related to SCG BFD, that were running before receiving the first command.

In some of these embodiments, performing BFD for the SCG while in the reduced-energy mode for the SCG includes performing BFD for the serving cells that are included in the subset and refraining from performing BFD for the serving cells of the SCG that are not included in the subset.

In some embodiments, the one or more beam management operations for the SCG (i.e., which the UE refrains from performing) include any of the following: performing layer-1 (L1) measurements of beams associated with the SCG; and reporting L1 measurements performed on beams associated with the SCG.

In some embodiments, the exemplary method can also include performing one or more operations after detecting a beam failure in the SCG while in the reduced-energy mode for the SCG, the one or more operations including any of the following:

exiting the reduced-energy mode for the SCG and entering an activated mode for the SCG;

performing a random access (RA) procedure towards the SCG;

indicating to a higher protocol layer in the UE that the beam failure in the SCG was detected by a lower protocol layer of the UE;

sending, to the second network node or to a first network node configured to provide the MCG, an indication that beam failure was detected in the SCG; and receiving, from the first network node, a second command indicating a mode for the SCG.

In some of these embodiments, the RA procedure is initiated for beam failure recovery and is responsive to detecting the beam failure associated with the SCG; the second command is received after completing the RA procedure and indicates the activated mode for the SCG; and entering the activated mode for the SCG is responsive to the second command.

In some variants, these exemplary methods can also include the following: while in the reduced-energy mode for the SCG and in the activated mode for the MCG, receiving via the MCG a TCI state associated with a PDCCH of the SCG; and upon entering the activated mode for the SCG, monitoring the PDCCH of the SCG based on the received TCI state. In some further variants, the received TCI state is different than a most recent TCI state associated with the PDCCH of the SCG, the most recent TCI state being received before entering the reduced-energy mode for the SCG.

In other of these embodiments, entering the activated mode for the SCG is responsive to detecting the beam failure in the SCG, and performing the RA procedure towards the SCG is responsive to entering the activated mode for the SCG. In some variants, these exemplary methods can also include one of the following: exiting the activated mode for the SCG and entering the reduced-energy mode for the SCG; or setting the SCG mode according to the second command (i.e., when received).

In further variants, the one or more operations performed after detecting a beam failure in the SCG while in the reduced-energy mode for the SCG include initiating a first timer responsive to either entering the activated mode for the SCG or successful completion of the RA procedure. In such variants, exiting the activated mode for the SCG and entering the reduced-energy mode for the SCG are responsive to expiration of the first timer without receiving the second command.

In other of these embodiments, performing the RA procedure towards the SCG is for beam failure recovery and is responsive to detecting the beam failure associated with the SCG. Also, the one or more operations performed after detecting a beam failure in the SCG while in the reduced-energy mode for the SCG include initiating a second timer responsive to successful completion of the RA procedure. In such variants, entering the activated mode for the SCG is responsive to expiration of the second timer without receiving the second command.

In other of these embodiments, performing the RA procedure towards the SCG is responsive to receiving the second command, which indicates the activated mode for the SCG. Also, exiting the reduced-energy mode for the SCG and entering an activated mode for the SCG is responsive to successful completion of the RA procedure.

In some variants of these and certain other embodiments, the RA procedure towards the SCG is initiated by the higher protocol layer of the UE based on the indication that the beam failure was detected by the lower protocol layer of the UE.

In some of these embodiments, the indication that the beam failure was detected in the SCG is sent to the second network node during the RA procedure towards the SCG and performing the RA procedure towards the SCG includes receiving, via the SCG, a TCI state associated with a PDCCH of the SCG. In such embodiments, the TCI state is based on the indication that the beam failure was detected in the SCG. In some variants, the indication that the beam failure was detected in the SCG is sent as a MAC CE via a logical channel that is associated with BFR for an SCG in reduced-energy mode.

In other of these embodiments, sending the first network node the indication that a beam failure was detected in the SCG is responsive to receiving the second command, which indicates the activated mode for the SCG. Also, performing the RA procedure towards the SCG is responsive to sending the indication, and exiting the reduced-energy mode for the SCG and entering an activated mode for the SCG is responsive to successful completion of the RA procedure towards the SCG. In some variants, the indication is sent to the first network node as one of the following:

an SCG failure information field in an RRC message, the field having a particular value that indicates beam failure;

a MAC CE via a logical channel associated with SCG beam failure reporting (BFR); and a MAC CE that is associated with BFR and that includes an identifier of the SCG.

In some of these embodiments, the RA procedure performed towards the SCG for BFR is different than one or more of the following:

a first RA procedure performed towards the SCG after not detecting a beam failure in the SCG while in the reduced-energy mode for the SCG; and a second RA procedure performed towards the SCG while in the activated mode for the SCG.

In some embodiments, these exemplary methods can also include perform one or more operations after not detecting a beam failure in the SCG while in the reduced-energy mode for the SCG, the one or more operations including any of the following:

receiving, from the first network node, a second command indicating an activated mode for the SCG;

exiting the reduced-energy mode for the SCG and entering the activated mode for the SCG; and monitoring a PDCCH in the MCG or in the SCG based on a TCI state configured by the wireless network before the UE entered the reduced-energy mode for the SCG.

In some variants, exiting the reduced-energy mode for the SCG and entering a connected mode for the SCG is responsive to receiving the second command, and monitoring the PDCCH in the MCG is responsive to receiving the second command.

Other embodiments include methods (e.g., procedures) for a second network node configured to provide an SCG for a UE in a wireless network. These exemplary methods can include sending, to the UE while the UE is in an activated mode for the SCG, a first command to enter a reduced-energy mode for the SCG. These exemplary methods can also include performing one or more operations while the UE is in the reduced-energy mode for the SCG, the one or more operations including any of the following:

performing a RA procedure with the UE in the SCG; and receiving, from the UE or from a first network node configured to provide an MCG for the UE, an indication that the UE detected a beam failure in the SCG while the UE was in the reduced-energy mode for the SCG.

In some embodiments, the indication is received from the UE during the RA procedure towards the SCG. In such embodiments, the one or more operations performed while the UE is in the reduced-energy mode for the SCG include determining, based on the indication, a TCI state associated with a PDCCH of the SCG. In such embodiments, performing the RA procedure comprises sending the TCI state to the UE. In some variants, the indication that the beam failure was detected in the SCG is received as a MAC CE via a logical channel that is associated with BFR for an SCG in reduced-energy mode.

In other embodiments, the indication is received from the first network node and the exemplary method can also include releasing the SCG based on the received indication.

In other embodiments, these exemplary methods can also include sending, to the first network node, a request to resume the UE's operation in an activated mode for the SCG. The indication is received from the first network node in response to the request.

In some embodiments, these exemplary methods can also include, before the UE enters the reduced-energy mode for the SCG, sending to the UE one or more of the following information that is specific to the reduced-energy mode for the SCG: an SCG BFD configuration, and a subset of the serving cells of the SCG. In such embodiments, the indicated beam failure detection in the SCG is based on the information specific to the reduced-energy mode for the SCG (i.e., the SCG BFD configuration and/or the subset of serving cells. In some variants, one of more of the following applies:
  the SCG BFD configuration includes the subset of the serving cells of the SCG;
  only the subset should be monitored for BFD while the UE is in the reduced-energy mode for the SCG; and
  the SCG BFD configuration is sent with the first command.

Other embodiments include methods (e.g., procedures) for a first network node configured to provide an MCG for a UE in a wireless network. These exemplary methods can include, while the UE is in an activated mode for the MCG and in a reduced-energy for an SCG, sending the UE a second command to enter the activated mode for the SCG. These exemplary methods can also include performing one or more operations while the UE is in the reduced-energy mode for the SCG, the one or more operations including any of the following:
  receiving from the UE an indication that the UE detected a beam failure in the SCG while the UE was in the reduced-energy mode for the SCG; and
  transmitting a PDCCH to the UE in the MCG based on a TCI state previously configured for the UE.

In some embodiments, these exemplary methods can also include forwarding the indication to a second network node configured to provide the SCG.

In some embodiments, the indication is received from the UE as one of the following:
  an SCG failure information field in an RRC message, the field having a particular value that indicates beam failure;
  a MAC CE via a logical channel associated with SCG BFR; and
  a MAC CE that is associated with BFR and that includes an identifier of the SCG.

In some embodiments, the TCI state was previously configured by a second network node configured to provide the SCG, during one of the following: before the UE entered the reduced-energy mode for the SCG, or while the UE was in the reduced-energy mode for the SCG.

In some embodiments, these exemplary methods can also include receiving, from a second network node configured to provide the SCG, a request to resume the UE's operation in an activated mode for the SCG. The second command is sent in response to the request.

In some embodiments, these exemplary methods can also include, before the UE enters the reduced-energy mode for the SCG, sending to the UE one or more of the following information that is specific to the reduced-energy mode for the SCG: an SCG BFD configuration, and a subset of the serving cells of the SCG. In such embodiments, the indicated beam failure detection in the SCG is based on the information specific to the reduced-energy mode for the SCG. In some variants, one or more of the following applies:
  the SCG BFD configuration includes the subset of the serving cells of the SCG;
  only the subset should be monitored for BFD while the UE is in the reduced-energy mode for the SCG; and
  the SCG BFD configuration is sent with a first command for the UE to enter the reduced-energy mode for the SCG.

Other embodiments include UEs (e.g., wireless devices, IoT devices, etc. or component(s) thereof) or network nodes (e.g., base stations, eNBs, gNBs, ng-eNBs, en-gNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can facilitate reduction of UE energy consumption by not requiring the UE to report CSI and/or L1 beam measurements for deactivated SCG, while preserving a degree of beam alignment for SCG re-activation. Because the UE performs beam monitoring for BFD, the UE can trigger random access when needed upon SCG re-activation, which reduces resume latency so long as BFD was not detected while the SCG was deactivated. Certain embodiments also facilitate UE readiness for SCG re-activation the UE performing BFR to established beam alignment while the SCG is deactivated.

These and other objects, features, and advantages of embodiments of the present disclosure will become apparent upon reading the following Detailed Description in view of the Drawings briefly described below.

BRIEF DESCRIPTION OF THE DRAWINGS

FIG. 10 shows an exemplary frequency-domain configuration for an NR UE.

FIG. 11 shows an exemplary time-frequency resource grid for an NR slot.

FIG. 12 shows an exemplary structure of a CellGroup-Config information element (IE).

FIGS. 13A-D show ASN.1 data structures for various exemplary IEs or fields used for TCI state configuration.

FIGS. 14A-C illustrate various aspects of how TCI states are configured and/or activated.

FIGS. 15A-B show ASN.1 data structures for exemplary RadioLinkMonitoringConfig and SpCellConfig IEs, respectively.

FIG. 16 show an ASN.1 data structure for an exemplary BeamFailureRecoveryConfig IE.

FIG. 17 is an exemplary state transition diagram for NR SCells.

FIGS. 19-21, 24-25, and 27 are signal flow diagrams between a UE and network nodes associated with the UE's MCG and SCG, according to various embodiments of the present disclosure.

FIGS. 22-23 illustrate various UE-internal signaling between a MAC entity and an RRC entity, according to various embodiments of the present disclosure.

FIG. 26, which includes FIGS. 26A-B, shows ASN.1 data structures for exemplary RRC IEs usable for reporting beam failure in a deactivated SCG, according to various embodiments of the present disclosure.

FIG. 27 shows a signal flow diagram that illustrate certain embodiments, particularly for the case of inter-cell group reporting of BFD.

FIG. 28 is a flow diagram of an exemplary method (e.g., procedure) for a UE (e.g., wireless device, IoT device, etc. or component(s) thereof), according to various embodiments of the present disclosure.

FIG. 29 is a flow diagram of an exemplary method (e.g., procedure) for a second network node (e.g., base station, eNB, gNB, ng-eNB, en-gNB, etc.) in a wireless network (e.g., E-UTRAN, NG-RAN), according to various embodiments of the present disclosure.

FIG. 30 is a flow diagram of an exemplary method (e.g., procedure) for a first network node (e.g., base station, eNB, gNB, ng-eNB, en-gNB, etc.) in a wireless network (e.g., E-UTRAN, NG-RAN), according to various embodiments of the present disclosure.

FIGS. 36-39 are flow diagrams of exemplary methods (e.g., procedures) for transmission and/or reception of user data, according to various embodiments of the present disclosure.

DETAILED DESCRIPTION

Figure 1:
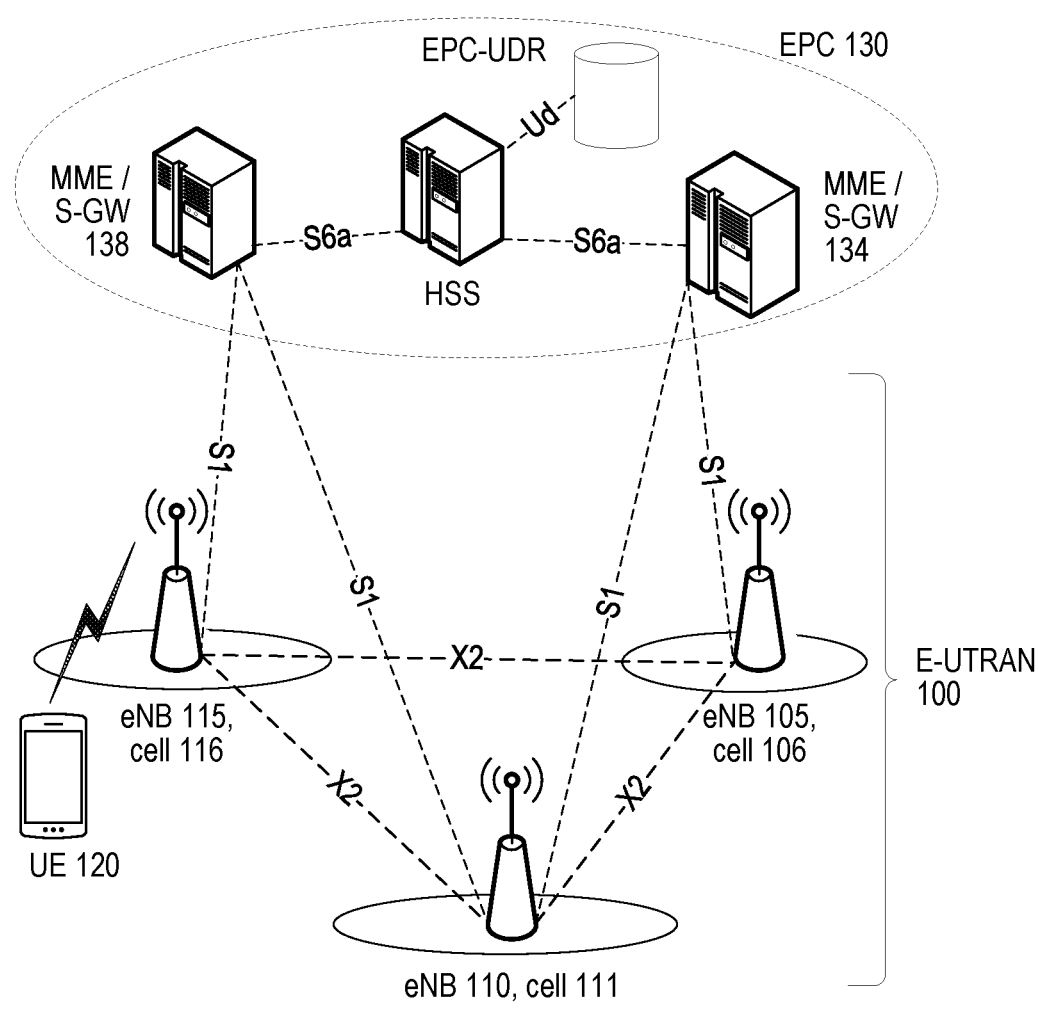
FIG. 1 is a high-level block diagram of an exemplary LTE network architecture.
Figure 2:
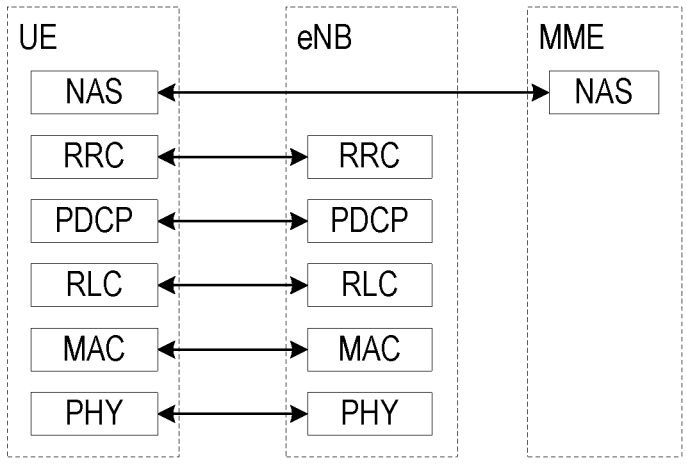
FIG. 2 shows exemplary LTE control plane (CP) protocol layers.

Embodiments summarized above will now be described more fully with reference to the accompanying drawings.

Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, if a UE's SCG is deactivated (or, more generally, in a reduced-energy mode such as SCG suspended, SCG dormant, etc.) then the UE may stop monitoring PDCCH for PSCell and SCell of the SCG. This can cause various problems, issues, and/or difficulties for the UE's beam management in the SCG, including beam failure detection and beam failure recovery. This is discussed in more detail below, after the following description of NR network architecture and various dual connectivity (DC) arrangements.

Figure 3:
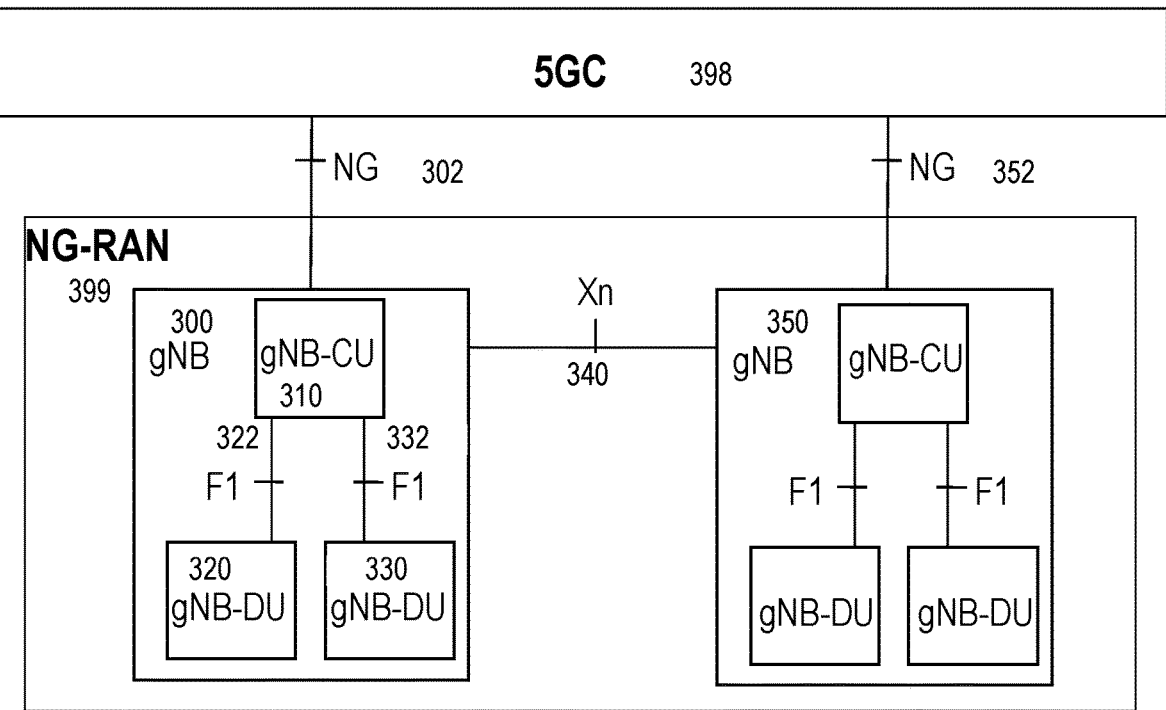
FIG. 3 shows a high-level views of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 3GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 4:
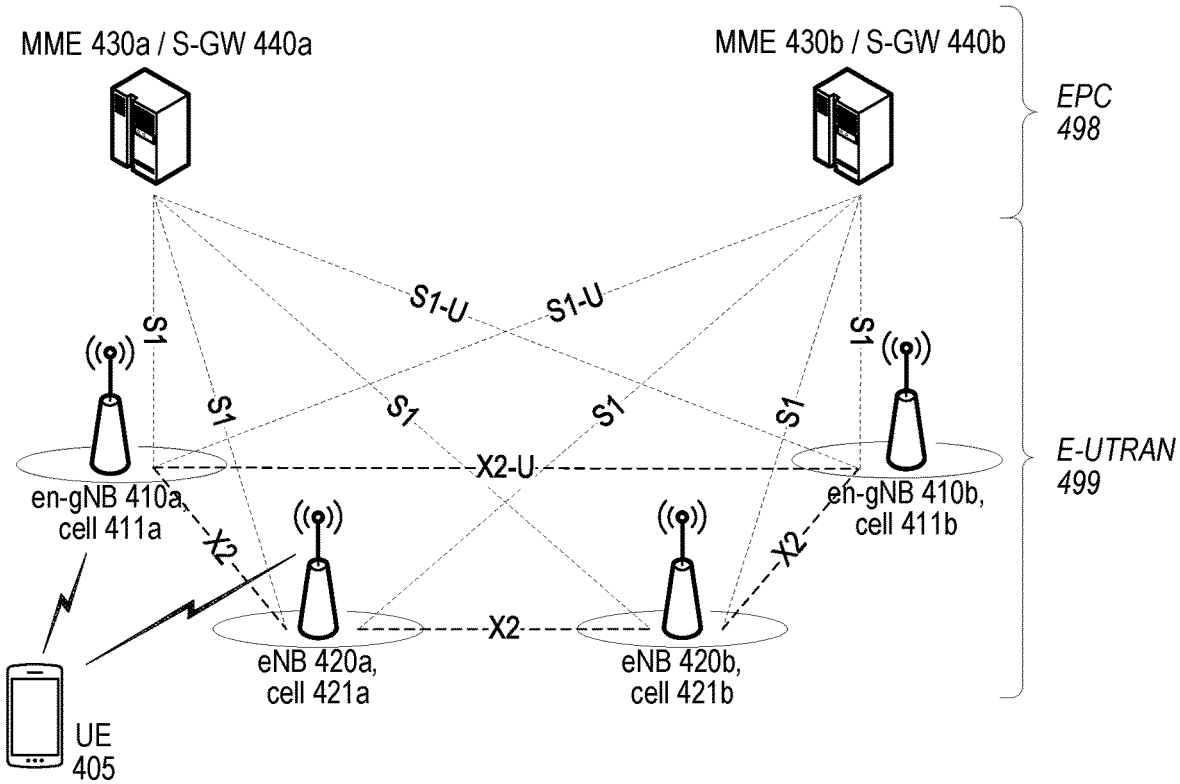
FIGS. 4-5 show high-level views of exemplary network architectures that support multi-RAT DC (MR-DC) using EPC and 5GC, respectively.

FIG. 4 shows a high-level view of an exemplary network architecture that supports EN-DC, including an E-UTRAN 499 and an EPC 498. As shown in the figure, E-UTRAN 499 can include en-gNBs 410 (e.g., 410a,b) and eNBs 420 (e.g., 420a,b) that are interconnected with each other via respective X2 (or X2-U) interfaces. The eNBs 420 can be similar to those shown in FIG. 1, while the ng-eNBs can be similar to the gNBs shown in FIG. 3 except that they connect to EPC 498 via an S1-U interface rather than to a 5GC via an X2 interface. The eNBs also connect to EPC 498 via an S1 interface, similar to the arrangement shown in FIG. 1. More specifically, en-gNBs 410 (e.g., 410*a,b*) and eNBs 420 (e.g., 420*a,b*) connect to MMEs (e.g., MMEs 430*a,b*) and S-GWs (e.g., S-GWs 440*a,b*) in EPC 498.

Each of the en-gNBs and eNBs can serve a geographic coverage area including one more cells, including cells 411*a-b* and 421*a-b* shown as exemplary in FIG. 4. Depending on the particular cell in which it is located, a UE 405 can communicate with the en-gNB or eNB serving that particular cell via the NR or LTE radio interface, respectively. In addition, UE 405 can be in EN-DC connectivity with a first cell served by an eNB and a second cell served by an en-gNB, such as cells 420*a* and 410*a* shown in FIG. 4.

As briefly mentioned above, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC-_CONNECTED state.

Figure 5:
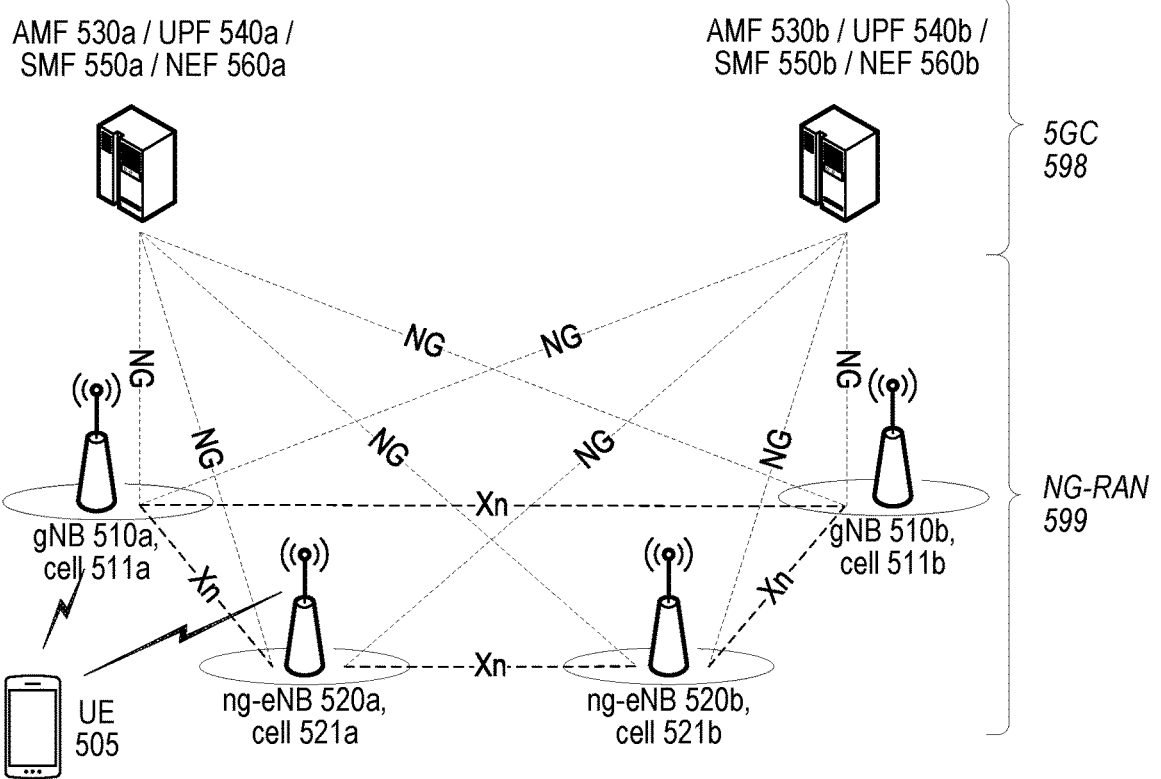

FIG. 5 shows a high-level view of an exemplary network architecture that supports MR-DC configurations based on a 5GC. More specifically, FIG. 5 shows an NG-RAN 599 and a 5GC 598. NG-RAN 599 can include gNBs 510 (e.g., 510*a,b*) and ng-eNBs 520 (e.g., 520*a,b*) that are interconnected with each other via respective Xn interfaces. The gNBs and ng-eNBs are also connected via the NG interfaces to 5GC 598, more specifically to the AMF (Access and Mobility Management Function) 530 (e.g., AMFs 530*a,b*) via respective NG-C interfaces and to the UPF (User Plane Function) 540 (e.g., UPFs 540*a,b*) via respective NG-U interfaces. Moreover, the AMFs 530*a,b* can communicate with one or more session management functions (SMFs, e.g., SMFs 550*a,b*) and network exposure functions (NEFs, e.g., NEFs 560*a,b*).

Each of the gNBs 510 can be similar to those shown in FIG. 3, while each of the ng-eNBs can be similar to the eNBs shown in FIG. 1 except that they connect to 5GC 598 via an NG interface rather than to EPC via an S1 interface. Each of the gNBs and ng-eNBs can serve a geographic coverage area including one more cells, including cells 511*a-b* and 521*a-b* shown as exemplary in FIG. 5. The gNBs and ng-eNBs can also use various directional beams to provide coverage in the respective cells. Depending on the particular cell in which it is located, a UE 505 can communicate with the gNB or ng-eNB serving that particular cell via the NR or LTE radio interface, respectively. In addition, UE 505 can be in MR-DC connectivity with a first cell served by an ng-eNB and a second cell served by a gNB, such as cells 520*a* and 510*a* shown in FIG. 5.

Figure 6:
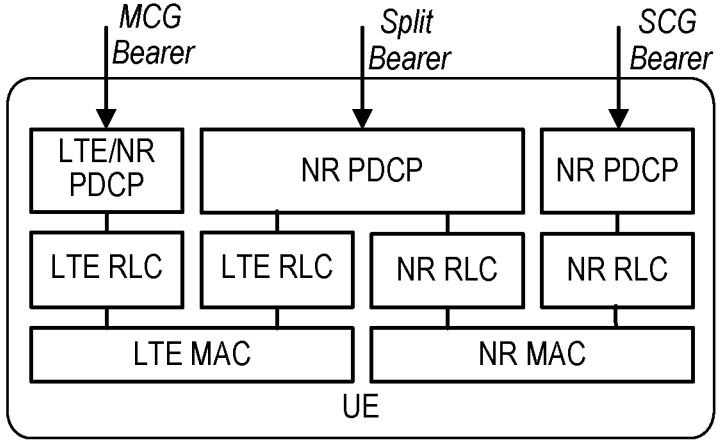
FIGS. 6-7 show user plane (UP) radio protocol architectures from a UE perspective for EN-DC with EPC and MR-DC with 5GC, respectively.
Figure 7:
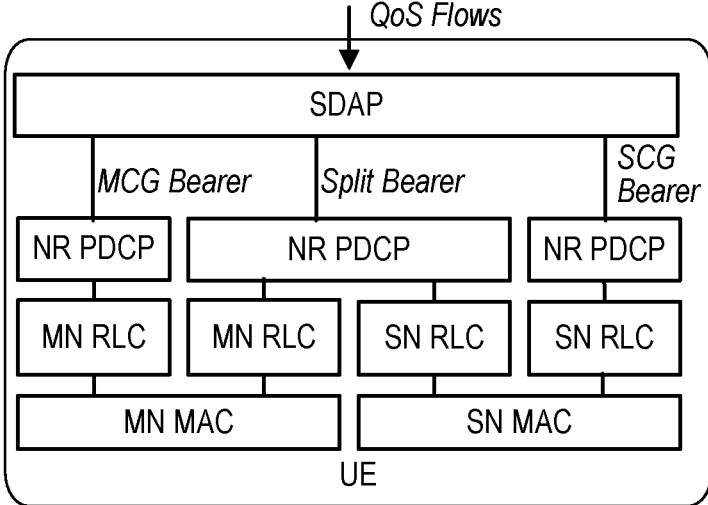

FIGS. 6-7 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. In the EN-DC arrangement shown in FIG. 6, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 7, all bearers have NR PDCP layers and lower layers corresponding to the RAT used by the MN and SN. One difference between the architectures in FIGS. 6-7 is that the various bearers for MR-DC with 5GC are associated with QoS flows that are terminated in an SDAP layer above PDCP.

Figure 8:
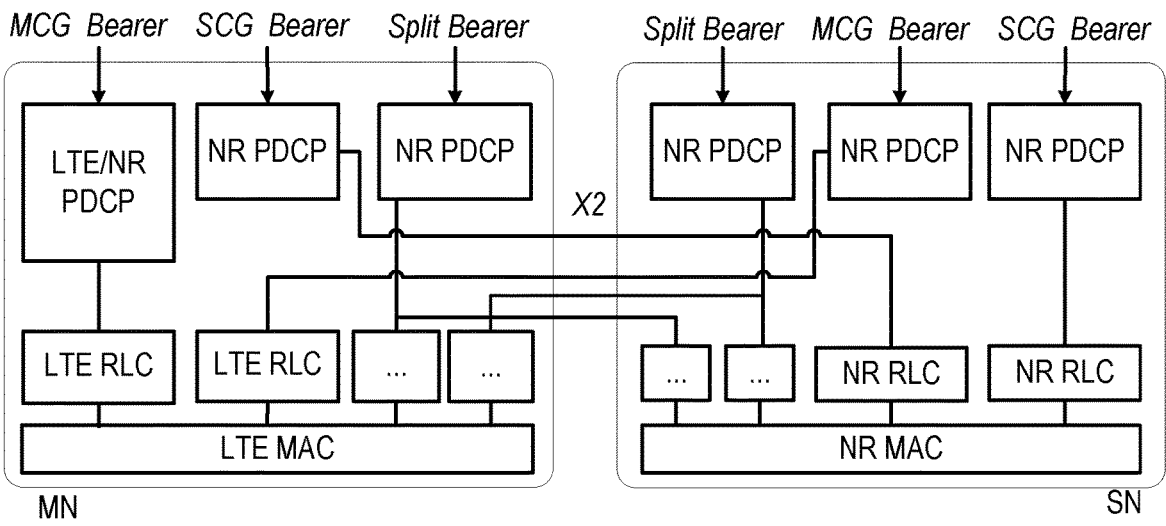
FIGS. 8-9 show UP radio protocol architectures from a network perspective for EN-DC with EPC and MR-DC with 5GC, respectively.
Figure 9:
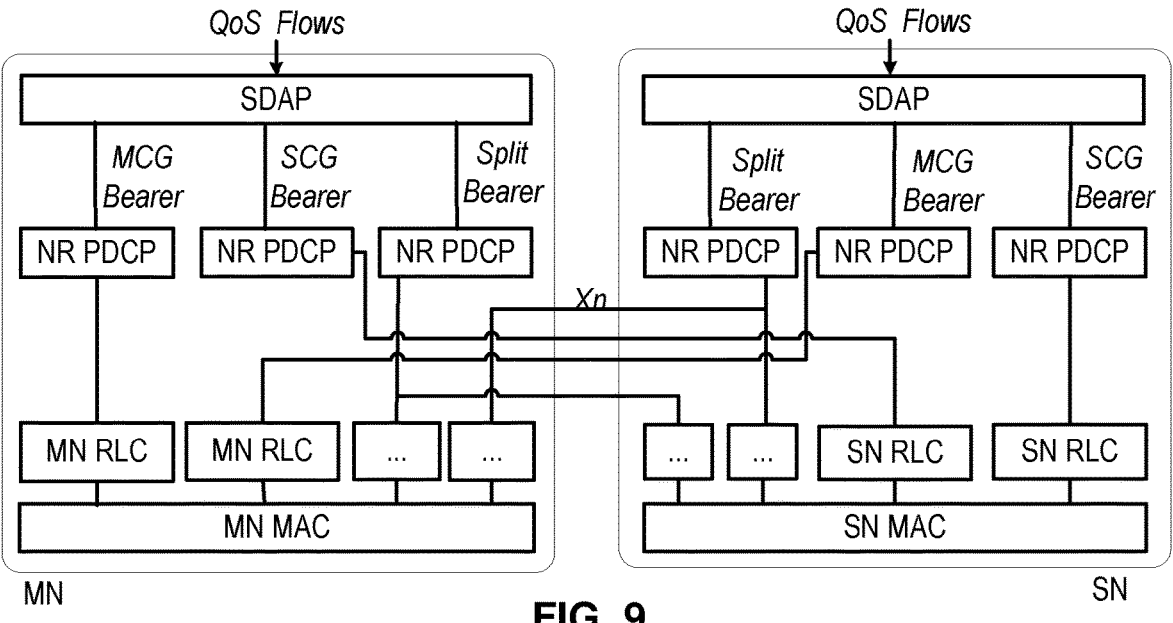

FIGS. 8-9 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 8, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 9, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 8-9 is that the various bearers for MR-DC with 5GC are associated with QoS flows that are terminated.

FIG. 10 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 10, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 10), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 10, BWPs 0-2 start at CRBs $N^0_{BWP}$, $N^1_{BWP}$, and $N^2_{BWP}$, respectively. Within a BWP, PRBs are defined and numbered in the frequency domain from 0 to $N_{BWPi}^{size}-$1, where i is the index of the particular BWP for the carrier. In the arrangement shown in FIG. 10, BWPs 0-2 include PRBs 0 to N1, N2, and N3, respectively.

Each NR resource element (RE) corresponds to one OFDM subcarrier during one OFDM symbol interval. NR supports various SCS values $\Delta f=(15\times2^{\mu})$ kHz, where $\mu\in(0, 1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP)

duration, and slot duration are inversely related to SCS or numerology. For example, there is one (1-ms) slot per subframe for Δf=15 kHz, two 0.5-ms slots per subframe for Δf=30 kHz, etc. In addition, the maximum carrier bandwidth is directly related to numerology according to $2^\mu*50$ MHz. Table 1 below summarizes the supported NR numerologies and associated parameters. Different DL and UL numerologies can be configured by the network.

TABLE 1

| μ | Δf = $2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

FIG. 11 shows an exemplary time-frequency resource grid for an NR slot. As illustrated in FIG. 11, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

In NR, the physical downlink control channel (PDCCH) is confined to a region containing a particular number of symbols and a particular number of subcarriers, referred to as the control resource set (CORESET). In general, a CORESET includes multiple RBs (i.e., multiples of 12 REs) in the frequency domain and 1-3 OFDM symbols in the time domain. The smallest unit used for defining CORESET is resource element group (REG), which spans one PRB in frequency and one OFDM symbol in time. CORESET resources can be indicated to a UE by RRC signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

Beam management was specified for NR in Rel-15. The feature is used to keep track of suitable beams for transmission and reception. Network nodes that use analog beamforming with fixed grid-of-beam transmission schemes typically monitor beam candidates continuously, e.g., by evaluating UE reports of layer-1 (L1) reference signal received power (RSRP) per beam. UEs perform such measurements on SSBs associated with the respective beams.

In general, the NR beam management framework allows the network to inform the UE about spatial relations between beams and to facilitate UE-side beam tracking. Before starting a random access channel (RACH) procedure towards the network, the UE measures on a set of SSBs and chooses a suitable one. The UE then transmits on the RACH resources associated with the selected SSB. The corresponding beam will be used by both the UE and the network to communicate until RRC_CONNECTED state beam management is active. The network infers which SSB beam was chosen by the UE without any explicit signaling. This procedure for finding an initial beam is often denoted P1.

The network can use the SSB beam as an indication of which (narrow) CSI-RS beams to try. For example, a candidate set of narrow CSI-RS beams for beam management is based on the best SSB beam. Once CSI-RS is transmitted, the UE measures RSRP and reports the result to the network. If the network receives a CSI-RSRP report from the UE that indicates a new CSI-RS beam is better than the beam used to transmit PDCCH/PDSCH, the network updates the serving beam for the UE accordingly, and possibly modifies the candidate set of CSI-RS beams. The network can also instruct the UE to perform measurements on SSBs. If the network receives a UE report indicating that a new SSB beam is better than the previous best SSB beam, a corresponding update of the candidate set of CSI-RS beams for the UE may be motivated. This refinement procedure is often referred to as P2.

Once in RRC_CONNNECTED state, the UE is configured with a set of reference signals. Based on beam management/L1 measurements, the UE determines which of its DL beams is suitable to receive each reference signal in the set. The network then indicates which reference signals are associated with the beam that will be used to transmit PDCCH/PDSCH, and the UE uses this information to adjust its DL beam when receiving PDCCH/PDSCH. PDCCH and PDSCH beams can be identical—if not, additional signaling is needed.

When the network has updated its serving DL transmit beam for the UE, the UE may need to update its corresponding DL receive beam. To accomplish this, the network repeatedly transmits CSI-RS on the new serving transmit beam while the UE varies its receive beam. The UE can then select the best receive beam and associate it with the measured reference signal. This procedure is often referred to as P3.

Several signals can be transmitted from the same base station (e.g., gNB) antenna from different antenna ports.

These signals can have the same large-scale properties, such as in terms of parameters including Doppler shift/spread, average delay spread, and/or average delay. These antenna ports are then said to be "quasi co-located" or "QCL". The network can signal to the UE that two antenna ports are QCL with respect to one or more parameters. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

Information about what assumptions can be made regarding QCL is signaled to the UE from the network. In NR, the following four types of QCL relations between a transmitted source RS and transmitted target RS are defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them. When a QCL relation is signaled to a UE, it includes not only information about the particular QCL type (e.g., A, B, C, or D), but also a serving cell index, a BWP index, and a source reference signal identity (CSI-RS, TRS or SSB).

QCL Type D is the most relevant for beam management, but it is also necessary to convey a Type A QCL RS relation to UEs so they can estimate all the relevant large scale parameters. Typically, this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

In other words, two signals are transmitted in the same direction or via the same downlink beams when these are QCL Type D. If the UE knows that a signal is spatially QCL with some other signal it received earlier with a particular RX beam, then the UE can reliably use the same RX beam to receive this signal. Hence, the network may give this relation between a channel to be decoded (e.g., PDCCH/PDSCH) and a signal that is known to be transmitted in a given direction that may be used as reference by the UE, like CSI-RS, SSB, etc.

To introduce dynamics in beam and TRP selection, the UE can be configured through RRC signaling with N Transmission Configuration Indicator (TCI) states, where N is up to 128 in frequency range 2 (FR2, e.g., above 6 GHz) and up to eight in FR1 (e.g., below 6 GHz), depending on UE capability. Each configured TCI state includes parameters for the QCL associations between source RS (e.g., CSI-RS or SS/PBCH) and target RS (e.g., PDSCH/PDCCH DMRS antenna ports). TCI states can also be used to convey QCL information for the reception of CSI-RS. The N states in the list of TCI states can be interpreted as N possible beams transmitted by the network, N possible TRPs used by the network to communicate with the UE, or a combination of one or multiple beams transmitted from one or multiple TRPs.

More specifically, each TCI state can contain an ID along with QCL information for one or two source DL RSs, with each source RS associated with a QCL type, a serving cell index, a BWP index, and a source reference signal identity (CSI-RS, TRS or SSB). For example, two different CSI-RSs {CSI-RS1, CSI-RS2} can be configured in the TCI state as {qcl-Type1, qcl-Type2}={Type A, Type D}. The UE can interpret this TCI state to mean that the UE can derive Doppler shift, Doppler spread, average delay, delay spread from CSI-RS1, and Spatial Rx parameter (e.g., RX beam to use) from CSI-RS2. In case QCL Type D is not applicable (e.g., low- or mid-band operation), then a TCI state contains only a single source RS. Unless specifically noted, however, references to source RS "pairs" include cases of a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE can be configured with four active TCI states from a list of 64 total configured TCI states. Hence, the other 60 configured TCI states are inactive and the UE need not be prepared to estimate large scale parameters for those. On the other hand, the UE continuously tracks and updates the large-scale parameters for the four active TCI states by performing measurements and analysis of the source RSs indicated for each of those four TCI states. Each DCI used for PDSCH scheduling includes a pointer (or index) to one or two active TCI states for the scheduled UE. Based on this pointer, the UE knows which large scale parameter estimate to use when performing PDSCH DMRS channel estimation and PDSCH demodulation.

UE TCI states are currently configured via RRC as part of CellGroupConfig information element (IE), which is a DU configuration parameter in the CU-DU split architecture discussed above. This IC can be conveyed to the UE, for example, in an RRCResume message during transition from RRC_INACTIVE to RRC_CONNECTED state, or in an RRCReconfiguration message during handovers, intra-cell reconfigurations, or transitions from RRC_IDLE to RRC_CONNECTED state. The TCI states configuration is signaled as part of the PDSCH configuration per DL BWP of an SpCell (i.e., a PCell or a PSCell), where an SpCell can be comprised of one or multiple DL BWPs. FIG. 12 shows an exemplary structure of CellGroupConfig including TCI-states configuration.

FIGS. 13A-D show ASN.1 data structures for various exemplary IEs used for configuring TCI states of a UE via RRC signaling. In particular, FIG. 13A shows an ASN.1 data structure for a PDSCH configuration (i.e., for a particular DL BWP) including a list of TCI states to be added or modified. Each list member is described by a TCI-State field, for which FIG. 13D shows an exemplary ASN.1 data structure. As shown in FIG. 13D, each TCI-state field has a TCI-stateID associated in its configuration.

There is also an association between the PDCCH configuration and a TCI state, since the UE may also need to monitor a DL beam for PDCCH. FIG. 13B shows an ASN.1 data structure for a PDCCH-Config IE used for PDCCH configuration. This IE includes a controlResourcesSett-ToAddModList, which is a list of CORESET resources. FIG. 13C shows an ASN.1 data structure for a ControlResource-Set field, representing a single CORESET resource.

As discussed above, each CORESET contains 1-3 OFDM symbols as well as a frequency-domain allocation of PDCCH, i.e., where in frequency the PDCCH is transmitted and shall be monitored by the UE. The ControlResourceSet field shown in FIG. 13C also includes a list of TCI states to be added or modified, with each member include a TCI-StateID field that points to one of the TCI states configured for reception of PDSCH (e.g., according to FIG. 13A) that should be used to receive PDCCH candidates transmitted in that CORESET. Each CORESET can have a different TCI state configured/activated, facilitating use of different transmit beams for different PDCCH candidates.

FIG. 13D shows an ASN.1 data structure for exemplary TCI-State field, which includes a QCL configuration field called QCL-Info. This field includes an optional sub-field called cell, which indicates the UE's serving cell in which the QCL source RS is being configured. If this sub-field is absent, it applies to the serving cell in which the TCI-State is configured (i.e., the SpCell of the cell group, not an indexed SCell). The RS can be located on a serving cell other than the serving cell in which the TCI-State is configured only if qcl-Type is configured as type D. In other words, for a given SpCellConfig, the RS for a given TCI state is associated with a serving cell in that cell group, which may be the PCell/PScell or an associated SCell. This is indicated by the cell sub-field in the TCI state configuration. If this sub-field is absent, that refers to the cell where the TCI state is configured.

To summarize, TCI configurations are provided in the PDSCH configuration in a given DL BWP. For PDCCH, the CORESET configuration contains a TCI state pointer to a configured TCI state in PDSCH. Each TCI state contains the previously described QCL information, i.e., one or two source downlink RS, with each source RS associated with a QCL type.

Once the UE has been configured with a CellGroupConfig and SpCellConfig with PDSCH and PDCCH configurations per BWP, having possible TCI states associated with different transmission downlink beams where these channels need to be detected, the UE needs to know when the network is transmitting in the time domain. In other words, all these TCI states that are configured are not used all the time, but only when needed. Hence, an efficient activation/deactivation procedure is defined in NR whereby the network indicates for a given CORESET which TCI state is to be monitored by the UE (e.g., which DL beam the UE needs to monitor to detect a possible CORESET transmitted by the network).

FIGS. 14A-C illustrate various aspects of TCI state activation for a UE. In particular, FIG. 14A shows a signaling diagram between UE and serving gNB. The gNB initially transmits CSI-RS in narrow beams to the UE, which reports RSRP for the best 1-4 CSI-RS resources to the gNB. The gNB selects a CSI-RS resource based on the reported measurements. The gNB knows in which beam it transmitted the select resource and maps that beam to an SSB and the TCI state, S, including the corresponding SSB index. The gNB then sends the UE a medium access control (MAC) control element (CE) that activates TCI state S.

FIG. 14B shows an exemplary MAC CE for activating a TCI state. The following text from 3GPP TS 38.321 further describes the contents and use of this exemplary MAC CE.

\*\*\*Begin text from 3PGG TS 38.321\*\*\*

5.18.5 Indication of TCI state for UE-specific PDCCH

The network may indicate a TCI state for PDCCH reception for a CORESET of a Serving Cell or a set of Serving Cells configured in simultaneousTCI-UpdateList1-r16 or simultaneousTCI-UpdateList2-r16 by sending the TCI State Indication for UE-specific PDCCH MAC CE described in clause 6.1.3.15.

The MAC entity shall:

1>if the MAC entity receives a TCI State Indication for UE-specific PDCCH MAC CE on a Serving Cell:

2>indicate to lower layers the information regarding the TCI State Indication for UE-specific PDCCH MAC CE.

. . .

6.1.3.15 TCI State Indication for UE-specific PDCCH MAC CE

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1-r16 or simultaneousTCI-UpdateList2-r16 as specified in TS 38.331 [5], this MAC CE applies to all the Serving Cells in the set simultaneousTCI-UpdateList1-r16 or simultaneousTCI-UpdateList2-r16, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResource-SetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResource-Set identified by the indicated CORESET ID. The length of the field is 7 bits.

\*\*\*End text from 3PGG TS 38.321\*\*\*

In general, the network can indicate/activate via MAC CE one TCI state for PDCCH (i.e., provides a TCI for PDCCH) and up to eight active TCI states for PDSCH. The number of active TCI states the UE support is a UE capability.

Once the UE knows the TCI state for a given CORESET for PDCCH monitoring (e.g., the DL beam direction to use for monitoring PDCCH), the UE needs to know which TCI state is considered for a given data being scheduled. When the UE is monitoring PDCCH in a CORESET according to a given TCI state indicated with MAC CE, the UE may receive a DCI that indicates which of the configured TCI states for PDSCH is to be used (i.e., activated) for decoding the data on PDSCH. There are different ways this could be done, such as:

DCI indicates that UE shall use same TCI state as the CORESET where DCI was received;

DCI indicates that UE shall use another TCI state associated with PDSCH, with three bits indication mapping to one TCI state configured in a list in PDSCH configuration; or DCI indicates that UE shall use another TCI state associated with PDSCH, with three bits indication for a bit map between integers 0-7 and one of the TCI states configured in a list in PDSCH configuration. The bit map is provided in another MAC CE for PDSCH activation. This case is used when the list of TCI states configured for PDSCH is larger than 8, and PDSCH is to be scheduled in a different TCI state compared to PDCCH.

In summary, it is within the DCI that the UE obtains the TCI state for PDSCH associated with a given scheduling opportunity. PDSCH configuration contains the tci-States-ToAddModList, which indicates a transmission configuration that includes QCL-relationships between the DL RSs in one RS set and the PDSCH DMRS ports. In other words, it indicates the beams where PDSCH may be scheduled. Each of these configured TCI states can be activated by DCI.

In case more than eight (8) TCI states are defined for PDSCH, a DCI-based MAC CE-assisted scheme exists, i.e., the third option described above. The different values that can be represented by the bitmap are referred to as "code-points." For example, a three-bit field can represent up to eight TCI codepoints. Either one or two TCI states can be mapped to each TCI code point. When one TCI state is mapped to a TCI code point, the indicated TCI state is to be used for single-TRP transmission. When two TCI states are mapped to a TCI code point, the indicated TCI states are to be used for multi-TRP transmission.

FIG. 14C illustrates how TCI States are mapped to the codepoints in the DCI Transmission Configuration Indication field in NR-Rel-15. In this example, the MAC CE for Activation/Deactivation of TCI States for UE-specific PDSCH has a size of three octets and contains 16 $T_i$ fields (i=0, 1, 2, . . . , 15) corresponding to 16 different TCI State IDs that have been configured in a UE for a given BWP. In this example, TCI States with IDs i=2, 4, 5, 7, 8, 9, 11, and 13 are being activated (by value "1") with the MAC CE shown in FIG. 14C. In particular, the TCI State IDs are mapped to the codepoint values of DCI Transmission Configuration Indication field as follows:

TCI State ID i=2 corresponds to codepoint value 0;

TCI State ID i=4 corresponds to codepoint value 1;

TCI State ID i=5 corresponds to codepoint value 2;

TCI State ID i=7 corresponds to codepoint value 3;

TCI State ID i=8 corresponds to codepoint value 4;

TCI State ID i=9 corresponds to codepoint value 5;

TCI State ID i=11 corresponds to codepoint value 6; and

TCI State ID i=13 corresponds to codepoint value 7.

In NR Rel-15, an RRC_CONNECTED UE can be configured to report L1-RSRP for each one of up to four beams, either on CSI-RS or SSB. UE measurement reports can be sent via PUCCH or PUSCH. The following characteristics also apply to measurements and reporting for beam management:

Periodic and semi-persistent CSI-RS resources are RRC configured with a certain period and a certain slot offset.

Aperiodic CSI-RS is scheduled by DCI, in the same DCI where the UL resources for the measurement report are scheduled.

Semi-persistent CSI-RS is configured using RRC and activated using MAC CE. Periodic CSI-RS is configured using RRC.

Options for what/how the UE shall report is defined in a CSI-RS reporting setting (CSIReportConfig), part of CSI-MeasConfig which is part of ServingCellConfig (i.e., within CellGroupConfig for spCell).

A reporting setting also refers to a CSI-ResourceConfig, which defines the resources for which the report setting should be used.

A UE can be configured to report CSI based on CSI-RS. The reported RSRP value corresponding to the first (best) CSI/SSB requires 7 bits (absolute value) and any others are reported with 4 bits using encoding relative to the first.

Table 2 below summarizes UE reporting of L1 measurements.

TABLE 2

| Reference signal | Periodic reporting | Semi-persistent reporting | Aperiodic reporting |
|---|---|---|---|
| SSB | PUCCH | PUCCH/PUSCH | PUSCH |
| Periodic CSI-RS | PUCCH | PUCCH/PUSCH | PUSCH |
| Semi-pers. CSI-RS | Not supported | PUCCH/PUSCH | PUSCH |
| Aperiodic CSI-RS | Not supported | Not supported | PUSCH |

Beam failure detection (BFD) and beam failure recovery (BFR) were also introduced in NR Rel-15. The network configures the UE with BFD reference signals e.g., (SSB or CSI-RS) and the UE declares beam failure when the number of beam failure instance indications from L1 reaches a configured threshold before a configured timer expires. SSB-based BFD is based on the SSB associated with an initial DL BWP and can only be configured for the initial DL BWPs and for DL BWPs containing the SSB associated with the initial DL BWP. For other DL BWPs, BFD can only be performed based on CSI-RS.

FIG. 15A shows an ASN.1 data structure for an exemplary RRC RadioLinkMonitoringConfig IE, which can be used to configure resources for BFD. Of particular note is the purpose field, which can take any of values "beamFailure", "rlf", or "both".

The configured thresholds for BFD (mentioned above) are $Q_{out,LR}$ and $Q_{in,LR}$. The former corresponds to the default value of rlmInSyncOutOfSyncThreshold as configured in the RRC IE SpCellConfig and described further in 3GPP TS 38.133. The latter corresponds to the value provided by fields rsrp-ThresholdSSB or rsrp-ThresholdBFR-r16. FIG. 15B shows an ASN.1 data structure for an exemplary SpCellConfig IE, including rlmInSyncOutOfSyncThreshold. This field is defined as a block error rate (BLER) threshold pair index for in-sync (IS)/out-of-sync (OOS) indication generation according to 3GPP TS 38.133, table 8.1.1-1. The listed "n1" corresponds to the value 1. When the field is absent, the UE applies the value 0. Whenever this is reconfigured, UE resets counters N310 and N311, and stops timer T310, if running.

UE L1 assesses the radio link quality according to the set $\overline{q}_0$ of resource configurations against the threshold $Q_{out,LR}$. More specifically, the UE assesses the radio link quality based on periodic CSI-RS resource configurations, or SSB on the PCell or the PSCell, that are QCL with DM-RS of PDCCH receptions monitored by the UE. The UE applies the $Q_{in,LR}$ threshold to the L1-RSRP measurement for SSB. The UE applies the $Q_{in,LR}$ threshold to the L1-RSRP measurement for a CSI-RS resource after scaling a respective CSI-RS reception power with a value provided by powerControlOffsetSS.

In non-DRX operation, UE L1 provides an indication to higher layers when the radio link quality for all corresponding resource configurations in the set $\overline{q}_0$ that the UE uses to assess the radio link quality is worse than the threshold $Q_{out,LR}$. In other words, if at least one resource is above the threshold $Q_{out,LR}$, L1 does not indicate BFD to the higher layers. L1 informs when the radio link quality is worse than the threshold $Q_{out,LR}$ with a periodicity determined by the maximum between the shortest periodicity of the periodic CSI-RS configurations, and/or SSB on the PCell or the PSCell, in the set $\overline{q}_0$ that the UE uses to assess the radio link quality and 2 msec. In DRX operation, L! provides an indication to higher layers when the radio link quality is worse than the threshold $Q_{out,LR}$ with a periodicity determined as specified in 3GPP TS 38.133.

When an RRC_CONNECTED UE in is configured with MR-DC, each SpCell configuration can have its own BFD configuration. For the PCell or the PSCell, upon request from higher layers, the UE provides to higher layers the periodic CSI-RS configuration indices and/or SSB indices from the set $\overline{q}_1$ and the corresponding L1-RSRP measurements that are larger than or equal to the $Q_{in,LR}$ threshold. For an SCell, upon request from higher layers, the UE indicates whether there is at least one periodic CSI-RS configuration index and/or SSB index from the set $\overline{q}_1$ with corresponding L1-RSRP measurements that are larger than or equal to the $Q_{in,LR}$ threshold, and provides the periodic CSI-RS configuration indices and/or SSB indices from the set $\overline{q}_1$ and the corresponding L1-RSRP measurements that are larger than or equal to the $Q_{in,LR}$ threshold, if any.

For each BWP of a serving cell, a UE can be provided a set $\overline{q}_0$ of periodic CSI-RS resource configuration indexes by failureDetectionResources and a set $\overline{q}_1$ of periodic CSI-RS resource configuration indices and/or SSB indices by candidateBeamRSList or candidate-BeamRSListExt-r16 or candidateBeamRSSCellList-r16. These can be used for radio link quality measurements on the BWP of the serving cell.

If the UE is not provided $\overline{q}_0$ by failureDetectionResources or beamFailureDetection-ResourceList for a BWP of the serving cell, the UE determines the set $\overline{q}_0$ to include periodic CSI-RS resource configuration indices having same values as in the RS sets indicated by TCI-State for respective CORESETs that the UE uses for monitoring PDCCH. If there are two RS indexes in a TCI state, the set $\overline{q}_0$ includes RS indexes with QCL-TypeD configuration for the corresponding TCI states. FIG. 13D, discussed above, illustrates how the TCI-State IE includes this information (e.g., referenceSignal and qcl-Type fields). For example, as illustrated in FIG. 13A discussed above, this can be indicated as part of the TCI state configuration within the PDSCH configuration (e.g., PDSCH-Config) in a DL BWP configuration.

Additionally, as illustrated in FIG. 13B, each PDCCH configuration (which is part of a DL BWP configuration, up to three per BWP per cell) can include one or multiple CORESETs that the UE should monitor. Each CORESET configuration includes one or more TCI states indicating in which beam(s) that CORESET may be transmitted and monitored by the UE. This is illustrated by the ASN.1 data structure for ControlResourceSet shown in FIG. 13C.

After beam failure is detected, the UE triggers BFR by initiating a Random Access (RA) procedure on the PCell.

The UE selects a suitable beam to perform BFR; if the gNB has provided dedicated Random Access resources for certain beams, those will be prioritized by the UE. Parameters for BFR are configured via RRC in the BeamFailureRecovery-Config IE for the dedicated UL BWP as part of the Cell-GroupConfig. FIG. 16 shows an ASN.1 data structure for an exemplary BeamFailureRecoveryConfig IE. Upon completion of the RA procedure, beam failure recovery is considered complete. UE actions during BFD and BFR are described in more detail in 3GPP TS 38.321 (NR MAC specification).

3GPP previously specified the concepts of dormant LTE SCell and dormancy-like behavior of an NR SCell. In LTE, when an SCell is in dormant state, the UE does not need to monitor the corresponding PDCCH or PDSCH and cannot transmit in the corresponding UL. This behavior is similar to behavior in a deactivated state, but the UE is also required to perform and report CQI measurements, which is different from deactivated state behavior. A PUCCH SCell (SCell configured with PUCCH) cannot be in dormant state.

In NR, dormancy-like behavior for SCells is based on the concept of dormant BWP. One of the UE's dedicated BWPs configured via RRC signaling can be configured as dormant for an SCell. If the active BWP of the activated SCell is a dormant BWP, the UE stops monitoring PDCCH on the SCell but continues performing CSI measurements, AGC, and beam management (if configured to do so). DCI is used to control entering/leaving the dormant BWP for SCell(s) or SCG(s), and is sent to the SpCell of the cell group that includes the dormant SCell (i.e., to PCell if SCell belongs to MCG, to PSCell if SCell belongs to SCG). The SpCell (i.e., PCell or PSCell) and PUCCH SCell cannot be configured with a dormant BWP.

FIG. 17 is an exemplary state transition diagram for NR SCells. At a high level, a UE's SCell can transition between deactivated and activated states based on explicit commands from the network (e.g., MAC CEs) or expiration of a deactivation timer. Within the activated state, a particular BWP can transition between active and dormant conditions based on DCI received from the network.

However, if the UE is configured with MR-DC, it cannot fully benefit from the energy reductions of dormant state or dormancy-like behavior since the PSCell cannot be configured to be dormant. Instead, an existing solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In the context of 3GPP Rel-16, there were some discussions about placing the PSCell in dormancy, also referred to as SCG Suspension. Some agreed principles of this solution include:

The UE supports network-controlled suspension of the SCG in RRC_CONNECTED.

UE behavior for a suspended SCG is for further study (FFS).

The UE supports at most one SCG configuration, suspended or not suspended, in Rel16.

In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

No specific SCG energy reduction techniques have been discussed for 3GPP Rel-17. However, it is expected that such techniques will involve one or more of the following:

The UE starting to operate the PSCell in dormancy, e.g., switching the PSCell to a dormant BWP). The network considers the PSCell in dormancy and at least stops transmitting PDCCH for that UE in the PSCell.

The UE deactivating the PSCell, similar to SCell deactivation. The network considers the PSCell as deactivated and at least stops transmitting PDCCH for that UE in the PSCell.

The UE operating the PSCell in long DRX; SCG DRX can be switched off from the MN (e.g., via MCG MAC CE or DCI) when the need arises, such as DL data arrival for SN-terminated SCG bearers.

The UE suspending its operation with the SCG (e.g., suspending bearers associated with SCG, including MN- and SN-terminated bearers) but storing the SCG configuration ("stored SCG). On the network side, the SN can store the SCG like the UE, or the SN can release the UE's SCG context and re-generate it upon resume. The latter option requires support from the MN, which stores SCG context for UEs whose SCG is suspended.

Although these techniques are focused on SCG, it is likely that similar approaches could be used on the MCG. For example, the MCG may be suspended or in long DRX, while data communication is happening only via the SCG.

Recently, it was agreed within 3GPP RAN2 WG that the following issues should be studied for SCG deactivation:

How signalling and inter-node interaction works at activation deactivation (e.g., MN triggered, SN triggered, UE triggered, signalling mechanism, which node is in control etc).

If for deactivated SCG, the UE stops monitoring PDCCH for PSCell and SCells of the SCG.

If for the PSCell in deactivated SCG, the UE performs CSI/RRM measurement and report; AGC; beam management; RLM; etc.

A likely behavior in deactivated SCG is that the UE stops monitoring PDCCH for PSCell and SCell of the SCG. Up to Rel-16, a UE configured with MR-DC may perform beam management operations at least with each SpCell, i.e., PCell, PSCell, and if configured with SCell(s) of the SCG. With the introduction of the SCG deactivation in Rel-17, the UE should reduce energy consumption by minimizing SCG operations such as PDCCH monitoring. At the same time, the UE must be ready to resume the deactivated SCG quickly. These requirements can be contradictory and/or conflicting.

One way to enable fast PDCCH monitoring in legacy RRC_CONNECTED operations is via beam management procedures. For example, to facilitate fast resume of a deactivated SCG, the UE could continue the same beam management operations defined for RRC_CONNECTED with the SCG in deactivated mode of operation. However, these operations consume energy by the UE performing L1 measurements, reporting L1 measurements over UL channels of the SCG (e.g., PUCCH, PUSCH), processing MAC CEs, etc. This approach also requires the SN associated with the deactivated SCG to keep monitoring its UL channels (e.g., PUCCH). At the same time, stopping beam management operations may lead to beam misalignment so that upon resume a new re-alignment would be required, which would increase the time required for activation of the SCG.

Accordingly, embodiments of the present disclosure provide techniques for a UE configured for MR-DC with a first cell group (e.g., MCG) and a second cell group (e.g., SCG) in a wireless network (e.g., NG-RAN). These techniques can include the UE receiving (from a network node) an indication for the second cell group to enter a deactivated or reduced-energy mode of operation (e.g., from an activated or normal-energy mode of operation). In addition, the UE can stop and/or refrain from performing certain beam management operations while second cell group is deactivated. These beam management operations can include at least one of the following:

reporting L1 beam measurements over PUSCH and/or over PUCCH; and performing L1 beam measurements.

In addition, the UE can perform BFD associated with the second cell group while the second cell group is in the second mode of operation, in at least one of following ways:

UE continues to perform BFD for the second cell group (e.g., BFD for the SpCell of the SCG) as it was performing when the cell of the second cell group was in normal mode of operation;

UE performs BFD for the second cell group (e.g., BFD for the SpCell of the SCG), but not as it was performing when the cell of the second cell group was in normal mode of operation, but according to at least one different BFD configuration; and UE resets counters and timers related to BFD for the second cell group upon transitioning the second cell group (e.g., SCG) to deactivated mode of operation.

In addition, the UE can determine if beam failure associated with the second cell group while the second cell group is in the second mode of operation (e.g., deactivated SCG) should be declared, and perform at least one of the following actions based on whether BFD is declared:

Trigger random access for BFR on the second cell group (e.g., with the SpCell of the second cell group) if BFD is declared;

When BFD is declared the UE considers beam failure to be detected, but does not trigger random access for BFR with the second cell group i.e., the UE does not perform random access towards the PSCell upon BFD. For example, random access is not performed upon the triggering BFR, but possibly later when the second cell group is activated (resumed). In that case, when BFD is declared for a cell in the second cell group that is deactivated, the UE delays the initiation of random access, e.g., until when the second cell group transitions to active/normal/activated normal mode of operation.

When BFD is declared the UE indicates this to the network via the first cell group, either in a MAC CE or RRC message. This way the network will immediately get the knowledge of the beam failure and can take appropriate action (e.g., determine that it can resume the second cell group without random access if BFD was not detected, determine that it cannot resume the second cell group without random access if BFD was detected).

Embodiments of the present disclosure also include techniques for a network node, of a wireless network, that is associated with a second cell group (e.g., SCG) for a UE also configured to communicate with the wireless network via a first cell group (e.g., MCG). The network node can transmit, to the UE, an indication for the second cell group to enter a deactivated mode of operation (e.g., from a normal mode of operation). The indication can be transmitted in any of the following ways:

via the first cell group, e.g., the UE receives an RRC message or a MAC CE via the MCG, for the case the SCG is to be deactivated;

via the second cell group, e.g., the UE receives an RRC message or a MAC CE via the SCG, for the case the SCG is to be deactivated;

via the second cell group, e.g., the UE receives an RRC message or a MAC CE via the SCG, for the case the MCG is to be deactivated;

via the first cell group, e.g., the UE receives an RRC message or a MAC CE via the MCG, for the case the MCG is to be deactivated.

Additionally, the network node can perform one or more actions on at least one of the Serving Cells of the second cell group based on the second cell group being in the deactivated mode of operation. For example, the network node can stop scheduling the UE with PDCCH, stop transmitting DCIs, stop monitoring UL channels (e.g., PUSCH, PUCCH), etc.

Additionally, the network node can stop performing beam management operations based on the second cell group being in the deactivated mode of operation. This can include any of the following:

Stop monitoring control channels in the uplink for that UE (e.g., PUSCH, PUCCH) configured for the reporting L1 beam measurements while the second cell group was in normal mode of operation;

Stop transmitting CSI-RSs for L1 reporting, e.g., for CSI\, and/or beam management; Continue monitoring PRACH;

Additionally, the network node can perform at least one of the following actions:

Receive a random access preamble associated with a BFR from the UE whose second cell group (e.g., with the SpCell of the second cell group) is deactivated;

Receive a random access preamble associated with a resume operation, i.e., when the second cell group is to be resumed;

Receive an indication from the network node (e.g., a gNodeB) associated with the first cell group (e.g., Master Cell Group—MCG), the indication containing information about a BFD declared on the second cell group. Based on the received information, the network node can take corresponding action, e.g., it may refrain from transmitting reference signals used by the UE for BFD.

Embodiments of the present disclosure also include techniques for a network node, of a wireless network, that is associated with a first cell group (e.g., MCG) for a UE also configured to communicate with the wireless network via a second cell group (e.g., SCG). The network node can receive, from the UE via the first cell group, an indication of a BFD declared on the second cell group and take corresponding action. The indication may be either a MAC CE or RRC message. Corresponding actions can include activating the SCG in order to establish a new beam relation for the second cell group or informing a network node associated with the second cell group about the declared BFD via inter-node communication.

Additionally, the network node can determine how to resume/activate the SCG based on the information received in that report. For example, the network can determine that it can resume the second cell group without random access if BFD was not detected. In such case, the network node can send a second cell group resume indication with an explicit/implicit TCI state indication (e.g., MAC CE indicating the UE to monitor PDCCH on the second cell group) triggering the UE to access the second cell group without random access. Alternately, the network can determine that it cannot resume the second cell group without random access if BFD was detected. In such case, the network node can send a second cell group resume indication (e.g., RRC message including a RACH configuration) triggering the UE to perform a random access procedure with the second cell group. Alternately, the network node can release the second cell group that is deactivated, or send a message requesting the same to the node associated with the second cell group.

Embodiments can provide various benefits, advantages, and/or solutions to problems described herein. For example, embodiments facilitate energy reduction by not requiring the UE to report CSI and/or L1 beam measurements, while preserving a degree of readiness in terms of beam alignment. Because the UE performs beam monitoring for BFD, the UE can only trigger random access when it's needed upon resumption of the second cell group, which reduces resume latency so long as BFD was not detected while the second cell group was deactivated. Certain embodiments also address this readiness issue by the UE performing BFR while in deactivated state, so beam alignment is established even while second cell group is deactivated.

In the following discussion, the terms "suspended", "deactivated", "inactive", and "reduced-energy mode" are used interchangeably with respect to a UE's cell group (e.g., SCG). From the UE perspective, however, "reduced-energy mode" for an SCG means that the UE is operating in a reduced-energy mode with respect to the SCG. Likewise, the terms "resumed", "activated", "active", "normal energy mode", "normal operation", and "legacy operation" are used interchangeably with respect to a UE's cell group (e.g., SCG). From the UE perspective, "normal energy mode" for an SCG means that the UE is operating in a normal (i.e., non-reduced) energy mode with respect to the SCG. Examples of operations are UE signal reception/transmission procedures e.g., RRM measurements, reception of signals, transmission of signals, measurement configuration, measurement reporting, evaluation of triggered event measurement reports, etc.

In the following discussion, the phrases "measurements on the SCG" or "measurements associated with the SCG" correspond to performing measurements on a cell of the SCG (e.g., SpCell) and/or performing measurements according to an SCG measurement configuration.

In the following, embodiments are described in terms of an SCG that is suspended for a UE configured with DC. However, similar principles can be applied to an MCG that is suspended for a UE configured with DC.

In the following, a "beam failure detection" (or "BFD" for short) while the second cell group is deactivated generally involves the UE performing monitoring of a set of RS configured for the purpose of BFD, with L1 generating indications (e.g., IS/OOS) to the MAC layer. The monitoring can be performed on a serving cell of the second cell group, e.g., in context of BFD for the SpCell of the second cell group.

As summarized above, a UE can receive (from a network node) an indication for the UE's second cell group to enter a deactivated mode of operation (e.g., from a normal mode of operation). In some embodiments, the UE may be configured with MR-DC with both MCG and SCG operating in normal mode of operation, when it receives the command. In other embodiments, the UE can receive an MR-DC configuration (e.g., SCG configuration) including the indication for the second cell group to enter the deactivated mode of operation. In either case, the indication may be included in an RRC message (e.g., as an IE or field), a MAC control element (CE), etc.

In some embodiments, the second cell group can be an SCG configured for a UE in MR-DC. In such case, the Serving Cells of the second cell group can be an SpCell (PSCell) and any of the SCells. In other embodiments, the second cell group can be an MCG configured for a UE in MR-DC. In such case, the Serving Cells of the second cell group can be an SpCell (PCell) and any of the SCells of the MCG.

As summarized above, the UE can stop and/or refrain from performing certain beam management operations while second cell group is deactivated. These beam management operations can include at least one of the following in various embodiments:

Stop reporting L1 beam measurements (over PUSCH and/or over PUCCH).

These can be L1 RSRP measurements based on SS/PBCH Block (SSB);

These can be L1 RSRP measurements based on CSI-RSs;

UE suspends at least one of the following L1 measurements and reporting associated with the second cell group (e.g., associated with the SpCell of the second cell group) when the second cell group enters deactivated mode of operation:

Periodic, aperiodic and semi-persistent reporting;

Reporting over PUCCH;

Reporting over PUSCH;

Reporting over any other Uplink control channel;

Stop performing L1 beam measurements for the purpose of L1 reporting; other measurements for other purposes (e.g., BFD) may continue. These can be L1 RSRP measurements based on SSB or CSI-RSs.

Stop performing L1 reporting and L1 measurements associated with at least one of the following configurations (which can be considered equivalent to suspend the operation according to these configurations):

Configurations according to CSI-MeasConfig IE (part of Serving Cell configuration and transmitted within an IE CellGroupConfig) associated with a cell of the second cell group; the configuration is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. According to the method at least one configuration (i.e., field or IE) within CSI-MeasConfig could be suspended (i.e., measurements and reporting stops) when the second cell group enters deactivated mode of operation, such as at least one of the following:

nzp-CSI-RS-ResourceToAddModList is a list of NZP-CSI-RS-Resource

Pool of NZP-CSI-RS-ResourceSet which can be referenced from CSI-ResourceConfig or from MAC CEs csi-SSB-ResourceSetToAddModList is a list of CSI-SSB-ResourceSet Pool of CSI-SSB-ResourceSet which can be referred to from CSI-ResourceConfig csi-ResourceConfigToAddModList is a list of CSI-ResourceConfig Configured CSI resource settings as specified in 3GPP TS 38.214 section 5.2.1.2 csi-ReportConfigToAddModList is a list of CSI-ReportConfig

Configured CSI report settings as specified in 3GPP TS 38.214 section 5.2.1.1

Configurations according to CSI-ReportConfig (part of CSI-MeasConfig) associated with a cell of the second cell group; the configuration is used. Suspending the configuration and/or stopping actions that were performed according to the configuration corresponds to stopping or suspending periodic or semi-persistent report sent on PUCCH on the cell in which the CSI-ReportConfig is included (e.g., SpCell of the second cell group or an SCell associated with the cell group); Suspending the configuration and/or stopping actions that were performed according to the configuration corresponds to stopping or suspending semi-persistent or aperiodic report sent on PUSCH triggered by DCI received on the cell in which the CSI-ReportConfig is included (in this case, the cell on which the report is sent is determined by the received DCI). According to the method at least one configuration (i.e., field or IE) within CSI-ReportConfig could be suspended (i.e., measurements and reporting stops) when the second cell group enters deactivated mode of operation.

As summarized above, the UE can perform BFD associated with the second cell group while the second cell group is in the deactivated mode of operation. This can involve performing BFD on at least one serving cell of the second cell group. In case the second cell group is SCG, this can include an SpCell of the SCG (PSCell) and/or any SCell(s) of the SCG. In case the second cell group is the MCG, this can include be an SpCell of the MCG (PCell) and/or any SCell(s) of the MCG.

In various embodiments, the UE can perform BFD while the second cell group is in the deactivated mode of operation in various ways. In some embodiments, the UE continues to perform BFD for the second cell group in the same manner as when the second cell group was in normal mode of operation. For example, the UE performs at least the actions as described in 3GPP TS 38.213 section 6 ("Link recovery procedures") for the SpCell of the second cell group, according to the BFD configurations in CellGroupConfig for the second cell group. Put differently, L1 continues to monitor reference signals (e.g., transmitted in beams) and possibly generates Beam Failure Indication (BFIs to the higher layers (e.g., MAC) that monitor for beam failure based on counting the number of BFIs.

In one variant, the UE performs BFD for the SpCell of the second cell group and all SCell(s) of the second cell group configured with BFD. In other words, the SpCell is one of the serving cells for which BFD is performed, and the other SCell(s) are the other serving cells for which BFD is performed. In another variant, the UE performs BFD for a subset of the SCell(s) of the second cell group configured with BFD.

In another variant, the UE performs BFD only for the SpCell of the second cell group. Thus, even if BFD is configured for SCell(s) of the second cell group, when the second cell group is deactivated the UE stops BFD for the SCell(s) and only continues BFD for the PSCell. When the UE activates the dormant SCG (e.g., receives an indication to resume the SCG operation), the UE again performs BFD also for the SCell(s).

In another variant, the UE performs BFD only for the serving cells that are explicitly configured for it when the second cell group enters a deactivated mode of operation. That configuration may be provided with the indication that deactivates the second cell group, or as part of CellGroupConfig when the second cell group is configured.

In other embodiments, the UE performs BFD for the second cell group but in a different manner than it was performing when the cell(s) of the second cell group were in normal mode of operation. For example, the UE performs at least the actions as described in 3GPP TS 38.213 section 6 ("Link recovery procedures") for the SpCell of the second cell group, according to a different BFD configuration including one or more new parameters. These may be configured only for use while the second cell group is deactivated.

For example, the different BFD parameters may be configured in CellGroupConfig for the second cell group (e.g., within an RRC Reconfiguration like message), along with some indication that these BFD related parameters are to be used by the UE for the second cell group when the second cell group is in deactivated mode of operation. In some variants, the different BFD parameters may be configured in the same message indicating that the second cell group is to be deactivated mode of operation.

In some variants, an absence of a specific BFD configuration for use in deactivated mode of operation may cause the UE to perform BFD based on the BFD configuration used in normal mode of operation for the second cell group. In other variants, an absence of a specific BFD configuration for use in deactivated mode of operation may cause the UE to refrain from performing BFD on the second cell group when it is in deactivated mode of operation. In other variants, the UE can be preconfigured with a default BFD configuration for when the second cell group is deactivated and no other BFD configuration for that case is available.

In general, the new BFD configuration (i.e., for use while the second cell group is deactivated) may contain parameters similar and/or equivalent to those found in the RadioLink-MonitoringConfig IE shown in FIG. 15A for use while the second cell group is in normal mode of operation. For example, these parameters can be provided in a new radi-oLinkMonitoringConfig-SCG-deactivated IE or field, e.g., within the RadioLink-MonitoringConfig IE. Below are some examples of parameters that can be different in the new BFD configuration:

failureDetectionResourcesToAddModList; List of RS resources to be monitored for BFD e.g., list of SSBs, CSI-RSs or a mix of SSBs and CSI-RSs to be monitored in order to generate BFI when all resources are below a Qout threshold.

Figure 18:
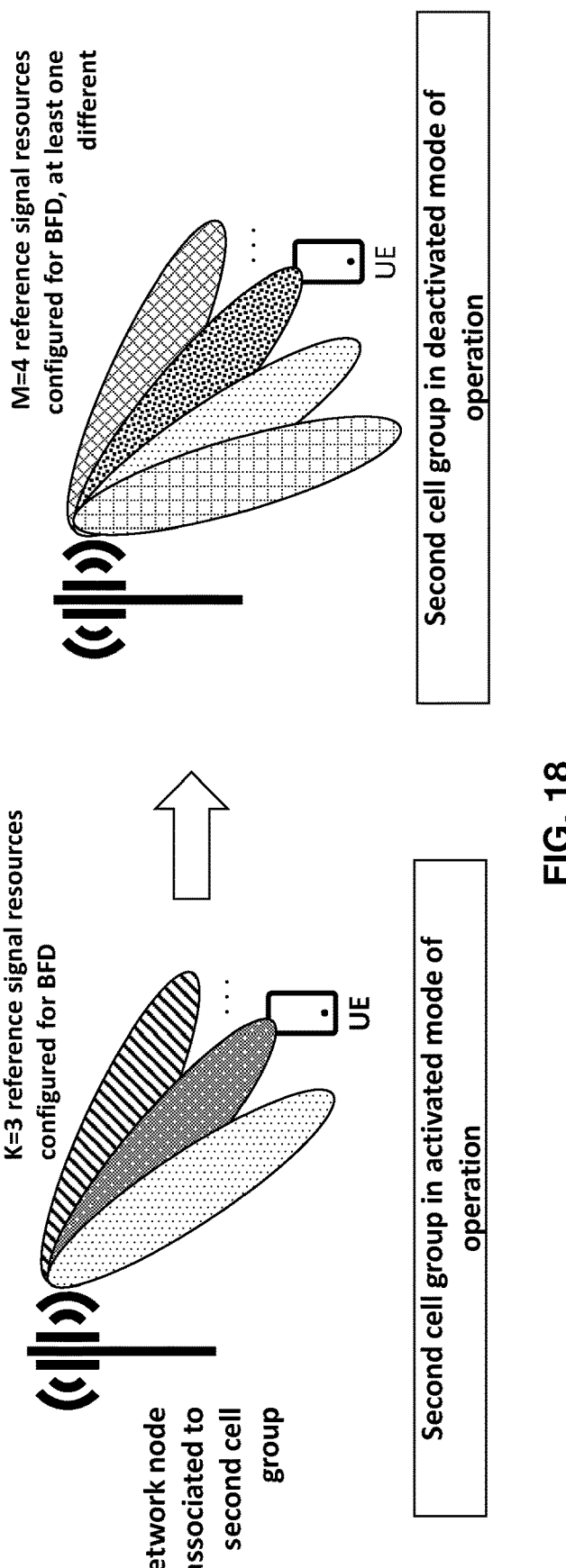
FIG. 18 illustrates the case where different RS resources are configured for UE beam failure detection while the UE's SCG is activated and deactivated, according to various exemplary embodiments of the present disclosure.

The new BFD configuration may contain more resources to be monitored compared to the case where the second cell group is activated, e.g., more beams/SSBs/CSI-RS resources to be monitored for BFD. Since the UE is not monitoring PDCCH and reporting measurements when the second cell group is deactivated, it might be possible to monitor more resources for BFD for a more robust BFD scheme. FIG. 18 illustrates the case where K=3 RS resources are configured for UE BFD while the SCG is activated and M=4 RS resources (including at least one different) are configured for UE BFD while the SCG is deactivated.

Another possible strategy is that the new BFD configuration may contain fewer resources to be monitored compared to the case where the second cell group is activated e.g., less beams to be monitored for BFD e.g., more SSBs/CSI-RS resources; the reasoning is that as BFD is to some extent replacing beam management operations that includes reporting of L1 beam measurements, any deviation from a small number of beams should be considered before the UE resumes/activates the second cell group.

In some variants, that new configuration for BFD resources for a deactivated second cell group can be based only on SSBs, since SSBs may anyway be transmitted by the second cell group (e.g., PSCell) so there is no need to transmit CSI-RSs for that purpose. One option can be the UE autonomously stops monitoring configured CSI-RS and only performs BFD based on the configured SSBs. For the set $\bar{q}_0$, the UE assesses the radio link quality only according to SSBs on the PSCell, that are quasi co-located with the DM-RS of PDCCH receptions that were being monitored by the UE when the SCG was in normal mode of operation. The UE applies the $Q_{in,LR}$ threshold to the L1-RSRP measurement obtained from an SSBs.

beamFailureInstanceMaxCount: This field determines after how many beam failure events triggers UE BFR, which can enable the UE to be more or less tolerant to BFD when the second cell group is deactivated, depending on the network strategy. One option could be to increase it to cause the UE to only declare BFD when that is very critical, which could make sense considering that the UE is not monitoring PDCCH while the second cell group is deactivated. Another option could be to decrease it to cause the UE to be as ready as possible for resuming the operation with the SCG and start monitoring PDCCH.

beamFailureDetectionTimer: This is the timer for BFD which can be a value in number of "Qout,LR reporting periods of Beam Failure Detection" (as defined in 3GPP TS 38.213, clause 6), which can enable the UE to be more or less tolerant to BFD when the second cell group is deactivated, depending on the network strategy.

In some embodiments, the new BFD configuration can include a new value for the rlmInSyncOutOfSyncThreshold (as discussed above in relation to FIG. 15B).

In some embodiments, the new BFD configuration may be a change in the method for performing BFD. In normal/activated mode of operation, the UE performs BFD by monitoring a set of RS resources configured for BFD (e.g., by RadioLinkMonitoringConfig). According to 3GPP TS 38.213 section 6, if no RSs are provided for the purpose of BFD, the UE performs beam monitoring based on the activated TCI-State for PDCCH. According to these embodiment, when the UE deactivates the second cell group, even if RS resources were configured for BFD the UE changes the BFD monitoring method as if RS resources have not been configured, e.g., to perform beam monitoring for BFD based on the last PDCCH TCI state activated before the second cell group transitioned to deactivated mode of operation. When the second cell group is resumed, the BFD returns to RS resources configured for BFD.

As summarized above, the UE can determine if BFD associated with the second cell group should be declared while the second cell group is in the second mode of operation (e.g., deactivated SCG), and perform at least one actions based on whether BFD is declared (e.g., determined to have occurred).

In some embodiments, the determination can be done at the MAC entity for a serving cell (e.g., SpCell) of the second cell group. Even though the second cell group is in deactivated mode of operation, the MAC entity of a serving cell monitors the possible reception of BFIs from L1. The MAC entity starts or restarts a BFR timer, and increments BFI_COUNTER by one for each BFI received from L1.

In some embodiments, the determination can be based on a comparison between the counter described above and a configured maximum number of BFI instances (e.g., beamFailureInstanceMaxCount) that can occur within a pre-determined time. For example, if BFI_COUNTER>=beamFailureInstanceMaxCount while the BFR timer is running, BFD is declared and UE performs actions for a deactivated second cell group. If the BFR timer expires, BFI_COUNTER is set to 0.

In some variants, the timer can be set to a lower value when the second cell group is in deactivated mode of operation so that BFR is not triggered as easily as in normal mode of operation. In some variants, BFI_COUNTER can be reset when the second cell group enters the deactivated mode of operation and/or when it enters the normal mode of operation.

In various embodiments, the UE can perform various actions based on whether BFD is declared. In some embodiments, the UE can trigger random access for BFR on the second cell group (e.g., with the SpCell of the second cell group) if BFD is declared. BFR can be configured per UL BWP. For the active UL BWPs, there can be at least the following options:

The UE considers the active UL BWP when the UE was in normal mode of operation as its active UL BWP of the selected carrier when the second cell group (e.g., PSCell) enters deactivated mode of operation.

When the second cell group enters deactivated mode of operation the active UL BWP changes, e.g., to an UL BWP configured, possibly to be used when the second cell group enters deactivated mode of operation.

When the second cell group enters deactivated mode of operation the active UL BWP changes to the UL BWP configured as initial uplink BWP (e.g., using initialUplinkBWP), the UL BWP configured as the first active uplink BWP (e.g., using firstActiveUplinkBWP-Id) or the UL BWP that belongs to the same BWP pair as the default DL BWP.

The UE can initiate random access (RA) for BFR (e.g., with the serving cell of the second cell group) based on parameters configured to be used for the second cell group in the normal mode of operation. In some embodiments, the UE can initiate a four-step RA procedure. This can be a contention-free RA (CFRA) procedure or a contention-based RA (CBRA) procedure. In one variant, the UE can perform four-step RA only for BFR. This is because BFR may not need to be very fast, and the network may want to limit the UL resources to be used for that procedure (e.g., only RACH resources are allocated, no allocation of PUSCH resources for the transmission of a MSG.A).

In other embodiments, the UE can initiate a two-step RA procedure. This can be a CFRA procedure or a CBRA procedure. This can be initiated only if certain conditions are fulfilled and/or if configured to be used when the second cell group is deactivated. A motivation to configure the UE to initiate a two-step RA is that BFR can be performed as fast as possible so that the second cell group (e.g., the cell where BFR is detected) is ready to be resumed and enter activated mode of operation where UE monitors PDCCH.

In some embodiments, the UE can initiate a RA procedure (e.g., two-step or four-step) for BFR while the second cell group is deactivated based on a different configuration and/or set of parameters than used to initiate BFR while the second cell group is activated.

The different BFR/RA parameters may be configured for a serving cell of the second cell group in a new beamFailureRecoveryConfig-deactivated-SCG IE or field, which possibly can be included in the BeamFailureRecoveryConfig IE show in FIG. 16. The following are some exemplary parameters that can be included in such an IE or field (see definitions in 3GPP TS 38.331 or 38.321):

rootSequenceIndex-BFR
rach-ConfigBFR of RACH-ConfigGeneric
rsrp-ThresholdSSB of RSRP-Range
candidateBeamRSList One possible strategy is to configure more SSBs for a deactivated second cell group, as the UE is not performing L1 reporting (e.g., beam reporting/CSI reporting) and the occurrence of the event should not be that often;

Another possible strategy is to configure fewer SSBs, if network wants to monitor fewer candidates while in deactivated mode of operation. These SSBs can be different than the ones configured for normal mode of operation.

One possible strategy is to configure only SSBs as candidates for BFR. In deactivated mode of operation, the node associated with the second cell group would not need to transmit CSI-RSs (which are not used by UEs in RRC_IDLE or RRC_INACTIVE) but may need to transmit SSBs. This can save some energy if UEs have second cell group in deactivated mode of operation.

One possible strategy is to configure only CSI-RSs with longer periodicity or transmitted in wider beams, so that it is easier for the UE to perform BFR.

One possible strategy is to configure more or fewer CSI-RSs for a deactivated second cell group than for an activated second cell group.

ssb-perRACH-Occasion;
ra-ssb-OccasionMaskIndex;
recoverySearchSpaceId of IE SearchSpaceId;
ra-Prioritization;
beamFailureRecoveryTimer;
msg1-SubcarrierSpacing of IE SubcarrierSpacing;
ra-PrioritizationTwoStep-r16 of IE RA-Prioritization;
candidateBeamRSListExt-v1610.

The different BFR/RA parameters may be configured in CellGroupConfig for the second cell group (e.g., within an RRCReconfiguration-like message), along with some indication that these BFR related parameters are to be used by the UE for the second cell group when the second cell group is in deactivated mode of operation. In some variants, the different BFR/RA parameters may be configured in the same message indicating that the second cell group is to be deactivated mode of operation.

In some variants, an absence of a specific BFR configuration for use in deactivated mode of operation may cause the UE to perform BFR based on the BFR configuration used in normal mode of operation for the second cell group. In other variants, an absence of a specific BFR configuration for use in deactivated mode of operation may cause the UE to refrain from performing BFR on the second cell group when it is in deactivated mode of operation. In other variants, the UE can be preconfigured with a default BFR configuration for when the second cell group is deactivated and no other BFR configuration for that case is available.

In some embodiments, initiating/performing the RA procedure for BFR (e.g., towards the PSCell) for the second cell group in deactivated mode of operation may involve the UE performing any of the following operations:

RACH Resource Selection: selection of at least one SSB or CSI-RS configured as a candidate for BFR;

Preamble transmission: This may be performed in the same way as for normal mode of operation;

Reception of Random Access Response (RAR): Upon transmission of a RA preamble in a cell of the second cell group that is deactivated, the UE monitors (exceptionally) PDCCH for the reception of the RAR in response to the preamble, according to the BFR configuration to be used when the second cell group is in deactivated mode of operation. In some variants, this may be done "exceptionally" because while the second cell group (e.g., SCG) is deactivated the UE is not supposed to monitor PDCCH. The UE performs the reception of the RAR in the DL beam it has selected for preamble transmission. In some variants, if a CFRA preamble for BFR request was transmitted by the MAC entity, the UE performs at least one of the actions:

Start the RAR window (e.g., according to ra-ResponseWindow) configured in BeamFailureRecoveryConfig (or equivalent configuration to be used when second cell group is deactivated) at the first PDCCH occasion (as specified in TS 38.213) from the end of the Random Access Preamble transmission;

Monitor for a PDCCH transmission on the search space indicated by a search space configured for BFR, e.g., according to recoverySearchSpaceId of the SpCell identified by the C-RNTI while the RAR window (e.g., ra-ResponseWindow) is running. For example, the monitoring occurs in the beam associated with the selected SSB during resource selection (i.e., assuming the selected SSB as the QCL source for the PDCCH to be monitored for the RAR);

When CFRA is used for BFR, the UE considers the RA procedure successfully completed when: 1) notification of a reception of a PDCCH transmission (e.g., on the search space indicated by recoverySearchSpaceId) is received from L1 for the Serving Cell where the preamble was transmitted (e.g., SpCell of the second cell group); and 2) the PDCCH transmission is addressed to the UE's C-RNTI.

When CBRA is used for BFR, the UE considers RAR reception successful when; 1) a valid DL assignment has been received on the PDCCH for the RA-RNTI; 2) the received Transport Block (TB) is successfully decoded; and 3) if the RAR contains a MAC sub-PDU with Random Access Preamble identifier corresponding to the transmitted CBRA preamble. In that case, the UE transmits MSG3 and performs contention-resolution, and performs at least one of the following actions for the serving cell of the second cell group that was in deactivated mode of operation:

Process a received Timing Advance Command: BFR is an opportunity for the network node associated with the second cell group in deactivated mode of operation to adjust timing advance;

Adjust power ramping parameters;

If the Random Access Preamble was not selected by the MAC entity among the contention-based Random Access Preamble(s), consider the Random Access procedure successfully completed otherwise perform the following actions:

Set the TEMPORARY C-RNTI to the value received in the RAR.

Indicate to the multiplexing and assembly entity to include a BFR MAC CE (e.g., a BFR MAC CE as in the case the second cell group is in normal mode of operation, a new BFR MAC CE for deactivated mode of operation, or a Truncated BFR MAC CE) in the subsequent uplink transmission.

Obtain the MAC PDU to transmit from the Multiplexing and assembly entity and store it in the Msg3 buffer. The MAC PDU can contain the MAC CE for contention resolution (i.e., including contention resolution identity) and/or additional information concerning BFD and BFR.

Transmit Msg3.

Perform contention resolution according to subclause 5.1.5 of TS 38.321; and, if contention resolution is considered successful, consider the random access procedure successful.

The following proposed specification text defines exemplary BFR MAC CEs including for the case where the UE triggers BFR for a serving cell in a cell group that is deactivated. This can be a BFR MAC CE or a truncated BFR MAC CE.

*Begin Proposed 3GPP Specification Text*

6.1.3.23 BFR MAC CEs

The MAC CEs for BFR consists of either:

BFR MAC CE; or

BFR MAC CE for a serving cell of a cell group in deactivated mode of operation; or Truncated BFR MAC CE.

The BFR MAC CE and Truncated BFR MAC CE are identified by a MAC subheader with LCID/eLCID as specified in Table 6.2.1-2 and Table 6.2.1-2b.

TABLE 6.2.1-2b

Values of one-octet eLCID for UL-SCH

| Codepoint | Index | LCID values |
|---|---|---|
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |
| 249 | x | BFR (four octets $C_i$) for a serving cell of a cell group in deactivated mode of operation |

*End Proposed 3GPP Specification Text*

In various embodiments, there may be different options for updating PDCCH TCI states upon BFR, e.g., when BFR triggers RA towards the second cell group. Several options are described below.

The UE considers the SSB selected during RA resource selection as the SSB/DL beam to be monitored for PDCCH when the UE receives the indication (e.g., from the MN) that the second cell group is to exit the deactivate state and enter a normal mode of operation. In other words, when the UE receives a command to transition the second cell group to an activated/normal mode of operation, the UE needs to start monitoring PDCCH and selects the source for PDCCH monitoring based on QCL relation with the SSB selected during random access for BFR.

During RA for BFR, the UE receives a MAC CE from a serving cell of the second cell group including a PDCCH TCI state indication. Upon reception, the UE updates its PDCCH TCI state(s) that upon transitioning the second cell group to activated/active/normal mode of operation, it uses the updated TCI states for PDCCH monitoring.

In general, the update of TCI state may lead to changes in the way the UE performs BFD. Hence, in one option, if the TCI state has been updated for PDCCH monitoring, the UE updates accordingly its QCL source for BFD monitoring (e.g., in case no RS is configured for BFD)

In another option, which may be used separate or together with the above options, the UE receives an RRCReconfiguration message that contains configurations of TCI states, BFD, and/or BFR.

Figure 19:
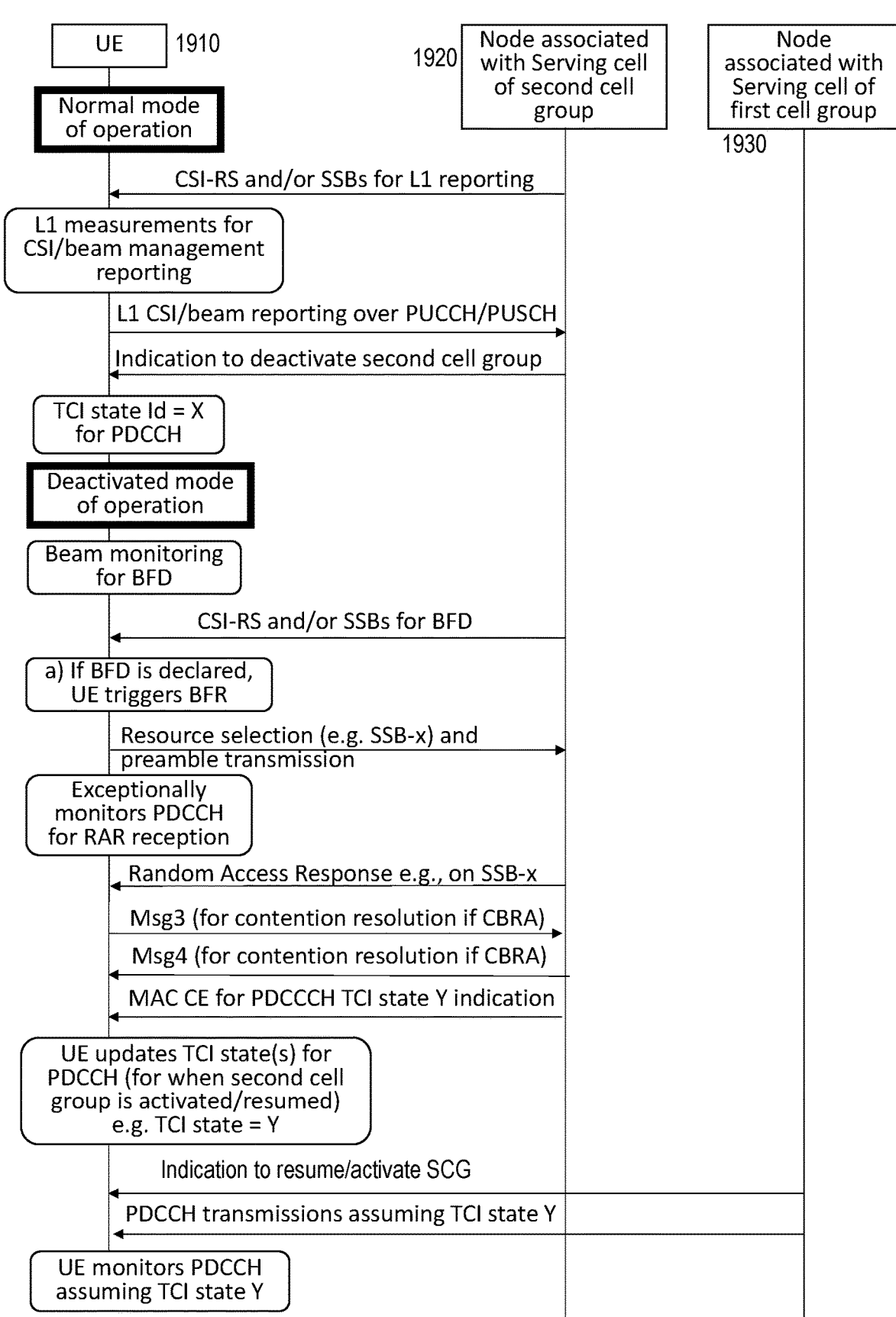

FIG. 19 shows a signal flow diagram that illustrates certain embodiments, particularly for the case of an update of PDCCH TCI states upon BFR when the second cell group is deactivated. The exemplary signaling shown in FIG. 19 is between a UE (1910), a node associated with the serving cell of the second cell group (e.g., SN 1920), and a node associated with the serving cell of the first cell group (e.g., MN 1930). As illustrated in FIG. 19, after performing a successful RA procedure for BFR towards the second cell group, the UE receives a MAC CE containing an updated PDCCH TCI state ("Y"). The UE later uses this updated TCI state after the second cell group is activated by the first cell group node.

Once the UE considers the RA procedure successfully completed, there can be different alternatives concerning the mode of operation of the second cell group. In some embodiments, the UE considers the second cell group to remain in the deactivated mode of operation and stops performing PDCCH monitoring for the second cell group (e.g., for the PSCell), stops performing L1 beam measurements and L1 beam reporting, etc.

In other embodiments, the UE transitions the second cell group from deactivated to normal mode of operation. As such, the triggering of BFR can be viewed as a UE-initiated resumption (or activation) of the second cell group and/or a way to establish beam alignment. At the network node associated with the second cell group (e.g., SN), upon reception of a preamble for BFR (for CFRA), or upon CBRA for BFR procedure, the node determines which mode of operation the second cell group should be in. For example, the node can indicate to the UE (e.g., via a MAC CE or RRC message) that the second cell group is to remain deactivated or is to return to activated/normal mode of operation.

In other embodiments, the UE expects a MAC CE including an indication of the mode of operation of the second cell group during the RA procedure. For example, when BFR is triggered and the second cell group is deactivated, the UE can receive during RA a MAC CE indicating the second cell group should remain deactivated. As another example, when BFR is triggered and second cell group is activated, the UE can receive during RA a MAC CE indicating that the second cell group should be deactivated. In either case, the UE acts according to the received MAC CE.

In other embodiments, the UE can employ a timer, which can be initiated once RA for BFR is successfully completed. While the timer is running, the UE considers the second cell group to be activated or operating in normal mode of operation and monitors PDCCH. This provides the network an opportunity to re-configure and/or update the UE via MAC CE, DCI, etc. The timer can stop upon reception of a message from the network indicating a mode of operation for the second cell group. Upon timer expiry, the UE transitions the second cell group from activated to deactivated mode of operation and resumes appropriate operations.

Figure 20:
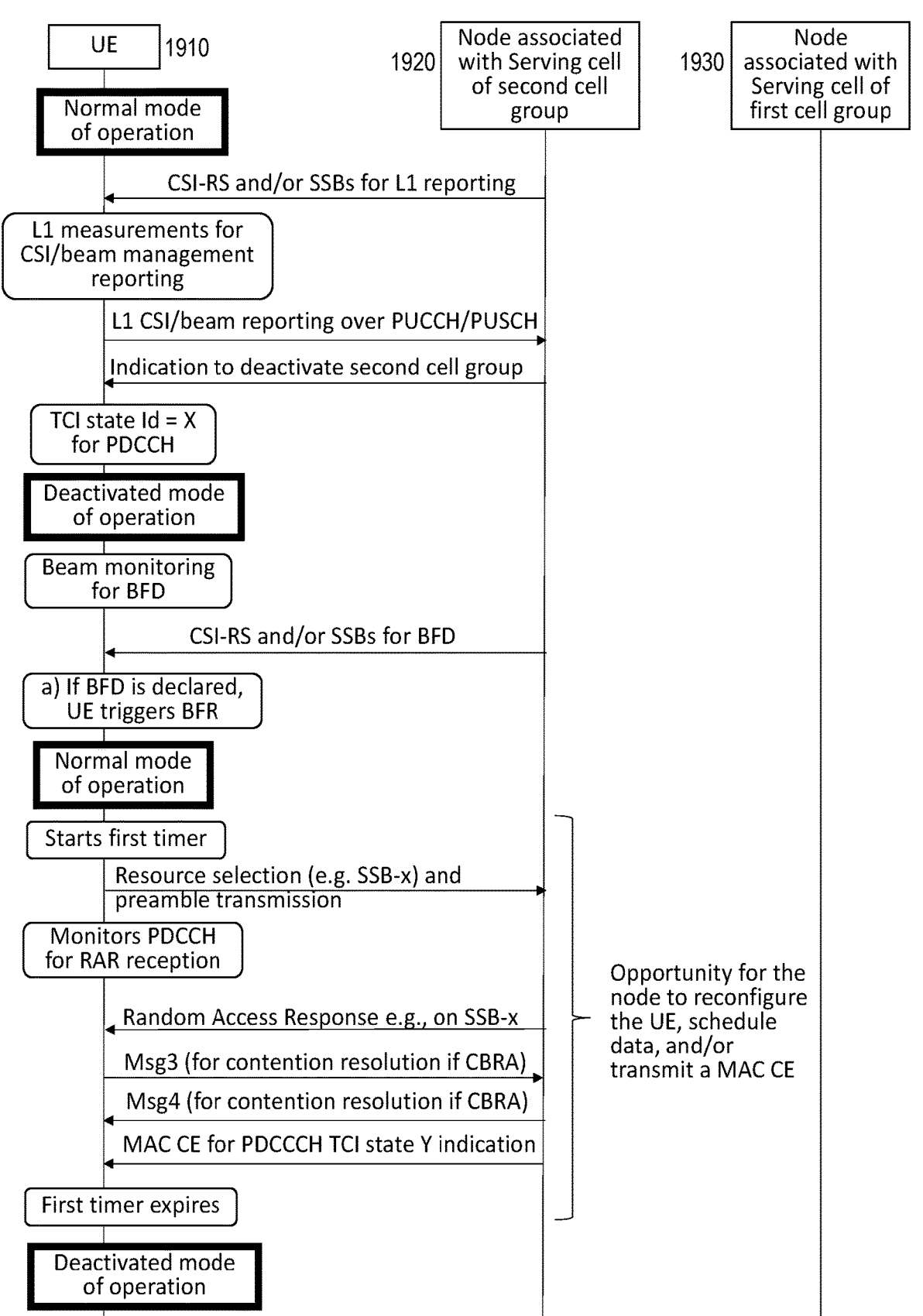
Figure 21:
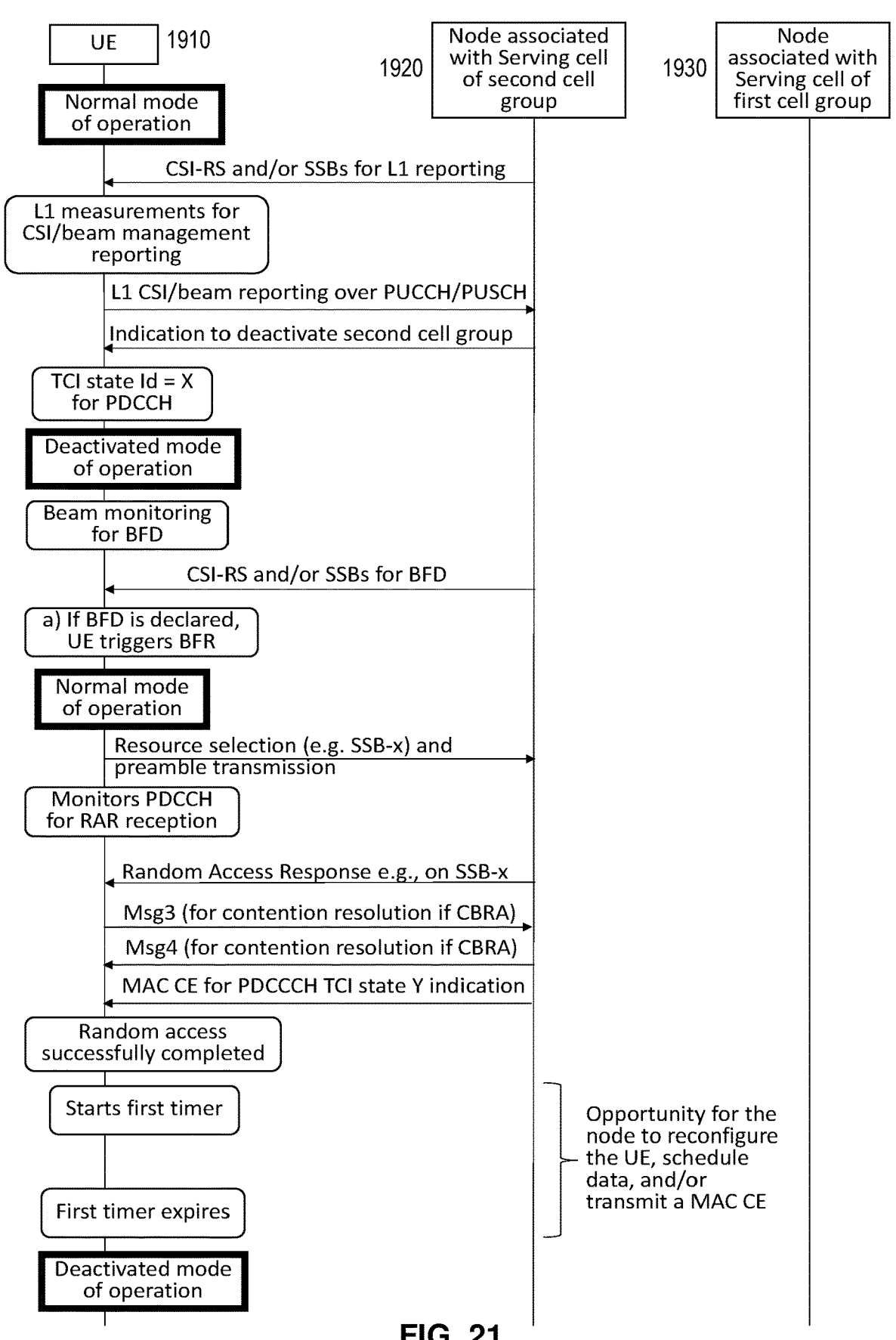

FIGS. 20-21 show signal flow diagrams that illustrates certain embodiments, particularly in relation to operation of the timer described above. The exemplary signaling shown in FIGS. 20-21 is between a UE (1910), a node associated with the serving cell of the second cell group (e.g., SN 1920), and a node associated with the serving cell of the first cell group (e.g., MN 1930). As illustrated in FIG. 20, the UE starts the timer ("first timer") before resource selection for RA and after the UE has transitioned the second cell group to normal mode of operation. The timer expires after the RA procedure has completed, at which the UE returns the second cell group to deactivated mode of operation. Alternately, as illustrated in FIG. 21, the UE starts the timer ("first timer") after the UE has successfully completed the RA procedure. At expiry of the timer, the UE returns the second cell group to deactivated mode of operation.

In some embodiments, the UE can utilize a second timer in relation to RA for BFR. The second timer can be started once RA for BFR is successfully completed. While the second timer is running, the UE considers the second cell group as deactivated and refrains from monitoring PDCCH while the second timer is running. The UE stops the second timer stops upon receiving a message from the network indicating a mode of operation for the second cell group. Upon second timer expiry, the UE transitions the second cell group from deactivated to activated, at which time the network can re-configure, update, and/or schedule data for the UE via MAC CE, DCI, etc.

In some embodiments, performing various actions based on whether BFD is declared can include the UE resetting counters and timers related to BFD and BFR for the second cell group upon transitioning the second cell group (e.g., SCG) to deactivated mode of operation. This can include any of the following:

BFI_COUNTER per Serving Cell, which can be set to 0 upon transitioning the second cell group (e.g., SCG) to deactivated mode of operation;
  BFI_COUNTER per Serving Cell, which can be set to 0 upon transitioning the second cell group (e.g., SCG) to normal/activated mode of operation;
  BFD timer (e.g., beamFailureDetectionTimer) is stopped, if running, when the Serving Cell (e.g., PSCell) transitions to deactivated mode of operation;
  BFD timer (e.g., beamFailureDetectionTimer) is stopped, if running, when the Serving Cell (e.g., PSCell) transitions to normal/activated mode of operation.

The following illustrates how certain embodiments could possibly be specified in 3GPP TS 38.321, particularly for the case the UE triggers BFR upon BFD while the second cell group is deactivated. However, these excerpts are not intended to be exhaustive and may omit certain text that is substantially unrelated to the exemplary embodiments.

*Begin Proposed 3GPP Specification Text*
5.17 Beam Failure Detection and Recovery Procedure
  ( . . . )
  RRC configures the following parameters in the BeamFailureRecoveryConfig and the RadioLinkMonitoringConfig for the Beam Failure Detection and Recovery procedure:
  ( . . . )
  If the Serving Cell is associated with a cell group in deactivated mode of operation (e.g., SpCell of the SCG is deactivated), the different values for radioLinkMonitoringConfig-SCG-deactivated and beamFailureRecoveryConfig-deactivated-SCG for the Beam Failure Detection and Recovery procedure apply; if these configurations are absent, the UE assumes the ones configured in radioLinkMonitoringConfig and beamFailureRecoveryConfig.

The following UE variables are used for the beam failure detection procedure:
  BFI_COUNTER (per Serving Cell): counter for beam failure instance indication which is initially set to 0. This is also set to 0 when the Serving Cell (e.g., PSCell) transitions to deactivated mode of operation.
  The beamFailureDetectionTimer is stopped, if running, when the Serving Cell (e.g., PSCell) transitions to deactivated mode of operation The MAC entity shall for each Serving Cell configured for beam failure detection:
  1>if beam failure instance indication has been received from lower layers:
    2> start or restart the beamFailureDetectionTimer;
    2>increment BFI_COUNTER by 1;
    2>if BFI_COUNTER>=beamFailureInstanceMaxCount:
      3> if the Serving Cell is SCell:
        4>trigger a BFR for this Serving Cell;
      3>else:
        4>initiate a Random Access procedure (see clause 5.1) on the SpCell.
  1>if the beamFailureDetectionTimer expires; or
  1>if the Serving Cell enters deactivated mode of operation (e.g., PSCell); or
  1> if beamFailureDetectionTimer, beamFailureInstanceMaxCount, or any of the reference signals used for beam failure detection is reconfigured by upper layers associated with this Serving Cell:
    2>set BFI_COUNTER to 0.
  1>if the Serving Cell is SpCell and the Random Access procedure initiated for SpCell beam failure recovery is successfully completed (see clause 5.1):
    2>set BFI_COUNTER to 0;
    2>stop the beamFailureRecoveryTimer, if configured;
    2>consider the Beam Failure Recovery procedure successfully completed.
  1>else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
  1>if the SCell is deactivated as specified in clause 5.9:
    2>set BFI_COUNTER to 0;
    2>consider the Beam Failure Recovery procedure successfully completed and cancel all the triggered BFRs for this Serving Cell.

( . . . )
5.1 Random Access Procedure
5.1.1 Random Access Procedure Initialization RRC configures the following parameters for the Random Access procedure:

( . . . )

rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecoveryConfig IE;

( . . . )

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

( . . . )

the set of Random Access Preambles and/or PRACH occasions for beam failure recovery request, if any;

When the Random Access procedure is initiated on a Serving Cell, the MAC entity shall:

( . . . )

1>if the Random Access procedure was initiated for SpCell beam failure recovery (as specified in clause 5.17) and if the contention-free Random Access Resources for beam failure recovery request for 4-step RA type have been explicitly provided by RRC for the BWP selected for Random Access procedure; or 1>if the Random Access procedure was initiated for reconfiguration with sync and if the contention-free Random Access Resources for 4-step RA type have been explicitly provided in rach-ConfigDedicated for the BWP selected for Random Access procedure:

2> set the RA TYPE to 4-stepRA.

1>else if the BWP selected for Random Access procedure is configured with both 2-step and 4-step RA type Random Access Resources and the RSRP of the downlink pathloss reference is above msgA-RSRP-Threshold; or 1>if the BWP selected for Random Access procedure is only configured with 2-step RA type Random Access resources (i.e., no 4-step RACH RA type resources configured); or 1>if the Random Access procedure was initiated for reconfiguration with sync and if the contention-free Random Access Resources for 2-step RA type have been explicitly provided in rach-ConfigDedicated for the BWP selected for Random Access procedure:

2> set the RA TYPE to 2-stepRA.

1>else:

2> set the RA TYPE to 4-stepRA.

1>perform initialization of variables specific to Random Access type as specified in clause 5.1.1a;

1>if RA TYPE is set to 2-stepRA:

2> perform the Random Access Resource selection procedure for 2-step RA type (see clause 5.1.2a).

1>else:

2> perform the Random Access Resource selection procedure (see clause 5.1.2).

*End Proposed 3GPP Specification Text*

In other embodiments, the UE does not trigger RA for BFR in response to detecting occurrence of beam failure for the second cell group. In various embodiments, this can involve the UE refraining from performing RA towards the PSCell upon BFD, or the UE performing RA later when the second cell group is activated (resumed) but not upon the triggering BFR. In the latter case, if BFD is declared for a cell in the second cell group that is deactivated, the UE delays the initiation of random access until when the second cell group transitions to normal mode of operation.

These embodiments can involve various operations of protocol layers and/or protocol entities in the UE, which can be used synonymously unless otherwise specified. For example, a MAC layer can be referred to as a MAC entity or MAC layer entity, and includes a set of parameters, configurations, and state information associated with the MAC protocol.

In some of these embodiments, upon detecting occurrence of BFD while the second cell group is deactivated, the UE sets a variable indicating that BFD (e.g., for the SpCell or at least one SCell of the second cell group) was detected. For example, the UE can set a state variable (e.g., BFD_DETECTED) to 'true'.

In some of these embodiments, upon detecting occurrence of BFD while the second cell group is deactivated, the UE increments a counter (e.g., BFD COUNTER). The counter having a value higher than 1 indicates that the UE BFD has been detected while the second cell group was deactivated.

In some of these embodiments, upon detecting occurrence of BFD while the second cell group is deactivated, the UE stops beam monitoring and/or measurements on RS resources configured for the purpose of BFD.

In some of these embodiments, upon detecting occurrence of BFD while the second cell group is deactivated, the UE could continue beam monitoring. If the link is considered to be recovered (according to pre-defined criteria based on the continued beam monitoring), the UE can re-start BFD procedures, re-start timers, and reset counters to 0.

When beam failure is detected, the MAC layer (or any protocol layer where beam failure is detected) indicates that to the higher layers (e.g., RRC), so that information can later be used as criterion for further UE actions controlled by higher layers (e.g., decisions whether to perform RA upon resumption of the second cell group). In some embodiments, higher layers (e.g., RRC) can at any time request from lower layers (e.g., MAC) an indication of whether beam failure has been detected for a cell of the second cell group that is in deactivated mode of operation.

In some embodiments, further actions may be taken later depending on whether beam failure was detected or not for the second cell group that is in deactivated mode of operation. In some variants, if the UE receives an indication from the network to resume the second cell group (e.g., RRC message or MAC CE, received via a cell in the first cell group), the UE determines whether beam failure was detected.

In one alternative, assuming the resumption of the second cell group is handled at RRC layer (e.g., based on RRC message to resume), the RRC layer can be aware of BFD by RRC requesting MAC layer of the second cell group (e.g., MAC entity of the SCG) an indication (e.g., BFD_DETECTED) of whether beam failure has been detected for a cell of the second cell group that is in deactivated mode of operation. Alternately, the RRC layer may be already aware of that information if the MAC layer has notified RRC that BFD has occurred (e.g., via internal UE processes). Based on that information, the RRC layer may trigger further actions (e.g., RA towards the second cell group upon resume/activation).

FIGS. 22A-B illustrate two exemplary models for communication among UE layers regarding BFD indications. In particular, the communication is between an RRC entity (or layer) and a MAC entity of the second cell group. The exemplary model in FIG. 22A is based on the RRC entity requesting from the MAC entity an indication of whether beam failure has been detected for a cell of the second cell group that is in deactivated mode of operation. This can be done in response to an RRC message from the network requesting the UE to resume the second cell group. In contrast, the exemplary model in FIG. 22B is based on the MAC entity sending to the RRC entity an unsolicited indication of whether beam failure has been detected for a cell of the second cell group that is in deactivated mode of operation. The RRC entity can use this information later in response to a network request to resume the second cell group.

The following illustrates how UE MAC and RRC layer operations for certain embodiments could be specified in 3GPP TS 38.321 and 38.331, respectively. However, these excerpts are not intended to be exhaustive and may omit certain text that is substantially unrelated to the exemplary embodiments.

*Begin Proposed 3GPP 38.321 Text*

5.17 Beam Failure Detection and Recovery Procedure ( . . . )

The MAC entity shall for each Serving Cell configured for beam failure detection:

1>if beam failure instance indication has been received from lower layers:

2> start or restart the beamFailureDetectionTimer;

2>increment BFI_COUNTER by 1;

2>                          if BFI_COUNTER>=beamFailureInstanceMaxCount:

3> if the Serving Cell is SCell:

4>trigger a BFR for this Serving Cell;

3>if the Serving Cell is in deactivated mode of operation:

4>indicate to higher layers that beam failure is detected;

3>else:

4>initiate a Random Access procedure (see clause 5.1) on the SpCell.

1> if the beamFailureDetectionTimer expires; or ( . . . )

*End Proposed 3GPP 38.321 Text*

*Begin Proposed 3GPP 38.331 Text*

5.3.5.3 Reception of an RRCReconfiguration by the UE

The UE shall perform the following actions upon reception of the RRCReconfiguration, or upon execution of the conditional reconfiguration (CHO or CPC):

( . . . )

1> if the RRCReconfiguration includes the resumeDeactivatedSCG:

( . . . )

2> if lower layers of the SCG indicated that beam failure was detected:

3>initiate the Random Access procedure on the SpCell of the SCG, as specified in TS 38.321 [3];

*End Proposed 3GPP 38.331 Text*

In another alternative, the UE RRC layer can request the MAC layer to resume the second cell group in the deactivated state, based on the UE receiving an RRC message from the network to that effect. The MAC entity of the second cell group is aware of the value of BFD_DETECTED and acts accordingly in response to the RRC request. For example, if BFD_DETECTED is "true", then the MAC layer of the second cell group can initiates RA, but otherwise the UE can monitor PDCCH based on the last indicated TCI state.

In another alternative, the UE RRC layer generates an RRC message (e.g., RRCReconfigurationComplete) that is submitted to lower layers for transmission in the second cell group. The MAC entity of the second cell group is aware of the value of BFD_DETECTED and acts accordingly in response to the RRC message. For example, if BFD_DETECTED is "true", then the MAC layer of the second cell group can initiates RA for initial beam alignment and for obtaining scheduling grants for transmitting the RRC message.

Figure 23:
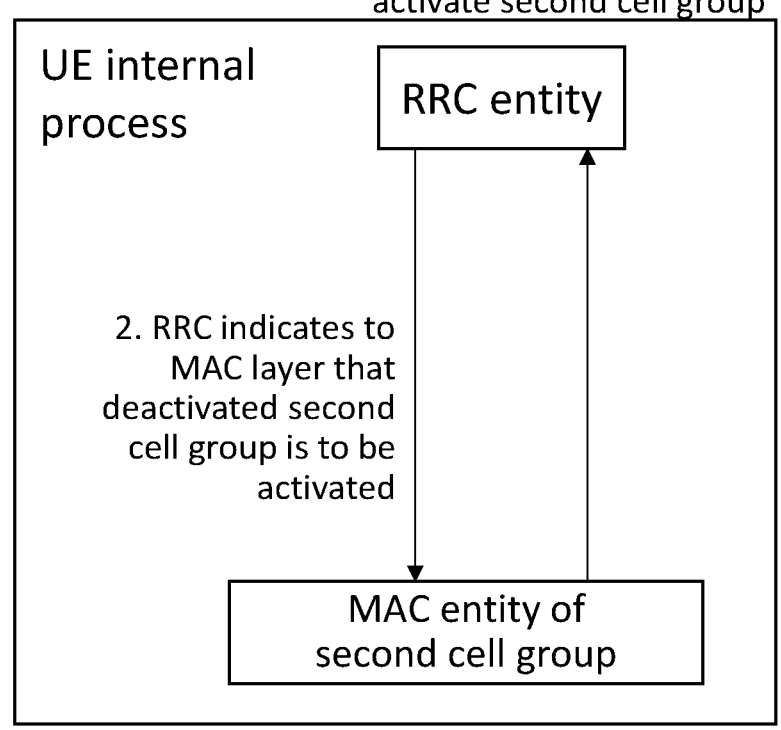

FIG. 23 illustrates an exemplary model for communication among UE layers regarding BFD indications. In particular, the communication is between an RRC entity (or layer) and a MAC entity of the second cell group. The exemplary model in FIG. 23 is based on the RRC entity informing the MAC entity that the second cell group is to be activated, e.g., based on a request from the network. The MAC layer is aware of whether beam failure has been detected for a cell of the second cell group being activated. If so, the MAC layer initiates RA.

In other embodiments, resumption of the second cell group can be handled at the MAC layer of the MCG, e.g., based on the UE receiving a MAC CE to resume/activate the second cell group. There can be at least the following variants of these embodiments:

In some variants, the MCG MAC entity requests the SCG MAC entity whether beam failure was detected. If SCG MAC layer responds that beam failure was detected, the MCG MAC entity requests the SCG MAC layer to take further actions, e.g., initiate RA on the SCG. If no beam failure was detected, SCG MAC layer monitors PDCCH assuming last indicated TCI state for the PDCCH.

In some variants, the MCG MAC entity requests the SCG MAC entity to resume the operation. If beam failure was detected, SCG MAC entity takes further actions, e.g., initiate random access on the SCG. If no beam failure was detected, SCG MAC layer monitors PDCCH assuming last indicated TCI state for the PDCCH.

In some embodiments, if beam failure was detected in the second cell group, the UE can perform RA towards the SpCell of the second cell group when resuming the second cell group. In some variants, this can be a four-step RA procedure, which optionally may be used exclusively for resume in this scenario. In other variants, this can be a two-step RA procedure. This can be a CFRA procedure or a CBRA procedure. This can be initiated only if certain conditions are fulfilled and/or if configured to be used when the second cell group is deactivated.

In some embodiments, if beam failure was not detected in the second cell group, the UE can start to monitor PDCCH upon resumption/activation of the SpCell of the second cell group, without the need to perform RA for the purpose of initial beam alignment. Even so, RA may still be required for other reasons such as time alignment. Monitoring PDCCH may require knowledge of the PDCCH TCI state, which the UE can assume as the last indicated TCI (e.g., in MAC CE during BFR procedure).

In some embodiments, the RA procedure performed if beam failure was detected in the second cell group can be different from the RA procedure performed if beam failure was not detected. Additionally, either or both of these may be different from the RA procedure performed for another reason (e.g., UL time alignment). As an example, different RA resources may be used, such that the RA procedure at resumption/activation is performed on resources related to the new best beam or that different specific dedicated PRACH preambles are used.

In some embodiments, the UE only performs BFR with the SpCell of the second cell group that is deactivated. In other words, the UE stops BFR, if configured, for the SCells of the second cell group.

FIG. 24 shows a signal flow diagram that illustrates certain embodiments, particularly for a case where the UE does not initiate RA upon BFD. The exemplary signaling shown in FIG. 24 is between a UE (1910), a node associated with the serving cell of the second cell group (e.g., SN 1920), and a node associated with the serving cell of the first cell group (e.g., MN 1930). As illustrated in FIG. 24, the UE delays RA towards the second cell group until receiving (e.g., from the node associated with the first cell group, e.g., MN) an indication to resume/activate the currently deactivated second cell group.

Figure 25:
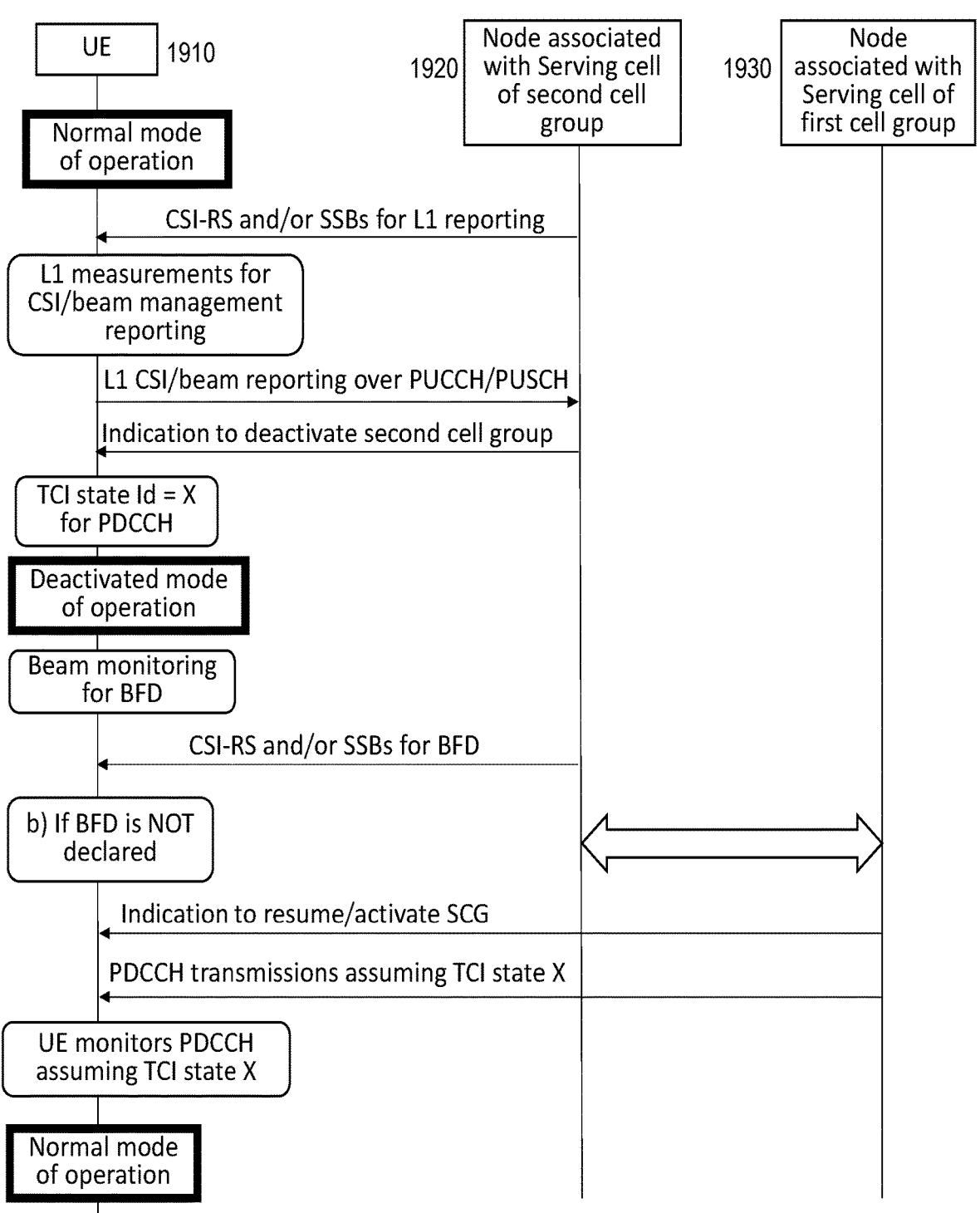

FIG. 25 shows a signal flow diagram that illustrates certain other embodiments, particularly for a case where the UE does not detect beam failure in the second cell group. The exemplary signaling shown in FIG. 25 is between a UE (1910), a node associated with the serving cell of the second cell group (e.g., SN 1920), and a node associated with the serving cell of the first cell group (e.g., MN 1930). Since beam failure is not declared in the second cell group, upon receiving the indication to resume/activate the second cell group, the UE begins monitoring PDCCH in the second cell group using PDCCH TCI state previously configured.

In some embodiments, when beam failure is declared in the deactivated second cell group, the UE can indicate this condition to the network via the first cell group. For example, the UE can initiate transmission via the serving cell of the first cell group (e.g., PCell for MCG of a UE configured with MR-DC), based on configured parameters to be used for normal operating mode of the activated first cell group. In some embodiments, this indication can be transmitted as an RRC message.

FIGS. 26A-B show ASN.1 data structures for two exemplary IEs used to indicate BFD in a deactivated SCG. In particular, FIG. 26A shows an ASN.1 data structure for an SCGFailureInformation message as defined in 3GPP TS 38.331, particularly for the case where the MCG and SCG are NR. The message has been updated to include a new failure Type value of BFD". FIG. 26B shows an ASN.1 data structure for an SCGFailureInformationNR message as defined in 3GPP TS 36.331, particularly for the case where the MCG is EUTRA/LTE and the SCG is NR. The message has also been updated to include a new failure Type value of "BFD". Alternately, a ULInformationTransferMRDC RRC message defined in 3GPP TS 38.331 can be used to carry the indication, e.g., in a MeasurementReport, FailureInformation or a new field or IE.

In other embodiments, the indication of BFD in the deactivated second cell group can be by MAC CE. In some variants, a new MAC CE can be introduced for this purpose. In the simplest form, there is no need for a payload in the MAC CE and it is sufficient to reserve a new logical channel ID (LCID) identifying the new MAC CE in 3GPP TS 38.321

(e.g., in existing table 6.2.1-1). The following provides exemplary text for 3GPP TS 38.321 according to these embodiments.

\*\*\*Begin Proposed Text for 3GPP TS 38.321\*\*\*

6.1.3 MAC Control Elements (CEs)[ . . . ]

6.1.3.5 Secondary Cell Group BFR MAC CE

The Secondary Cell Group BFR MAC CE is identified by a MAC subheader with LCID as specified in Table 6.2.1-1. It has a fixed size of zero bits.

[ . . . ]

6.1.3.23 BFR MAC CEs

The MAC CEs for BFR consists of either:

BFR MAC CE; or

BFR MAC CE for a serving cell of the secondary cell group; or

Truncated BFR MAC CE.

The BFR MAC CE and Truncated BFR MAC CE are identified by a MAC subheader with LCID/eLCID as specified in Table 6.2.1-2 and Table 6.2.1-2b.

TABLE 6.2.1-2

| Values of LCID for UL-SCH | |
| --- | --- |
| Codepoint/Index | LCID values |
| . . . | . . . |
| 50 | BFR (one octet $C_i$) |
| 51 | Truncated BFR (one octet $C_i$) |
| . . . | . . . |
| 64 | BFR (one octet $C_i$) for a serving cell of the secondary cell group |

TABLE 6.2.1-2b

| Values of one-octet eLCID for UL-SCH | | |
| --- | --- | --- |
| Codepoint | Index | LCID values |
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |
| 256 | 320 | BFR (four octets $C_i$) for a serving cell of the secondary cell group |

\*\*\*End Proposed Text for 3GPP TS 38.321\*\*\*

In other embodiments, the current BFR MAC CE can be extended to enable indicating BFR also for the second cell group. At the network side, the MN receiving the BFR MAC CE determines whether it is for a serving cell of the first cell group or the second cell group; when it is for a serving cell of the second cell group, the MN forwards it to the SN associated with the second cell group. Two indication options are possible. In one option, the UE includes in the BFR MAC CE the serving cell index associated with the serving cell where BFD has been detected. In another option, the UE includes in the BFR MAC CE a new identification of the cell group to indicate whether the reported BFR MAC is for a first cell group or for a second cell group.

The following provides exemplary text for 3GPP TS 38.321 according to these embodiments.

\*\*\*Begin Proposed Text for 3GPP TS 38.321\*\*\*

6.1.3.23 BFR MAC CEs

The MAC CEs for BFR consists of either:

BFR MAC CE; or

Truncated BFR MAC CE.

The BFR MAC CE and Truncated BFR MAC CE are identified by a MAC subheader with LCID/eLCID as specified in Table 6.2.1-2 and Table 6.2.1-2b.

TABLE 6.2.1-2

Values of LCID for UL-SCH

| Codepoint/Index | LCID values |
|---|---|
| . . . | . . . |
| 50 | BFR (one octet $C_i$). This is applicable for serving cells in different cell groups. |
| 51 | Truncated BFR (one octet $C_i$). This is applicable for serving cells in different cell groups |
| . . . | . . . |

TABLE 6.2.1-2b

Values of one-octet eLCID for UL-SCH

| Codepoint | Index | LCID values |
|---|---|---|
| 0 to 249 | 64 to 313 | Reserved |
| 250 | 314 | BFR (four octets $C_i$). This is applicable for serving cells in different cell groups |
| 251 | 315 | Truncated BFR (four octets $C_i$). This is applicable for serving cells in different cell groups |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

*End Proposed Text for 3GPP TS 38.321*

In some embodiments, a new BFR MAC CE can be introduced, wherein it is possible to include BFR information for any configured serving cell, regardless of the cell group. Two indication options are possible. In one option, the UE includes a cell group ID, set to different value depending on whether BFD was detected for a serving cell in the first cell group, the second cell group, an n-th cell group, etc. In another option, a larger number of serving cell indexes can be used, so that it is possible to refer to a serving cell of the second cell group even if BFR is reported in a first cell group.

Figure 27:
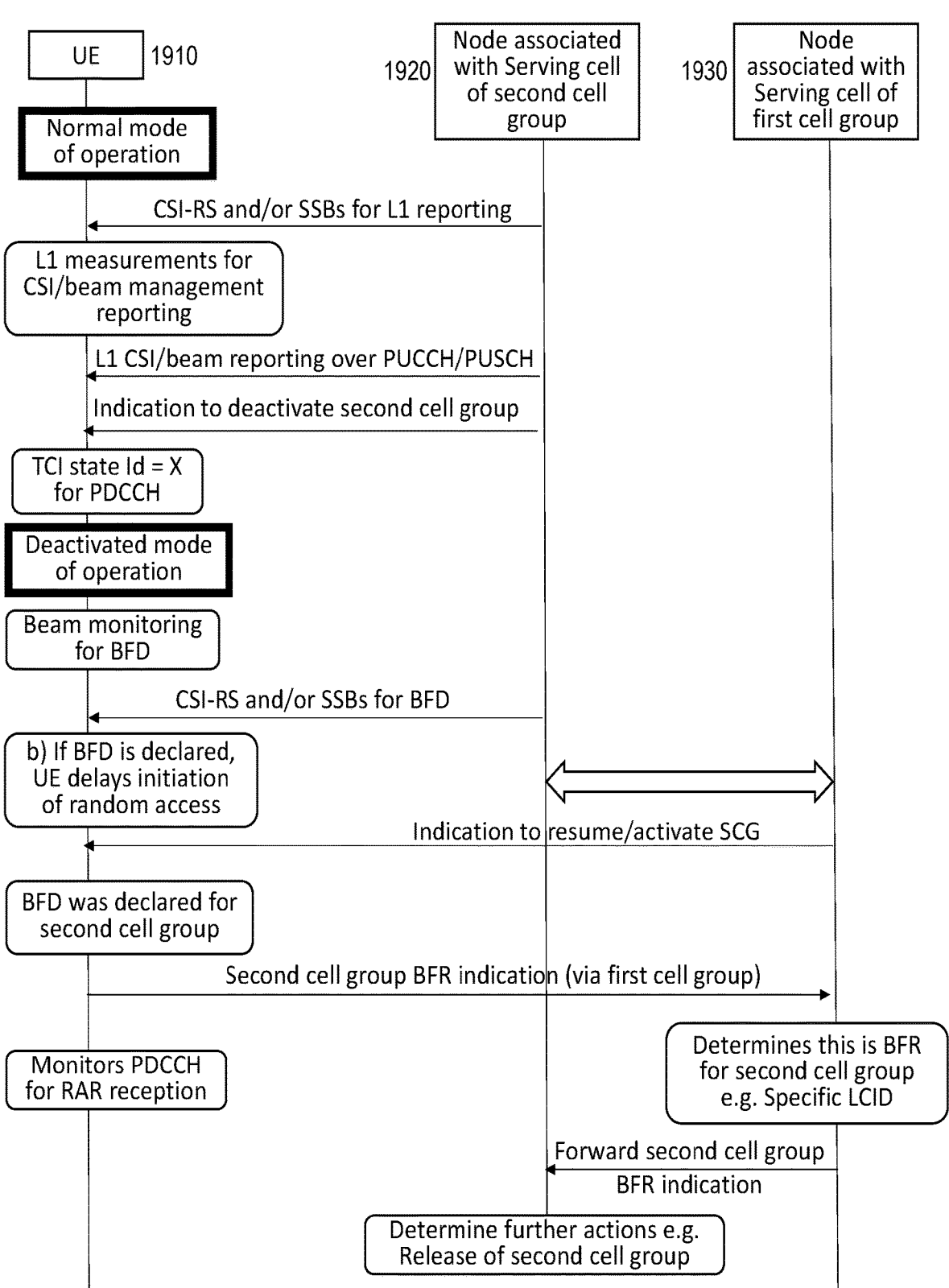

FIG. 27 shows a signal flow diagram that illustrate certain embodiments, particularly for the case of inter-cell group reporting of BFD. The exemplary signaling shown in FIG. 27 is between a UE (1910), a node associated with the serving cell of the second cell group (e.g., SN 1920), and a node associated with the serving cell of the first cell group (e.g., MN 1930). In this scenario, the UE reports the indication of beam failure in the deactivated second cell group to the node associated with the first cell group. This node (e.g., MN) determines that this indication is related to the second cell group and forwards it to the node associated with the second cell group. This node can take further actions based on the indication, such as release of second cell group.

The embodiments described above can be further illustrated with reference to FIGS. 28-30, which show exemplary methods (e.g., procedures) performed by a UE, a second network node, and a first network node, respectively. In other words, various features of operations described below correspond to various embodiments described above. These exemplary methods can be used cooperatively to provide various exemplary benefits and/or advantages. Although FIGS. 28-30 show specific blocks in particular orders, the operations of the respective methods can be performed in different orders than shown and can be combined and/or divided into blocks having different functionality than shown. Optional blocks or operations are indicated by dashed lines.

In particular, FIG. 28 shows a flow diagram of an exemplary method (e.g., procedure) for a UE configured to communicate with a wireless network via an MCG and an SCG, according to various embodiments of the present disclosure. The exemplary method can be performed by a UE (e.g., wireless device, IoT device, modem, etc. or component thereof) such as described elsewhere herein.

The exemplary method can include operations of block 2810, where the UE can entering a reduced-energy mode for the SCG responsive to receiving a first command via the MCG or the SCG. The exemplary method can also include operations of block 2820, where the UE can, while in the reduced-energy mode for the SCG and in an activated mode for the MCG, perform beam failure detection (BFD) for the SCG and refrain from performing one or more beam management operations for the SCG.

In some embodiments, performing BFD for the SCG while in the reduced-energy mode for the SCG (e.g., in block 2820) is based on one or more of the following:

continuing BFD for the SCG that was being performed before receiving the first command;

an SCG BFD configuration specific to the reduced-energy mode for the SCG;

a subset of the serving cells of the SCG, the subset being configured by the wireless network; and resetting one or more timers or counters, related to SCG BFD, that were running before receiving the first command.

In some of these embodiments, performing BFD for the SCG while in the reduced-energy mode for the SCG includes the operations of sub-block 2821, where the UE can perform BFD for the serving cells that are included in the subset and refrain from performing BFD for the serving cells of the SCG that are not included in the subset. In particular, the subset can include n serving cells, n=0 . . . N–1, where N is the number of serving cells of the SCG.

In some embodiments, the one or more beam management operations for the SCG (i.e., which the UE refrains from performing) include any of the following: performing layer-1 (L1) measurements of beams associated with the SCG; and reporting L1 measurements performed on beams associated with the SCG.

In some embodiments, the exemplary method can also include operations of block 2850, where the UE can perform one or more operations after detecting a beam failure in the SCG while in the reduced-energy mode for the SCG, the one or more operations including any of the following (identified by respective sub-block numbers):

(2851) exiting the reduced-energy mode for the SCG and entering an activated mode for the SCG;

(2852) performing a random access (RA) procedure towards the SCG;

(2855) indicating to a higher protocol layer in the UE that the beam failure in the SCG was detected by a lower protocol layer of the UE;

(2856) sending, to the second network node or to a first network node configured to provide the MCG, an indication that beam failure was detected in the SCG; and (2857) receiving, from the first network node, a second command indicating a mode for the SCG.

In some of these embodiments, the RA procedure is initiated for beam failure recovery and is responsive to detecting the beam failure associated with the SCG; the second command is received after completing the RA procedure and indicates the activated mode for the SCG; and entering the activated mode for the SCG is responsive to the second command. FIG. 19 shows examples of these embodiments.

In some variants, the exemplary method can also include the operations of blocks 2830 and 2860. In block 2830, the UE can, while in the reduced-energy mode for the SCG and in the activated mode for the MCG, receive via the MCG a TCI state associated with a PDCCH of the SCG. In block 2860, the UE can, upon entering the activated mode for the SCG, monitor the PDCCH of the SCG based on the received TCI state. In some further variants, the received TCI state is different than a most recent TCI state associated with the PDCCH of the SCG, the most recent TCI state being received before entering the reduced-energy mode for the SCG (e.g., in block 2810).

In other of these embodiments, entering the activated mode for the SCG is responsive to detecting the beam failure in the SCG, and performing the RA procedure towards the SCG (e.g., in sub-block 2852) is responsive to entering the activated mode for the SCG. FIGS. 20-21 show examples of these embodiments.

In some variants, the exemplary method can also include the operations of block 2870 or block 2880. In block 2870, the UE can exit the activated mode for the SCG and enter the reduced-energy mode for the SCG. In block 2880, the UE can set the SCG mode according to the second command (i.e., when received).

In further variants, the one or more operations performed in block 2850 after detecting a beam failure in the SCG while in the reduced-energy mode for the SCG include the operations of sub-block 2853, where the UE can initiate a first timer responsive to one of the following: entering the activated mode for the SCG (e.g., sub-block 2851), or successful completion of the RA procedure (e.g., sub-block 2852). In such variants, exiting the activated mode for the SCG and entering the reduced-energy mode for the SCG are responsive to expiration of the first timer without receiving the second command.

In other of these embodiments, performing the RA procedure towards the SCG is for beam failure recovery and is responsive to detecting the beam failure associated with the SCG. Also, the one or more operations performed in block 2850 after detecting a beam failure in the SCG while in the reduced-energy mode for the SCG include the operations of sub-block 2854, where the UE can initiate a second timer responsive to successful completion of the RA procedure (e.g., in sub-block 2852). In such variants, entering the activated mode for the SCG is responsive to expiration of the second timer without receiving the second command.

In other of these embodiments, performing the RA procedure towards the SCG (e.g., in sub-block 2852) is responsive to receiving the second command (e.g., in sub-block 2857), which indicates the activated mode for the SCG. Also, exiting the reduced-energy mode for the SCG and entering an activated mode for the SCG (e.g., in sub-block 2851) is responsive to successful completion of the RA procedure. FIG. 24 shows an example of these embodiments.

In some variants of these and certain other embodiments, the RA procedure towards the SCG is initiated by the higher protocol layer of the UE based on the indication that the beam failure was detected by the lower protocol layer of the UE.

In some of these embodiments, the indication that the beam failure was detected in the SCG is sent to the second network node during the RA procedure towards the SCG and performing the RA procedure towards the SCG (e.g., in sub-block 2852) includes receiving, via the SCG, a TCI state associated with a PDCCH of the SCG. In such embodiments, the TCI state is based on the indication that the beam failure was detected in the SCG. FIGS. 20-21 and 24 show examples of these embodiments. In some variants, the indication that the beam failure was detected in the SCG is sent as a MAC CE via a logical channel that is associated with BFR for an SCG in reduced-energy mode.

In other of these embodiments, sending the first network node the indication that a beam failure was detected in the SCG (e.g., in sub-block 2856) is responsive to receiving the second command (e.g., in sub-block 2857), which indicates the activated mode for the SCG. Also, performing the RA procedure towards the SCG (e.g., in sub-block 2852) is responsive to sending the indication, and exiting the reduced-energy mode for the SCG and entering an activated mode for the SCG (e.g., in sub-block 2851) is responsive to successful completion of the RA procedure towards the SCG. FIG. 27 shows an example of these embodiments.

In some variants, the indication is sent to the first network node as one of the following:

an SCG failure information field in an RRC message, the field having a particular value that indicates beam failure;

a MAC CE via a logical channel associated with SCG beam failure reporting (BFR); and a MAC CE that is associated with BFR and that includes an identifier of the SCG.

In some of these embodiments, the RA procedure performed towards the SCG (e.g., in 2852) is different than one or more of the following:

a first RA procedure performed towards the SCG after not detecting a beam failure in the SCG while in the reduced-energy mode for the SCG; and a second RA procedure performed towards the SCG while in the activated mode for the SCG.

In some embodiments, the exemplary method can also include the operations of block 2840, where the UE can perform one or more operations after not detecting a beam failure in the SCG while in the reduced-energy mode for the SCG, the one or more operations including any of the following (identified by respective sub-block numbers):

(2841) receiving, from the first network node, a second command indicating an activated mode for the SCG;

(2842) exiting the reduced-energy mode for the SCG and entering the activated mode for the SCG; and (2843) monitoring a PDCCH in the MCG or in the SCG based on a TCI state configured by the wireless network before the UE entered the reduced-energy mode for the SCG.

In some variants, exiting the reduced-energy mode for the SCG and entering a connected mode for the SCG (e.g., in sub-block 2842) is responsive to receiving the second command (e.g., in sub-block 2841), and monitoring the PDCCH in the MCG (e.g., in sub-block 2843) is responsive to receiving the second command.

In addition, FIG. 29 shows a flow diagram of an exemplary method (e.g., procedure) for a second network node configured to provide an SCG for a UE in a wireless network, according to various embodiments of the present disclosure. The exemplary method can be performed by a network node (e.g., base station, eNB, gNB, ng-eNB, en-gNB, etc., or components thereof) such as described elsewhere herein.

The exemplary method can include the operations of block 2910, where the second network node can send, to the UE while the UE is in an activated mode for the SCG, a first command to enter a reduced-energy mode for the SCG. The exemplary method can also include the operations of block 2940, where the second node can perform one or more operations while the UE is in the reduced-energy mode for the SCG, the one or more operations including any of the following (identified by respective sub-block numbers):

(2941) performing a RA procedure with the UE in the SCG; and (2942) receiving, from the UE or from a first network node configured to provide an MCG for the UE, an indication that the UE detected a beam failure in the SCG while the UE was in the reduced-energy mode for the SCG.

In some embodiments, the indication is received from the UE during the RA procedure towards the SCG. In such embodiments, the one or more operations performed while the UE is in the reduced-energy mode for the SCG include the operations of sub-block 2943, where the second network node can determine, based on the indication, a TCI state associated with a PDCCH of the SCG. In such embodiments, performing the RA procedure (e.g., in sub-block 2941) comprises sending the TCI state to the UE. FIGS. 19-21 and 24 show examples of these embodiments. In some variants, the indication that the beam failure was detected in the SCG is received as a MAC CE via a logical channel that is associated with BFR for an SCG in reduced-energy mode.

In other embodiments, the indication is received from the first network node and the exemplary method can also include the operations of block 2950, where the second network node can release the SCG based on the received indication. FIG. 27 shows an example of these embodiments.

In other embodiments, the exemplary method can also include the operations of block 2930, where the second network node can send, to the first network node, a request to resume the UE's operation in an activated mode for the SCG. The indication is received from the first network node in response to the request.

In some embodiments, the exemplary method can also include the operations of block 2920, where the second network node can, before the UE enters the reduced-energy mode for the SCG, send to the UE one or more of the following information that is specific to the reduced-energy mode for the SCG: an SCG BFD configuration, and a subset of the serving cells of the SCG. In particular, the subset can include n serving cells, n=0 . . . N−1, where N is the number of serving cells of the SCG.

In such embodiments, the indicated beam failure detection in the SCG is based on the information specific to the reduced-energy mode for the SCG (i.e., the SCG BFD configuration and/or the subset of serving cells). In some variants, one of more of the following applies:

the SCG BFD configuration includes the subset of the serving cells of the SCG;

only the subset should be monitored for BFD while the UE is in the reduced-energy mode for the SCG; and the SCG BFD configuration is sent with the first command (e.g., in block 2910).

In addition, FIG. 30 shows a flow diagram of an exemplary method (e.g., procedure) for a first network node configured to provide an MCG for a UE in a wireless network, according to various embodiments of the present disclosure. The exemplary method can be performed by a network node (e.g., base station, eNB, gNB, ng-eNB, en-gNB, etc., or components thereof) such as described elsewhere herein.

The exemplary method can include the operations of block 3030, where the first network node can, while the UE is in an activated mode for the MCG and in a reduced-energy for an SCG, send the UE a second command to enter the activated mode for the SCG. The exemplary method can also include the operations of block 3040, where the first network node can perform one or more operations while the UE is in the reduced-energy mode for the SCG, the one or more operations including any of the following (identified by respective sub-block numbers):

(3041) receiving from the UE an indication that the UE detected a beam failure in the SCG while the UE was in the reduced-energy mode for the SCG; and (3042) transmitting a PDCCH to the UE in the MCG based on a TCI state previously configured for the UE.

In some embodiments, the exemplary method can also include the operations of block 3050, where the first network node can forward the indication to a second network node configured to provide the SCG.

In some embodiments, the indication is received from the UE as one of the following:

an SCG failure information field in an RRC message, the field having a particular value that indicates beam failure;

a MAC CE via a logical channel associated with SCG beam failure reporting (BFR); and a MAC CE that is associated with BFR and that includes an identifier of the SCG.

In some embodiments, the TCI state was previously configured by a second network node configured to provide the SCG, during one of the following: before the UE entered the reduced-energy mode for the SCG (e.g., as illustrated in FIG. 25), or while the UE was in the reduced-energy mode for the SCG (e.g., as illustrated in FIG. 10).

In some embodiments, the exemplary method can also include the operations of block 3020, where the first network node can receive, from a second network node configured to provide the SCG, a request to resume the UE's operation in an activated mode for the SCG. The second command is sent (e.g., in block 3030) in response to the request.

In some embodiments, the exemplary method can also include the operations of block 3010, where the first network node can, before the UE enters the reduced-energy mode for the SCG, send to the UE one or more of the following information that is specific to the reduced-energy mode for the SCG: an SCG BFD configuration, and a subset of the serving cells of the SCG. In particular, the subset can include n serving cells, n=0 . . . N−1, where N is the number of serving cells of the SCG.

In such embodiments, the indicated beam failure detection in the SCG (e.g., in sub-block 3041) is based on the information specific to the reduced-energy mode for the SCG. In some variants, one or more of the following applies:

the SCG BFD configuration includes the subset of the serving cells of the SCG;

only the subset should be monitored for BFD while the UE is in the reduced-energy mode for the SCG; and the SCG BFD configuration is sent with a first command for the UE to enter the reduced-energy mode for the SCG.

Figure 31:
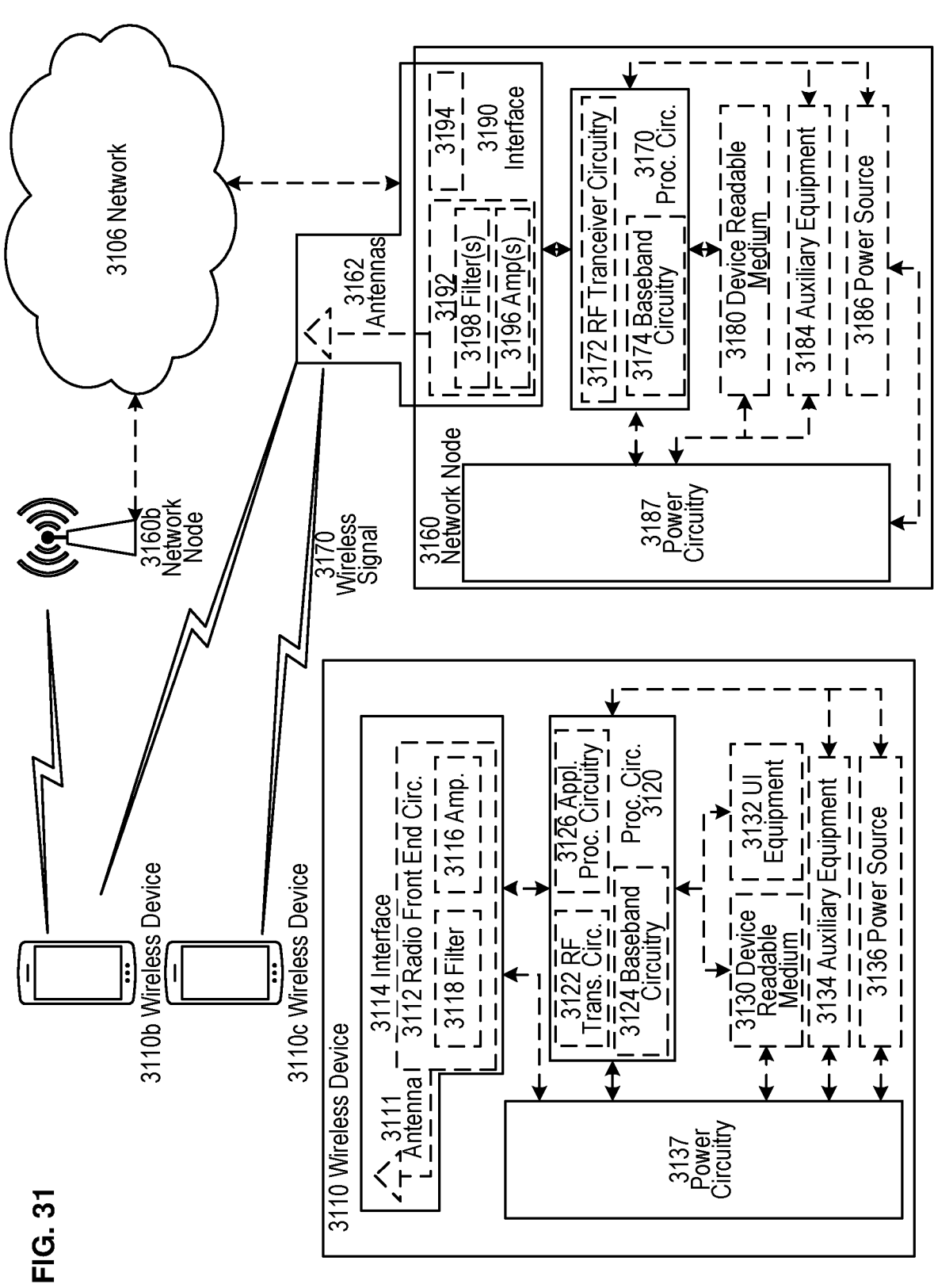
FIG. 31 illustrates an embodiment of a wireless network.

Although the subject matter described herein can be implemented in any appropriate type of system using any suitable components, the embodiments disclosed herein are described in relation to a wireless network, such as the example wireless network illustrated in FIG. 31. For simplicity, the wireless network of FIG. 31 only depicts network 3106, network nodes 3160 and 3160*b*, and WDs 3110, 3110*b*, and 3110*c*. In practice, a wireless network can further include any additional elements suitable to support communication between wireless devices or between a wireless device and another communication device, such as a landline telephone, a service provider, or any other network node or end device. Of the illustrated components, network node 3160 and wireless device (WD) 3110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 3106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 3160 and WD 3110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs).

Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 31, network node 3160 includes processing circuitry 3170, device readable medium 3180, interface 3190, auxiliary equipment 3184, power source 3186, power circuitry 3187, and antenna 3162. Although network node 3160 illustrated in the example wireless network of FIG. 31 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 3160 are depicted as single boxes located within a larger box, or nested within multiple boxes, in practice, a network node can comprise multiple different physical components that make up a single illustrated component (e.g., device readable medium 3180 can comprise multiple separate hard drives as well as multiple RAM modules).

Similarly, network node 3160 can be composed of multiple physically separate components (e.g., NodeB component and RNC component, or BTS component and BSC component, etc.), which can each have their own respective components. In certain scenarios in which network node 3160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 3160 can be configured to support multiple radio access technologies (RATs). In such embodiments, some components can be duplicated (e.g., separate device readable medium 3180 for the different RATs) and some components can be reused (e.g., the same antenna 3162 can be shared by the RATs). Network node 3160 can also include multiple sets of the various illustrated components for different wireless technologies integrated into network node 3160, such as, for example, GSM, WCDMA, LTE, NR, WiFi, or Bluetooth wireless technologies. These wireless technologies can be integrated into the same or different chip or set of chips and other components within network node 3160.

Processing circuitry 3170 can be configured to perform any determining, calculating, or similar operations (e.g., certain obtaining operations) described herein as being provided by a network node. These operations performed by processing circuitry 3170 can include processing information obtained by processing circuitry 3170 by, for example, converting the obtained information into other information, comparing the obtained information or converted information to information stored in the network node, and/or performing one or more operations based on the obtained information or converted information, and as a result of said processing making a determination.

Processing circuitry 3170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 3160, either alone or in conjunction with other network node 3160 components (e.g., device readable medium 3180). Such functionality can include any of the various wireless features, functions, or benefits discussed herein.

For example, processing circuitry 3170 can execute instructions stored in device readable medium 3180 or in memory within processing circuitry 3170. In some embodiments, processing circuitry 3170 can include a system on a chip (SOC). As a more specific example, instructions (also referred to as a computer program product) stored in medium 3180 can include instructions that, when executed by processing circuitry 3170, can configure network node 3160 to perform operations corresponding to various exemplary methods (e.g., procedures) described herein.

In some embodiments, processing circuitry 3170 can include one or more of radio frequency (RF) transceiver circuitry 3172 and baseband processing circuitry 3174. In some embodiments, radio frequency (RF) transceiver circuitry 3172 and baseband processing circuitry 3174 can be on separate chips (or sets of chips), boards, or units, such as radio units and digital units. In alternative embodiments, part or all of RF transceiver circuitry 3172 and baseband processing circuitry 3174 can be on the same chip or set of chips, boards, or units In certain embodiments, some or all of the functionality described herein as being provided by a network node, base station, eNB or other such network device can be performed by processing circuitry 3170 executing instructions stored on device readable medium 3180 or memory within processing circuitry 3170. In alternative embodiments, some or all of the functionality can be provided by processing circuitry 3170 without executing instructions stored on a separate or discrete device readable medium, such as in a hard-wired manner. In any of those embodiments, whether executing instructions stored on a device readable storage medium or not, processing circuitry 3170 can be configured to perform the described functionality. The benefits provided by such functionality are not limited to processing circuitry 3170 alone or to other components of network node 3160 but are enjoyed by network node 3160 as a whole, and/or by end users and the wireless network generally.

Device readable medium 3180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 3170. Device readable medium 3180 can store any suitable instructions, data or information, including a computer program, software, an application including one or more of logic, rules, code, tables, etc. and/or other instructions capable of being executed by processing circuitry 3170 and, utilized by network node 3160. Device readable medium 3180 can be used to store any calculations made by processing circuitry 3170 and/or any data received via interface 3190. In some embodiments, processing circuitry 3170 and device readable medium 3180 can be considered to be integrated.

Interface 3190 is used in the wired or wireless communication of signaling and/or data between network node 3160, network 3106, and/or WDs 3110. As illustrated, interface 3190 comprises port(s)/terminal(s) 3194 to send and receive data, for example to and from network 3106 over a wired connection. Interface 3190 also includes radio front end circuitry 3192 that can be coupled to, or in certain embodiments a part of, antenna 3162. Radio front end circuitry 3192 comprises filters 3198 and amplifiers 3196. Radio front end circuitry 3192 can be connected to antenna 3162 and processing circuitry 3170. Radio front end circuitry can be configured to condition signals communicated between antenna 3162 and processing circuitry 3170. Radio front end circuitry 3192 can receive digital data that is to be sent out to other network nodes or WDs via a wireless connection. Radio front end circuitry 3192 can convert the digital data into a radio signal having the appropriate channel and bandwidth parameters using a combination of filters 3198 and/or amplifiers 3196. The radio signal can then be transmitted via antenna 3162. Similarly, when receiving data, antenna 3162 can collect radio signals which are then converted into digital data by radio front end circuitry 3192. The digital data can be passed to processing circuitry 3170. In other embodiments, the interface can comprise different components and/or different combinations of components.

In certain alternative embodiments, network node 3160 may not include separate radio front end circuitry 3192, instead, processing circuitry 3170 can comprise radio front end circuitry and can be connected to antenna 3162 without separate radio front end circuitry 3192. Similarly, in some embodiments, all or some of RF transceiver circuitry 3172 can be considered a part of interface 3190. In still other embodiments, interface 3190 can include one or more ports or terminals 3194, radio front end circuitry 3192, and RF transceiver circuitry 3172, as part of a radio unit (not shown), and interface 3190 can communicate with baseband processing circuitry 3174, which is part of a digital unit (not shown).

Antenna 3162 can include one or more antennas, or antenna arrays, configured to send and/or receive wireless signals. Antenna 3162 can be coupled to radio front end circuitry 3190 and can be any type of antenna capable of transmitting and receiving data and/or signals wirelessly. In some embodiments, antenna 3162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 3162 can be separate from network node 3160 and can be connectable to network node 3160 through an interface or port.

Antenna 3162, interface 3190, and/or processing circuitry 3170 can be configured to perform any receiving operations and/or certain obtaining operations described herein as being performed by a network node. Any information, data and/or signals can be received from a wireless device, another network node and/or any other network equipment. Similarly, antenna 3162, interface 3190, and/or processing circuitry 3170 can be configured to perform any transmitting operations described herein as being performed by a network node. Any information, data and/or signals can be transmitted to a wireless device, another network node and/or any other network equipment.

Power circuitry 3187 can comprise, or be coupled to, power management circuitry and can be configured to supply the components of network node 3160 with power for performing the functionality described herein. Power circuitry 3187 can receive power from power source 3186. Power source 3186 and/or power circuitry 3187 can be configured to provide power to the various components of network node 3160 in a form suitable for the respective components (e.g., at a voltage and current level needed for each respective component). Power source 3186 can either be included in, or external to, power circuitry 3187 and/or network node 3160. For example, network node 3160 can be connectable to an external power source (e.g., an electricity outlet) via an input circuitry or interface such as an electrical cable, whereby the external power source supplies power to power circuitry 3187. As a further example, power source 3186 can comprise a source of power in the form of a battery or battery pack which is connected to, or integrated in, power circuitry 3187. The battery can provide backup power should the external power source fail. Other types of power sources, such as photovoltaic devices, can also be used.

Alternative embodiments of network node 3160 can include additional components beyond those shown in FIG. 31 that can be responsible for providing certain aspects of the network node's functionality, including any of the functionality described herein and/or any functionality necessary to support the subject matter described herein. For example, network node 3160 can include user interface equipment to allow and/or facilitate input of information into network node 3160 and to allow and/or facilitate output of information from network node 3160. This can allow and/or facilitate a user to perform diagnostic, maintenance, repair, and other administrative functions for network node 3160.

In some embodiments, a wireless device (WD, e.g., WD 3110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 3110 includes antenna 3111, interface 3114, processing circuitry 3120, device readable medium 3130, user interface equipment 3132, auxiliary equipment 3134, power source 3136 and power circuitry 3137. WD 3110 can include multiple sets of one or more of the illustrated components for different wireless technologies supported by WD 3110, such as, for example, GSM, WCDMA, LTE, NR, WiFi, WiMAX, or Bluetooth wireless technologies, just to mention a few. These wireless technologies can be integrated into the same or different chips or set of chips as other components within WD 3110.

Antenna 3111 can include one or more antennas or antenna arrays, configured to send and/or receive wireless signals, and is connected to interface 3114. In certain alternative embodiments, antenna 3111 can be separate from WD 3110 and be connectable to WD 3110 through an interface or port. Antenna 3111, interface 3114, and/or processing circuitry 3120 can be configured to perform any receiving or transmitting operations described herein as being performed by a WD. Any information, data and/or signals can be received from a network node and/or another WD. In some embodiments, radio front end circuitry and/or antenna 3111 can be considered an interface.

As illustrated, interface 3114 comprises radio front end circuitry 3112 and antenna 3111. Radio front end circuitry 3112 comprise one or more filters 3118 and amplifiers 3116. Radio front end circuitry 3114 is connected to antenna 3111 and processing circuitry 3120 and can be configured to condition signals communicated between antenna 3111 and processing circuitry 3120. Radio front end circuitry 3112 can be coupled to or a part of antenna 3111. In some embodiments, WD 3110 may not include separate radio front end circuitry 3112; rather, processing circuitry 3120 can comprise radio front end circuitry and can be connected to antenna 3111. Similarly, in some embodiments, some or all of RF transceiver circuitry 3122 can be considered a part of interface 3114. Radio front end circuitry 3112 can receive digital data that is to be sent out to other network nodes or WDs via a wireless connection. Radio front end circuitry 3112 can convert the digital data into a radio signal having the appropriate channel and bandwidth parameters using a combination of filters 3118 and/or amplifiers 3116. The radio signal can then be transmitted via antenna 3111. Similarly, when receiving data, antenna 3111 can collect radio signals which are then converted into digital data by radio front end circuitry 3112. The digital data can be passed to processing circuitry 3120. In other embodiments, the interface can comprise different components and/or different combinations of components.

Processing circuitry 3120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 3110 functionality either alone or in combination with other WD 3110 components, such as device readable medium 3130. Such functionality can include any of the various wireless features or benefits discussed herein.

For example, processing circuitry 3120 can execute instructions stored in device readable medium 3130 or in memory within processing circuitry 3120 to provide the functionality disclosed herein. More specifically, instructions (also referred to as a computer program product) stored in medium 3130 can include instructions that, when executed by processor 3120, can configure wireless device 3110 to perform operations corresponding to various exemplary methods (e.g., procedures) described herein.

As illustrated, processing circuitry 3120 includes one or more of RF transceiver circuitry 3122, baseband processing circuitry 3124, and application processing circuitry 3126. In other embodiments, the processing circuitry can comprise different components and/or different combinations of components. In certain embodiments processing circuitry 3120 of WD 3110 can comprise a SOC. In some embodiments, RF transceiver circuitry 3122, baseband processing circuitry 3124, and application processing circuitry 3126 can be on separate chips or sets of chips. In alternative embodiments, part or all of baseband processing circuitry 3124 and application processing circuitry 3126 can be combined into one chip or set of chips, and RF transceiver circuitry 3122 can be on a separate chip or set of chips. In still alternative embodiments, part or all of RF transceiver circuitry 3122 and baseband processing circuitry 3124 can be on the same chip or set of chips, and application processing circuitry 3126 can be on a separate chip or set of chips. In yet other alternative embodiments, part or all of RF transceiver circuitry 3122, baseband processing circuitry 3124, and application processing circuitry 3126 can be combined in the same chip or set of chips. In some embodiments, RF transceiver circuitry 3122 can be a part of interface 3114. RF transceiver circuitry 3122 can condition RF signals for processing circuitry 3120.

In certain embodiments, some or all of the functionality described herein as being performed by a WD can be provided by processing circuitry 3120 executing instructions stored on device readable medium 3130, which in certain embodiments can be a computer-readable storage medium. In alternative embodiments, some or all of the functionality can be provided by processing circuitry 3120 without executing instructions stored on a separate or discrete device readable storage medium, such as in a hard-wired manner. In any of those particular embodiments, whether executing instructions stored on a device readable storage medium or not, processing circuitry 3120 can be configured to perform the described functionality. The benefits provided by such functionality are not limited to processing circuitry 3120 alone or to other components of WD 3110, but are enjoyed by WD 3110 as a whole, and/or by end users and the wireless network generally.

Processing circuitry 3120 can be configured to perform any determining, calculating, or similar operations (e.g., certain obtaining operations) described herein as being performed by a WD. These operations, as performed by processing circuitry 3120, can include processing information obtained by processing circuitry 3120 by, for example, converting the obtained information into other information, comparing the obtained information or converted information to information stored by WD 3110, and/or performing one or more operations based on the obtained information or converted information, and as a result of said processing making a determination.

Device readable medium 3130 can be operable to store a computer program, software, an application including one or more of logic, rules, code, tables, etc. and/or other instructions capable of being executed by processing circuitry 3120. Device readable medium 3130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 3120. In some embodiments, processing circuitry 3120 and device readable medium 3130 can be considered to be integrated.

User interface equipment 3132 can include components that allow and/or facilitate a human user to interact with WD 3110. Such interaction can be of many forms, such as visual, audial, tactile, etc. User interface equipment 3132 can be operable to produce output to the user and to allow and/or facilitate the user to provide input to WD 3110. The type of interaction can vary depending on the type of user interface equipment 3132 installed in WD 3110. For example, if WD 3110 is a smart phone, the interaction can be via a touch screen; if WD 3110 is a smart meter, the interaction can be through a screen that provides usage (e.g., the number of gallons used) or a speaker that provides an audible alert (e.g., if smoke is detected). User interface equipment 3132 can include input interfaces, devices and circuits, and output interfaces, devices and circuits. User interface equipment 3132 can be configured to allow and/or facilitate input of information into WD 3110 and is connected to processing circuitry 3120 to allow and/or facilitate processing circuitry 3120 to process the input information. User interface equipment 3132 can include, for example, a microphone, a proximity or other sensor, keys/buttons, a touch display, one or more cameras, a USB port, or other input circuitry. User interface equipment 3132 is also configured to allow and/or facilitate output of information from WD 3110, and to allow and/or facilitate processing circuitry 3120 to output information from WD 3110. User interface equipment 3132 can include, for example, a speaker, a display, vibrating circuitry, a USB port, a headphone interface, or other output circuitry. Using one or more input and output interfaces, devices, and circuits, of user interface equipment 3132, WD 3110 can communicate with end users and/or the wireless network and allow and/or facilitate them to benefit from the functionality described herein.

Auxiliary equipment 3134 is operable to provide more specific functionality which may not be generally performed by WDs. This can comprise specialized sensors for doing measurements for various purposes, interfaces for additional types of communication such as wired communications etc. The inclusion and type of components of auxiliary equipment 3134 can vary depending on the embodiment and/or scenario.

Power source 3136 can, in some embodiments, be in the form of a battery or battery pack. Other types of power sources, such as an external power source (e.g., an electricity outlet), photovoltaic devices or power cells, can also be used. WD 3110 can further comprise power circuitry 3137 for delivering power from power source 3136 to the various parts of WD 3110 which need power from power source 3136 to carry out any functionality described or indicated herein. Power circuitry 3137 can in certain embodiments comprise power management circuitry. Power circuitry 3137 can additionally or alternatively be operable to receive power from an external power source; in which case WD 3110 can be connectable to the external power source (such as an electricity outlet) via input circuitry or an interface such as an electrical power cable. Power circuitry 3137 can also in certain embodiments be operable to deliver power from an external power source to power source 3136. This can be, for example, for the charging of power source 3136. Power circuitry 3137 can perform any converting or other modification to the power from power source 3136 to make it suitable for supply to the respective components of WD 3110.

Figure 32:
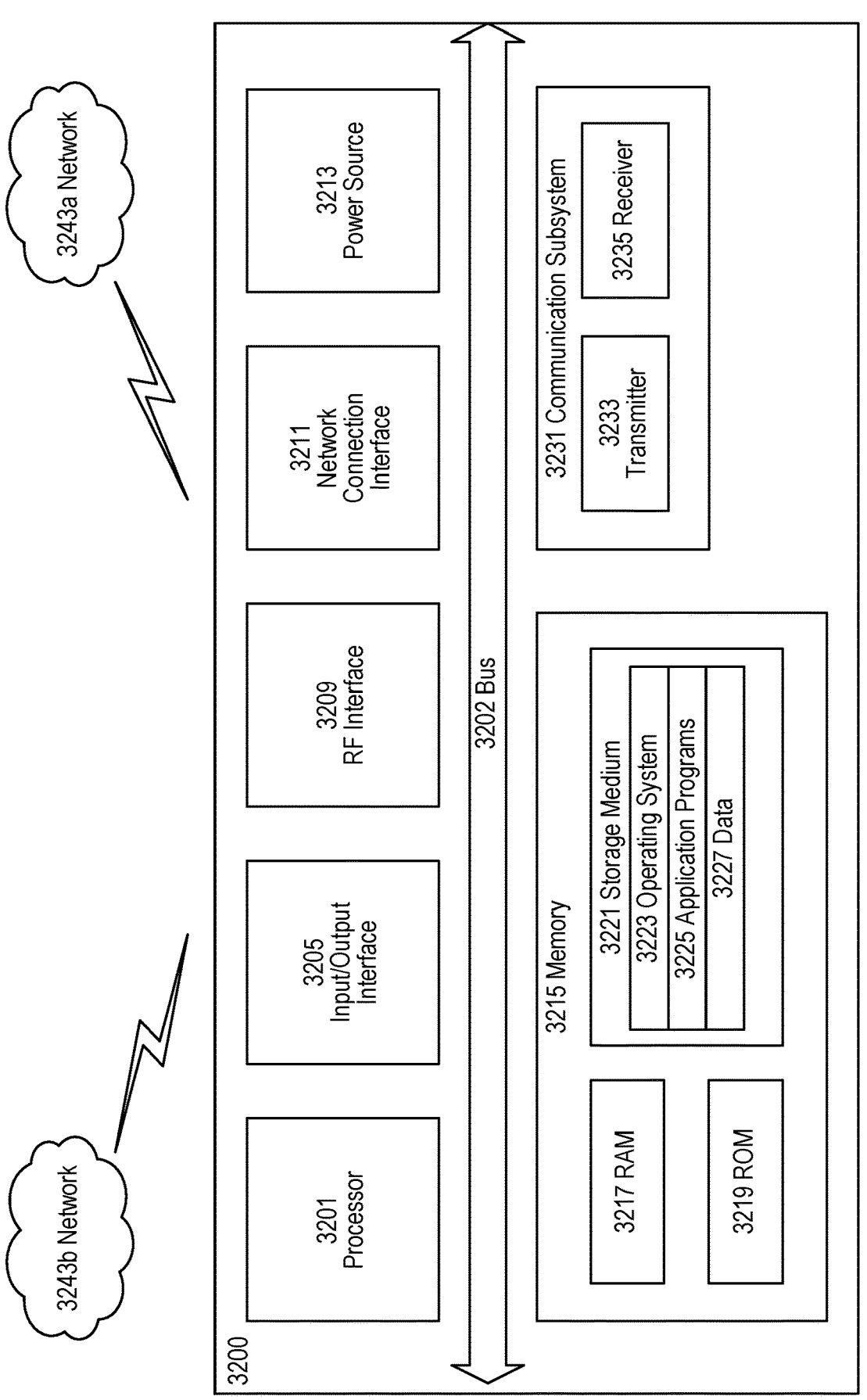
FIG. 32 illustrates an embodiment of a UE.

FIG. 32 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 3200 can be any UE identified by the $3^{rd}$ Generation Partnership Project (3GPP), including a NB-IoT UE, a machine type communication (MTC) UE, and/or an enhanced MTC (eMTC) UE. UE 3200, as illustrated in FIG. 32, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 32 is a UE, the components discussed herein are equally applicable to a WD, and vice-versa.

In FIG. 32, UE 3200 includes processing circuitry 3201 that is operatively coupled to input/output interface 3205, radio frequency (RF) interface 3209, network connection interface 3211, memory 3215 including random access memory (RAM) 3217, read-only memory (ROM) 3219, and storage medium 3221 or the like, communication subsystem 3231, power source 3233, and/or any other component, or any combination thereof. Storage medium 3221 includes operating system 3223, application program 3225, and data 3227. In other embodiments, storage medium 3221 can include other similar types of information. Certain UEs can utilize all of the components shown in FIG. 32, or only a subset of the components. The level of integration between the components can vary from one UE to another UE. Further, certain UEs can contain multiple instances of a component, such as multiple processors, memories, transceivers, transmitters, receivers, etc.

In FIG. 32, processing circuitry 3201 can be configured to process computer instructions and data. Processing circuitry 3201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 3201 can include two central processing units (CPUs). Data can be information in a form suitable for use by a computer.

In the depicted embodiment, input/output interface 3205 can be configured to provide a communication interface to an input device, output device, or input and output device. UE 3200 can be configured to use an output device via input/output interface 3205. An output device can use the same type of interface port as an input device. For example, a USB port can be used to provide input to and output from UE 3200. The output device can be a speaker, a sound card, a video card, a display, a monitor, a printer, an actuator, an emitter, a smartcard, another output device, or any combination thereof. UE 3200 can be configured to use an input device via input/output interface 3205 to allow and/or facilitate a user to capture information into UE 3200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 32, RF interface 3209 can be configured to provide a communication interface to RF components such as a transmitter, a receiver, and an antenna. Network connection interface 3211 can be configured to provide a communication interface to network 3243a. Network 3243a can encompass wired and/or wireless networks such as a local-area network (LAN), a wide-area network (WAN), a computer network, a wireless network, a telecommunications network, another like network or any combination thereof. For example, network 3243a can comprise a Wi-Fi network. Network connection interface 3211 can be configured to include a receiver and a transmitter interface used to communicate with one or more other devices over a communication network according to one or more communication protocols, such as Ethernet, TCP/IP, SONET, ATM, or the like. Network connection interface 3211 can implement receiver and transmitter functionality appropriate to the communication network links (e.g., optical, electrical, and the like). The transmitter and receiver functions can share circuit components, software or firmware, or alternatively can be implemented separately.

RAM 3217 can be configured to interface via bus 3202 to processing circuitry 3201 to provide storage or caching of data or computer instructions during the execution of software programs such as the operating system, application programs, and device drivers. ROM 3219 can be configured to provide computer instructions or data to processing circuitry 3201. For example, ROM 3219 can be configured to store invariant low-level system code or data for basic system functions such as basic input and output (I/O), startup, or reception of keystrokes from a keyboard that are stored in a non-volatile memory. Storage medium 3221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 3221 can be configured to include operating system 3223; application program 3225 such as a web browser application, a widget or gadget engine or another application; and data file 3227. Storage medium 3221 can store, for use by UE 3200, any of a variety of various operating systems or combinations of operating systems. For example, application program 3225 can include executable program instructions (also referred to as a computer program product) that, when executed by processor 3201, can configure UE 3200 to perform operations corresponding to various exemplary methods (e.g., procedures) described herein.

Storage medium 3221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 3221 can allow and/or facilitate UE 3200 to access computer-executable instructions, application programs or the like, stored on transitory or non-transitory memory media, to off-load data, or to upload data. An article of manufacture, such as one utilizing a communication system can be tangibly embodied in storage medium 3221, which can comprise a device readable medium.

In FIG. 32, processing circuitry 3201 can be configured to communicate with network 3243*b* using communication subsystem 3231. Network 3243*a* and network 3243*b* can be the same network or networks or different network or networks. Communication subsystem 3231 can be configured to include one or more transceivers used to communicate with network 3243*b*. For example, communication subsystem 3231 can be configured to include one or more transceivers used to communicate with one or more remote transceivers of another device capable of wireless communication such as another WD, UE, or base station of a radio access network (RAN) according to one or more communication protocols, such as IEEE 802.32, CDMA, WCDMA, GSM, LTE, UTRAN, WiMax, or the like. Each transceiver can include transmitter 3233 and/or receiver 3235 to implement transmitter or receiver functionality, respectively, appropriate to the RAN links (e.g., frequency allocations and the like). Further, transmitter 3233 and receiver 3235 of each transceiver can share circuit components, software or firmware, or alternatively can be implemented separately.

In the illustrated embodiment, the communication functions of communication subsystem 3231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 3231 can include cellular communication, Wi-Fi communication, Bluetooth communication, and GPS communication. Network 3243*b* can encompass wired and/or wireless networks such as a local-area network (LAN), a wide-area network (WAN), a computer network, a wireless network, a telecommunications network, another like network or any combination thereof. For example, network 3243*b* can be a cellular network, a Wi-Fi network, and/or a near-field network. Power source 3213 can be configured to provide alternating current (AC) or direct current (DC) power to components of UE 3200.

The features, benefits and/or functions described herein can be implemented in one of the components of UE 3200 or partitioned across multiple components of UE 3200. Further, the features, benefits, and/or functions described herein can be implemented in any combination of hardware, software or firmware. In one example, communication subsystem 3231 can be configured to include any of the components described herein. Further, processing circuitry 3201 can be configured to communicate with any of such components over bus 3202. In another example, any of such components can be represented by program instructions stored in memory that when executed by processing circuitry 3201 perform the corresponding functions described herein. In another example, the functionality of any of such components can be partitioned between processing circuitry 3201 and communication subsystem 3231. In another example, the non-computationally intensive functions of any of such components can be implemented in software or firmware and the computationally intensive functions can be implemented in hardware.

Figure 33:
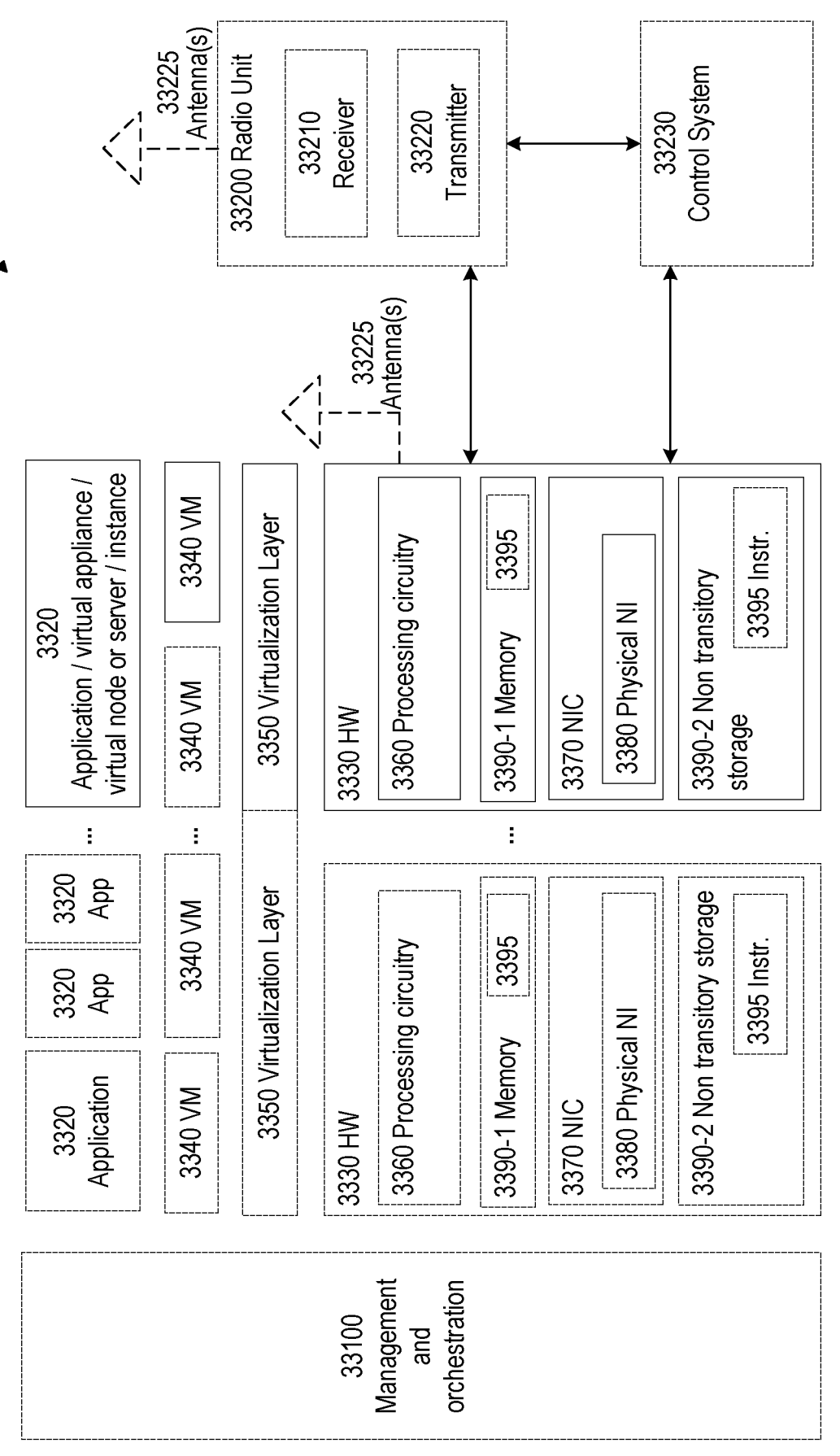
FIG. 33 is a block diagram illustrating an exemplary virtualization environment usable for implementation of various embodiments of network nodes in a wireless network.

FIG. 33 is a schematic block diagram illustrating a virtualization environment 3300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 3300 hosted by one or more of hardware nodes 3330. Further, in embodiments in which the virtual node is not a radio access node or does not require radio connectivity (e.g., a core network node), then the network node can be entirely virtualized.

The functions can be implemented by one or more applications 3320 (which can alternatively be called software instances, virtual appliances, network functions, virtual nodes, virtual network functions, etc.) operative to implement some of the features, functions, and/or benefits of some of the embodiments disclosed herein. Applications 3320 are run in virtualization environment 3300 which provides hardware 3330 comprising processing circuitry 3360 and memory 3390. Memory 3390 contains instructions 3395 executable by processing circuitry 3360 whereby application 3320 is operative to provide one or more of the features, benefits, and/or functions disclosed herein.

Virtualization environment 3300 can include general-purpose or special-purpose network hardware devices (or nodes) 3330 comprising a set of one or more processors or processing circuitry 3360, which can be commercial off-the-shelf (COTS) processors, dedicated Application Specific Integrated Circuits (ASICs), or any other type of processing circuitry including digital or analog hardware components or special purpose processors. Each hardware device can comprise memory 3390-1 which can be non-persistent memory for temporarily storing instructions 3395 or software executed by processing circuitry 3360. For example, instructions 3395 can include program instructions (also referred to as a computer program product) that, when executed by processing circuitry 3360, can configure hardware node 3320 to perform operations corresponding to various exemplary methods (e.g., procedures) described herein. Such operations can also be attributed to virtual node(s) 3320 that is/are hosted by hardware node 3330.

Each hardware device can comprise one or more network interface controllers (NICs) 3370, also known as network interface cards, which include physical network interface 3380. Each hardware device can also include non-transitory, persistent, machine-readable storage media 3390-2 having stored therein software 3395 and/or instructions executable by processing circuitry 3360. Software 3395 can include any type of software including software for instantiating one or more virtualization layers 3350 (also referred to as hypervisors), software to execute virtual machines 3340 as well as software allowing it to execute functions, features and/or benefits described in relation with some embodiments described herein.

Virtual machines 3340, comprise virtual processing, virtual memory, virtual networking or interface and virtual storage, and can be run by a corresponding virtualization layer 3350 or hypervisor. Different embodiments of the instance of virtual appliance 3320 can be implemented on one or more of virtual machines 3340, and the implementations can be made in different ways.

During operation, processing circuitry 3360 executes software 3395 to instantiate the hypervisor or virtualization layer 3350, which can sometimes be referred to as a virtual machine monitor (VMM). Virtualization layer 3350 can present a virtual operating platform that appears like networking hardware to virtual machine 3340.

As shown in FIG. 33, hardware 3330 can be a standalone network node with generic or specific components. Hardware 3330 can comprise antenna 33225 and can implement some functions via virtualization. Alternatively, hardware 3330 can be part of a larger cluster of hardware (e.g., such as in a data center or customer premise equipment (CPE)) where many hardware nodes work together and are managed via management and orchestration (MANO) 33100, which, among others, oversees lifecycle management of applications 3320.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 3340 can be a software implementation of a physical machine that runs programs as if they were executing on a physical, non-virtualized machine. Each of virtual machines 3340, and that part of hardware 3330 that executes that virtual machine, be it hardware dedicated to that virtual machine and/or hardware shared by that virtual machine with others of the virtual machines 3340, forms a separate virtual network elements (VNE).

Still in the context of NFV, Virtual Network Function (VNF) is responsible for handling specific network functions that run in one or more virtual machines 3340 on top of hardware networking infrastructure 3330 and corresponds to application 3320 in FIG. 33.

In some embodiments, one or more radio units 33200 that each include one or more transmitters 33220 and one or more receivers 33210 can be coupled to one or more antennas 33225. Radio units 33200 can communicate directly with hardware nodes 3330 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 33230, which can alternatively be used for communication between the hardware nodes 3330 and radio units 33200.

Figure 34:
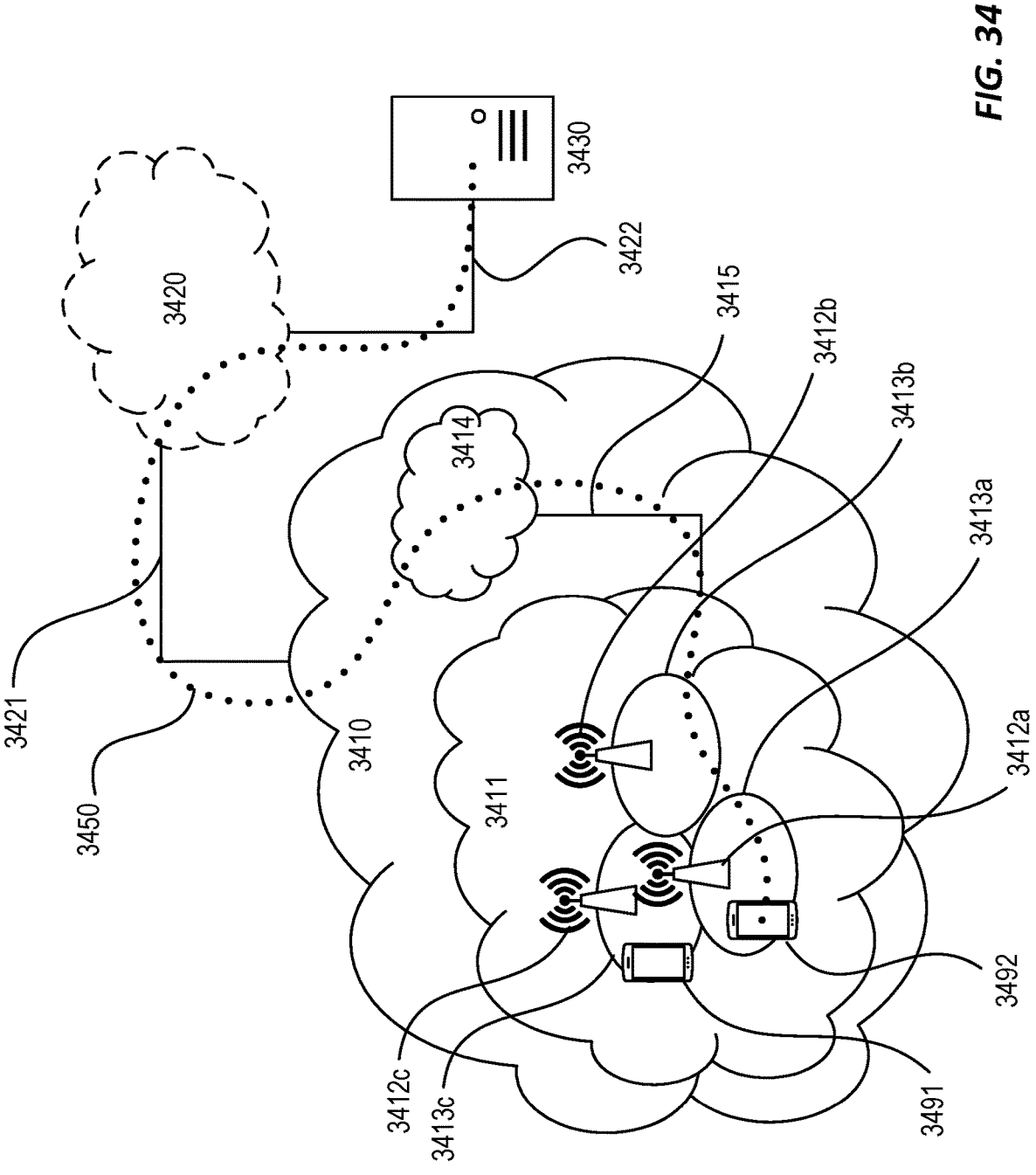
FIGS. 34-35 are block diagrams of various communication systems and/or networks, according to various embodiments of the present disclosure.

With reference to FIG. 34, in accordance with an embodiment, a communication system includes telecommunication network 3410, such as a 3GPP-type cellular network, which comprises access network 3411, such as a radio access network, and core network 3414. Access network 3411 comprises a plurality of base stations 3412a, 3412b, 3412c, such as NBs, eNBs, gNBs or other types of wireless access points, each defining a corresponding coverage area 3413a, 3413b, 3413c. Each base station 3412a, 3412b, 3412c is connectable to core network 3414 over a wired or wireless connection 3415. A first UE 3491 located in coverage area 3413c can be configured to wirelessly connect to, or be paged by, the corresponding base station 3412c. A second UE 3492 in coverage area 3413a is wirelessly connectable to the corresponding base station 3412a. While a plurality of UEs 3491, 3492 are illustrated in this example, the disclosed embodiments are equally applicable to a situation where a sole UE is in the coverage area or where a sole UE is connecting to the base stations within the coverage area.

Telecommunication network 3410 is itself connected to host computer 3430, which can be embodied in the hardware and/or software of a standalone server, a cloud-implemented server, a distributed server or as processing resources in a server farm. Host computer 3430 can be under the ownership or control of a service provider or can be operated by the service provider or on behalf of the service provider. Connections 3421 and 3422 between telecommunication network 3410 and host computer 3430 can extend directly from core network 3414 to host computer 3430 or can go via an optional intermediate network 3420. Intermediate network 3420 can be one of, or a combination of more than one of, a public, private or hosted network; intermediate network 3420, if any, can be a backbone network or the Internet; in particular, intermediate network 3420 can comprise two or more sub-networks (not shown).

The communication system of FIG. 34 as a whole enables connectivity between the connected UEs 3491, 3492 and host computer 3430. The connectivity can be described as an over-the-top (OTT) connection 3450. Host computer 3430 and the connected UEs 3491, 3492 are configured to communicate data and/or signaling via OTT connection 3450, using access network 3411, core network 3414, any intermediate network 3420 and possible further infrastructure (not shown) as intermediaries. OTT connection 3450 can be transparent in the sense that the participating communication devices through which OTT connection 3450 passes are unaware of routing of uplink and downlink communications.

For example, base station 3412 may not or need not be informed about the past routing of an incoming downlink communication with data originating from host computer 3430 to be forwarded (e.g., handed over) to a connected UE 3491. Similarly, base station 3412 need not be aware of the future routing of an outgoing uplink communication originating from the UE 3491 towards the host computer 3430.

Example implementations, in accordance with an embodiment, of the UE, base station and host computer discussed in the preceding paragraphs will now be described with reference to FIG. 35. In communication system 3500, host computer 3510 comprises hardware 3515 including communication interface 3516 configured to set up and maintain a wired or wireless connection with an interface of a different communication device of communication system 3500. Host computer 3510 further comprises processing circuitry 3518, which can have storage and/or processing capabilities. In particular, processing circuitry 3518 can comprise one or more programmable processors, application-specific integrated circuits, field programmable gate arrays or combinations of these (not shown) adapted to execute instructions. Host computer 3510 further comprises software 3511, which is stored in or accessible by host computer 3510 and executable by processing circuitry 3518. Software 3511 includes host application 3512. Host application 3512 can be operable to provide a service to a remote user, such as UE 3530 connecting via OTT connection 3550 terminating at UE 3530 and host computer 3510. In providing the service to the remote user, host application 3512 can provide user data which is transmitted using OTT connection 3550.

Communication system 3500 can also include base station 3520 provided in a telecommunication system and comprising hardware 3525 enabling it to communicate with host computer 3510 and with UE 3530. Hardware 3525 can include communication interface 3526 for setting up and maintaining a wired or wireless connection with an interface of a different communication device of communication system 3500, as well as radio interface 3527 for setting up and maintaining at least wireless connection 3570 with UE 3530 located in a coverage area (not shown in FIG. 35) served by base station 3520. Communication interface 3526 can be configured to facilitate connection 3560 to host computer 3510. Connection 3560 can be direct, or it can pass through a core network (not shown in FIG. 35) of the telecommunication system and/or through one or more intermediate networks outside the telecommunication system. In the embodiment shown, hardware 3525 of base station 3520 can also include processing circuitry 3528, which can comprise one or more programmable processors, application-specific integrated circuits, field programmable gate arrays or combinations of these (not shown) adapted to execute instructions.

Base station 3520 also includes software 3521 stored internally or accessible via an external connection. For example, software 3521 can include program instructions (also referred to as a computer program product) that, when executed by processing circuitry 3528, can configure base station 3520 to perform operations corresponding to various exemplary methods (e.g., procedures) described herein.

Communication system 3500 can also include UE 3530 already referred to, whose hardware 3535 can include radio interface 3537 configured to set up and maintain wireless connection 3570 with a base station serving a coverage area in which UE 3530 is currently located. Hardware 3535 of UE 3530 can also include processing circuitry 3538, which can comprise one or more programmable processors, application-specific integrated circuits, field programmable gate arrays or combinations of these (not shown) adapted to execute instructions.

UE 3530 also includes software 3531, which is stored in or accessible by UE 3530 and executable by processing circuitry 3538. Software 3531 includes client application 3532. Client application 3532 can be operable to provide a service to a human or non-human user via UE 3530, with the support of host computer 3510. In host computer 3510, an executing host application 3512 can communicate with the executing client application 3532 via OTT connection 3550 terminating at UE 3530 and host computer 3510. In providing the service to the user, client application 3532 can receive request data from host application 3512 and provide user data in response to the request data. OTT connection 3550 can transfer both the request data and the user data. Client application 3532 can interact with the user to generate the user data that it provides. Software 3531 can also include program instructions (also referred to as a computer program product) that, when executed by processing circuitry 3538, can configure UE 3530 to perform operations corresponding to various exemplary methods (e.g., procedures) described herein.

Figure 35:
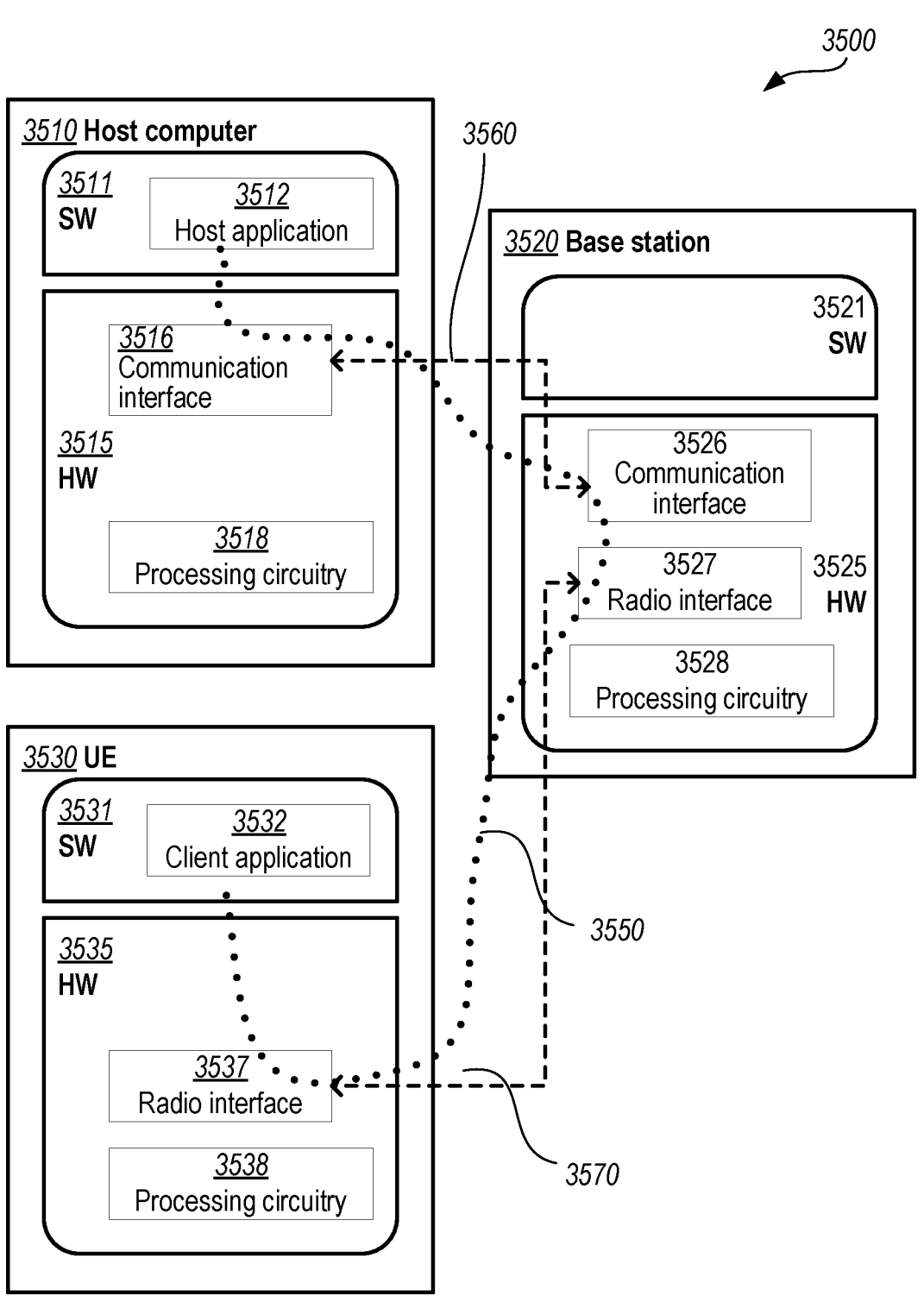

It is noted that host computer 3510, base station 3520 and UE 3530 illustrated in FIG. 35 can be similar or identical to host computer 1230, one of base stations 3312a, 3312b, 3312c and one of UEs 3391, 3392 of FIG. 33, respectively. This is to say, the inner workings of these entities can be as shown in FIG. 35 and independently, the surrounding network topology can be that of FIG. 33.

In FIG. 35, OTT connection 3550 has been drawn abstractly to illustrate the communication between host computer 3510 and UE 3530 via base station 3520, without explicit reference to any intermediary devices and the precise routing of messages via these devices. Network infrastructure can determine the routing, which it can be configured to hide from UE 3530 or from the service provider operating host computer 3510, or both. While OTT connection 3550 is active, the network infrastructure can further take decisions by which it dynamically changes the routing (e.g., on the basis of load balancing consideration or reconfiguration of the network).

Wireless connection 3570 between UE 3530 and base station 3520 is in accordance with the teachings of the embodiments described throughout this disclosure. One or more of the various embodiments improve the performance of OTT services provided to UE 3530 using OTT connection 3550, in which wireless connection 3570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 3550 between host computer 3510 and UE 3530, in response to variations in the measurement results. The measurement procedure and/or the network functionality for reconfiguring OTT connection 3550 can be implemented in software 3511 and hardware 3515 of host computer 3510 or in software 3531 and hardware 3535 of UE 3530, or both. In embodiments, sensors (not shown) can be deployed in or in association with communication devices through which OTT connection 3550 passes; the sensors can participate in the measurement procedure by supplying values of the monitored quantities exemplified above, or supplying values of other physical quantities from which software 3511, 3531 can compute or estimate the monitored quantities. The reconfiguring of OTT connection 3550 can include message format, retransmission settings, preferred routing etc.; the reconfiguring need not affect base station 3520, and it can be unknown or imperceptible to base station 3520. Such procedures and functionalities can be known and practiced in the art. In certain embodiments, measurements can involve proprietary UE signaling facilitating host computer 3510's measurements of throughput, propagation times, latency and the like. The measurements can be implemented in that software 3511 and 3531 causes messages to be transmitted, in particular empty or 'dummy' messages, using OTT connection 3550 while it monitors propagation times, errors, etc.

FIG. 36 is a flowchart illustrating an exemplary method and/or procedure implemented in a communication system, in accordance with some embodiments. The communication system includes a host computer, a base station and a UE which, in some exemplary embodiments, can be those described with reference to other figures herein. For simplicity of the present disclosure, only drawing references to FIG. 36 will be included in this section. In step 3610, the host computer provides user data. In substep 3611 (which can be optional) of step 3610, the host computer provides the user data by executing a host application. In step 3620, the host computer initiates a transmission carrying the user data to the UE. In step 3630 (which can be optional), the base station transmits to the UE the user data which was carried in the transmission that the host computer initiated, in accordance with the teachings of the embodiments described throughout this disclosure. In step 3640 (which can also be optional), the UE executes a client application associated with the host application executed by the host computer.

FIG. 37 is a flowchart illustrating an exemplary method and/or procedure implemented in a communication system, in accordance with some embodiments. The communication system includes a host computer, a base station and a UE which can be those described with reference to other figures herein. For simplicity of the present disclosure, only drawing references to FIG. 37 will be included in this section. In step 3710 of the method, the host computer provides user data. In an optional substep (not shown) the host computer provides the user data by executing a host application. In step 3720, the host computer initiates a transmission carrying the user data to the UE. The transmission can pass via the base station, in accordance with the teachings of the embodiments described throughout this disclosure. In step 3730 (which can be optional), the UE receives the user data carried in the transmission.

FIG. 38 is a flowchart illustrating an exemplary method and/or procedure implemented in a communication system, in accordance with some embodiments. The communication system includes a host computer, a base station and a UE which can be those described with reference to other figures herein. For simplicity of the present disclosure, only drawing references to FIG. 38 will be included in this section. In step 3810 (which can be optional), the UE receives input data provided by the host computer. Additionally or alternatively, in step 3820, the UE provides user data. In substep 3821 (which can be optional) of step 3820, the UE provides the user data by executing a client application. In substep 3811 (which can be optional) of step 3810, the UE executes a client application which provides the user data in reaction to the received input data provided by the host computer. In providing the user data, the executed client application can further consider user input received from the user. Regardless of how the user data was provided, the UE initiates, in substep 3830 (which can be optional), transmission of the user data to the host computer. In step 3840 of the method, the host computer receives the user data transmitted from the UE, in accordance with the teachings of the embodiments described throughout this disclosure.

FIG. 39 is a flowchart illustrating an exemplary method and/or procedure implemented in a communication system, in accordance with some embodiments. The communication system includes a host computer, a base station and a UE which can be those described with reference to other figures herein. For simplicity of the present disclosure, only drawing references to FIG. 39 will be included in this section. In step 3910 (which can be optional), in accordance with the teachings of the embodiments described throughout this disclosure, the base station receives user data from the UE. In step 3920 (which can be optional), the base station initiates transmission of the received user data to the host computer. In step 3930 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a user equipment (UE) configured to communicate with a wireless network via a master cell group (MCG) and a secondary cell group (SCG), the method comprising:

while in a normal mode of operation for the SCG, receiving, from a second node associated with the SCG, a command to enter a reduced-energy mode for the SCG;

while in the reduced-energy mode for the SCG, performing beam failure detection (BFD) associated with the SCG and refrain from performing one or more beam management operations for the SCG; and performing one or more of the following based on whether beam failure was detected while in the reduced-energy mode for the SCG:

performing a random access (RA) procedure towards the second cell group for beam failure recovery (BFR);

monitoring a physical downlink control channel (PDCCH) in the SCG based on a PDCCH transmission configuration indicator (TCI) state configured by the second node before the UE entered the reduced-energy mode; and sending, to a first node associated with the MCG, an indication that beam failure was detected in the SCG.

B1. A method for a second node, of a wireless network, associated with a secondary cell group (SCG) for a user equipment (UE) also configured to communicate with the wireless network via a master cell group (MCG), the method comprising:

sending, to the UE while the UE is in a normal mode of operation for the SCG, a command to enter a reduced-energy mode for the SCG:

performing one or more of the following operations while the UE is in the reduced-energy mode for the SCG:

performing a random access (RA) procedure with the UE for beam failure recovery (BFR) in the SCG;

receiving, from a first node associated with the MCG, an indication that the UE detected beam failure in the SCG;

releasing the SCG based on the indication that the UE detected beam failure; and sending, to the first node, a request to resume the UE's normal mode of operation for the SCG.

B2. The method of embodiment B1, further comprising, after the UE exits the reduced-energy mode for the SCG, transmitting a physical downlink control channel (PDCCH) in the SCG based on a PDCCH transmission configuration indicator (TCI) state configured by the second node before the UE entered the reduced energy mode for the SCG.

C1. A user equipment (UE) configured to communicate with a wireless network via a master cell group (MCG) and a secondary cell group (SCG), the UE comprising:

radio transceiver circuitry configured to communicate with the wireless network via the SCG and the MCG; and processing circuitry operatively coupled to the radio transceiver circuitry, whereby the processing circuitry and the radio transceiver circuitry are configured to perform operations corresponding to the method of embodiment A1.

C2. A user equipment (UE) to communicate with a wireless network via a master cell group (MCG) and a secondary cell group (SCG), the UE being further arranged to perform operations corresponding to the method of embodiment A1.

C3. A non-transitory, computer-readable medium storing computer-executable instructions that, when executed by processing circuitry of a user equipment (UE) arranged to communicate with a wireless network via a master cell group (MCG) and a secondary cell group (SCG), configure the UE to perform operations corresponding to the method of embodiment A1.

C4. A computer program product comprising computer-executable instructions that, when executed by processing circuitry of a user equipment (UE) arranged to communicate with a wireless network via a master cell group (MCG) and a secondary cell group (SCG), configure the UE to perform operations corresponding to the method of embodiment A1.

D1. A network node, of a wireless network, arranged to communicate with a user equipment (UE) via a secondary cell group (SCG), the network node comprising:

communication interface circuitry configured to communicate with the UE via the SCG, and with a further network node configured to communicates with the UE via a master cell group (MCG); and processing circuitry operatively coupled to the communication interface circuitry, whereby the processing circuitry and the communication interface circuitry are configured to perform operations corresponding to any of the methods of embodiments B1-B2.

D2. A network node, of a wireless network, arranged to communicate with a user equipment (UE) via a secondary cell group (SCG), the network node being further arranged to perform operations corresponding to any of the methods of embodiments B1-B2.

D3. A non-transitory, computer-readable medium storing computer-executable instructions that, when executed by processing circuitry of a network node arranged to communicate with a user equipment (UE) via a secondary cell group (SCG), configure the network node to perform operations corresponding to any of the methods of embodiments B1-B2.

D4. A computer program product comprising computer-executable instructions that, when executed by processing circuitry of a network node arranged to communicate with a user equipment (UE) via a secondary cell group (SCG), configure the network node to perform operations corresponding to any of the methods of embodiments B1-B2.

The invention claimed is:

1. A method for a user equipment (UE) configured to communicate with a wireless network via a master cell group (MCG) and a secondary cell group (SCG), the method comprising:

entering a reduced-energy mode for the SCG responsive to receiving a first command via the MCG or the SCG; and while in the reduced-energy mode for the SCG and in an activated mode for the MCG:

performing beam failure detection (BFD) for at least a primary cell (PSCell) of the SCG;

refraining from performing layer-1 (L1) measurements and from reporting of beams associated with the SCG; and sending, to a first network node configured to provide the MCG, an indication that beam failure was detected for at least the PSCell of the SCG, wherein the indication is an SCG failure information field in a Radio Resource Control (RRC) message, wherein the SCG failure information field has a particular value that indicates beam failure.

2. The method of claim 1, wherein performing BFD for the SCG while in the reduced-energy mode for the SCG is based on one or more of the following:

continuing BFD for the SCG that was being performed before receiving the first command;

an SCG BFD configuration specific to the reduced-energy mode for the SCG;

a subset of the serving cells of the SCG, the subset being configured by the wireless network; and resetting one or more timers or counters, related to SCG BFD, that were running before receiving the first command.

3. The method of claim 2, wherein performing BFD for the SCG while in the reduced-energy mode for the SCG comprises performing BFD for the serving cells that are included in the subset and refraining from performing BFD for the serving cells of the SCG that are not included in the subset.

4. The method of claim 1, further comprising performing one or more of the following operations after detecting a beam failure in the SCG while in the reduced-energy mode for the SCG:

exiting the reduced-energy mode for the SCG and entering an activated mode for the SCG;

performing a random access, RA, procedure towards the SCG;

indicating to a higher protocol layer in the UE that the beam failure in the SCG was detected by a lower protocol layer of the UE; and receiving, from the first network node, a second command indicating a mode for the SCG.

5. The method of claim 4, wherein:

performing the RA procedure towards the SCG is responsive to receiving the second command, which indicates the activated mode for the SCG; and exiting the reduced-energy mode for the SCG and entering an activated mode for the SCG is responsive to successful completion of the RA procedure.

6. The method of claim 5, wherein the RA procedure towards the SCG is initiated by the higher protocol layer of the UE based on the indication that the beam failure was detected by the lower protocol layer of the UE.

7. The method of claim 5, wherein:

the indication that the beam failure was detected in the SCG is sent to the second network node during the RA procedure towards the SCG; and performing the RA procedure comprises receiving, via the SCG, a TCI state associated with a physical downlink control channel, PDCCH, of the SCG; and the TCI state is based on the indication.

8. The method of claim 4, wherein:

sending to the first network node the indication that a beam failure was detected in the SCG is responsive to receiving the second command, which indicates the activated mode for the SCG;

performing the RA procedure towards the SCG is responsive to sending the indication; and exiting the reduced-energy mode for the SCG and entering an activated mode for the SCG is responsive to successful completion of the RA procedure towards the SCG.

9. A user equipment (UE) configured to communicate with a wireless network via a master cell group (MCG) and a secondary cell group (SCG), the UE comprising:

communication interface circuitry configured to communicate with the wireless network via the SCG and the MCG; and processing circuitry operatively coupled to the communication interface circuitry, whereby the processing circuitry and the communication interface circuitry are configured to perform operations corresponding to the method of claim 1.

10. A non-transitory, computer-readable medium storing computer-executable instructions that, when executed by processing circuitry of a user equipment, UE configured to communicate with a wireless network via a master cell group (MCG) and a secondary cell group (SCG), configure the UE to perform operations corresponding to the method of claim 1.

11. A method for a second network node configured to provide a secondary cell group (SCG) for a user equipment (UE) in a wireless network, the method comprising:

while the UE is in an activated mode for the SCG, sending to the UE via the UE's master cell group (MCG) a first command to enter a reduced-energy mode for the SCG, wherein the first command includes one or more of the following information that is specific to the reduced-energy mode for the SCG:

an SCG beam failure detection (BFD) configuration, and a subset of serving cells comprising the SCG; and receiving, from a first network node configured to provide the UE's MCG, an indication that the UE detected a beam failure in the SCG while the UE was in the reduced-energy mode for the SCG, wherein the indication is an SCG failure information field in a Radio Resource Control (RRC) message, wherein the SCG failure information field has a particular value that indicates beam failure.

12. The method of claim 11, further comprising sending, to the first network node, a request to resume the UE's operation in an activated mode for the SCG, wherein the indication is received from the first network node in response to the request.

13. The method of claim 11, wherein one or more of the following applies:

the SCG BFD configuration includes the subset of the serving cells of the SCG; and only the subset should be monitored for BFD while the UE is in the reduced-energy mode for the SCG.

14. A second network node configured to provide a secondary cell group (SCG) for a user equipment (UE) in a wireless network, the second network node comprising:

communication interface circuitry configured to communicate with the UE via SCG and with a first network node configured to provide a master cell group (MCG) for the UE in the wireless network; and processing circuitry operatively coupled to the communication interface circuitry, whereby the processing circuitry and the communication interface circuitry are configured to perform operations corresponding to the method of claim 11.

15. A non-transitory, computer-readable medium storing computer-executable instructions that, when executed by processing circuitry of a second network node configured to provide a secondary cell group (SCG), for a user equipment (UE) in a wireless network, configure the second network node to perform operations corresponding to the method of claim 11.

16. A method for a first network node configured to provide a master cell group (MCG) for a user equipment (UE) in a wireless network, the method comprising:

while the UE is in an activated mode for a secondary cell group (SCG) provided by a second network node in the wireless network, sending to the UE a first command to enter a reduced-energy mode for the SCG, wherein the first command includes one or more of the following information that is specific to the reduced-energy mode for the SCG:

an SCG beam failure detection (BFD) configuration, and a subset of serving cells comprising the SCG;

while the UE is in the activated mode for the MCG and in the reduced-energy for the SCG, receiving from the UE, an indication that the UE detected a beam failure in the SCG while the UE was in the reduced-energy mode for the SCG, wherein the indication is an SCG failure information field in a Radio Resource Control (RRC) message, wherein the SCG failure information field has a particular value that indicates beam failure; and forwarding the indication to the second network node.

17. The method of claim 16, wherein one or more of the following applies:

the SCG BFD configuration includes the subset of the serving cells of the SCG;

only the subset should be monitored for BFD while the UE is in the reduced-energy mode for the SCG.

18. The method of claim 16, further comprising receiving from the second network node a request to resume the UE's operation in an activated mode for the SCG, wherein the indication is forwarded to first network node in response to the request.

19. A first network node configured to provide a master cell group (MCG) for a user equipment (UE) in a wireless network, the first network node comprising:

communication interface circuitry configured to communicate with the UE via the MCG and with a second network node configured to provide a secondary cell group (SCG) for the UE in the wireless network; and processing circuitry operatively coupled to the communication interface circuitry, whereby the processing circuitry and the communication interface circuitry are configured to perform operations corresponding to the method of claim 16.

20. A non-transitory, computer-readable medium storing computer-executable instructions that, when executed by processing circuitry of a first network node configured to provide a master cell group (MCG) for a user equipment (UE) in a wireless network, configure the first network node to perform operations corresponding to the method of claim 16.

* * * * *